United States Patent
Liu et al.

(10) Patent No.: US 12,392,929 B2
(45) Date of Patent: Aug. 19, 2025

(54) ZERO-INDEX PHOTONIC CRYSTALS FOR VISIBLE AND NEAR INFRARED APPLICATIONS

(71) Applicant: RENSSELAER POLYTECHNIC INSTITUTE, Troy, NY (US)

(72) Inventors: Shizhao Liu, Troy, NY (US); Joel L. Plawsky, Albany, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 915 days.

(21) Appl. No.: 17/265,063

(22) PCT Filed: Aug. 1, 2019

(86) PCT No.: PCT/US2019/044628
§ 371 (c)(1),
(2) Date: Feb. 1, 2021

(87) PCT Pub. No.: WO2020/028642
PCT Pub. Date: Feb. 6, 2020

(65) Prior Publication Data
US 2021/0311226 A1    Oct. 7, 2021

Related U.S. Application Data

(60) Provisional application No. 62/713,690, filed on Aug. 2, 2018.

(51) Int. Cl.
*G02B 1/00* (2006.01)
*G02B 5/18* (2006.01)

(52) U.S. Cl.
CPC ........... *G02B 1/005* (2013.01); *G02B 5/1857* (2013.01)

(58) Field of Classification Search
CPC ........ G02B 1/005; G02B 5/1857; G02B 1/11; G02B 5/1847; B82Y 20/00
See application file for complete search history.

(56) References Cited

U.S. PATENT DOCUMENTS 7,065,272 B2    6/2006    Taillaert et al.
7,454,103 B2    11/2008   Parriaux
(Continued)

FOREIGN PATENT DOCUMENTS

WO    2015163958 A2    10/2015

OTHER PUBLICATIONS

International Search Report and The Written Opinion of the International Searching Authority, International Application No. PCT/US2019/044628, mailed Oct. 2, 2019.
(Continued)

*Primary Examiner* — Mustak Choudhury
(74) *Attorney, Agent, or Firm* — Barclay Damon LLP; Anthony P. Gangemi

(57) ABSTRACT

A two dimensional (2D) photonic crystal (PhC) structure includes a substrate and a periodic grating structure formed on the substrate. The periodic grating structure includes a plurality of gratings having a grating period, a. Each pair of adjacent gratings is separated by air. Each grating has a grating width, d, and includes a plurality of alternating layers of a first material and a second material. The first material corresponds to a high index material. The second material corresponds to a low index material. A ratio of a first refractive index of the first material to a second refractive index of the second material is greater than or equal to two. Each first material layer has a first thickness, t1. Each second material layer has a second thickness, t2. The 2D PhC structure has a structure refractive index at or near zero for a range of frequencies.

10 Claims, 27 Drawing Sheets

(56) References Cited

U.S. PATENT DOCUMENTS

| | | | |
|---|---|---|---|
| 8,442,374 B2 | 5/2013 | Chang-Hasnain et al. | |
| 2007/0237478 A1 | 10/2007 | D'Aguanno et al. | |
| 2008/0298744 A1* | 12/2008 | Wang | G02B 1/005 385/27 |
| 2011/0203663 A1* | 8/2011 | Prather | G02B 1/115 136/259 |
| 2014/0323323 A1 | 10/2014 | Cunningham et al. | |
| 2017/0160473 A1* | 6/2017 | Mazur | G02B 6/136 |

OTHER PUBLICATIONS

Chan, C.T., et al., "Dirac Dispersion in Two-Dimensional Photonic Crystals," Advances in OptoElectronics, vol. 2012, Article I.D. #313984, 11 pages, 2012.

Moitra, P., et al., "Realization of an all-dielectric zero-index optical metamaterial," Nature Photonics, vol. 7, pp. 791-795, Oct. 2013.

Ciprian, M., et al., "SiO2/TiO2 multi-layered thin films with self-cleaning and enhanced optical properties," Bulletin of Material Science, vol. 40, No. 3, pp. 473-482, Jun. 2017.

* cited by examiner

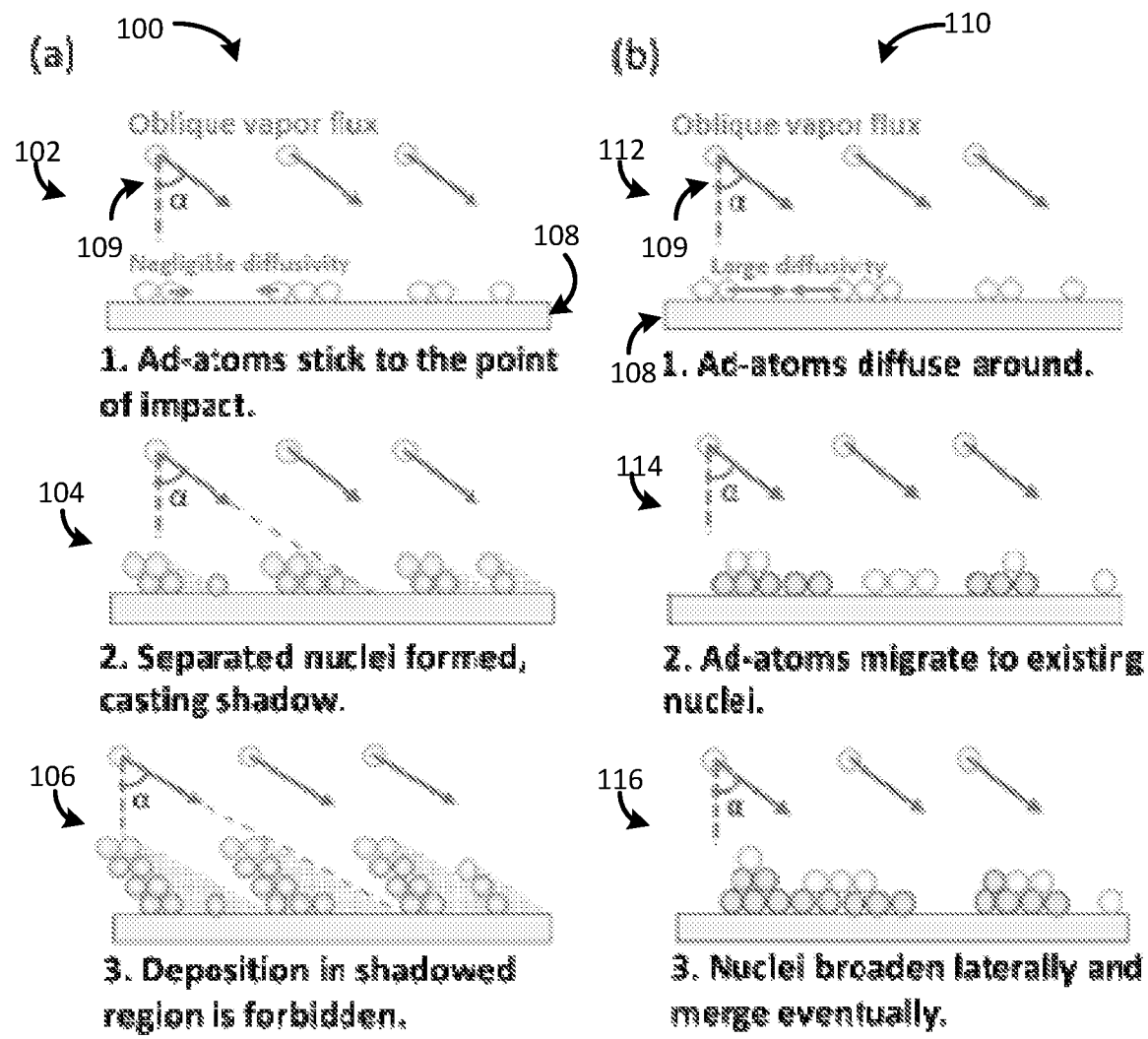
Figure 1.1

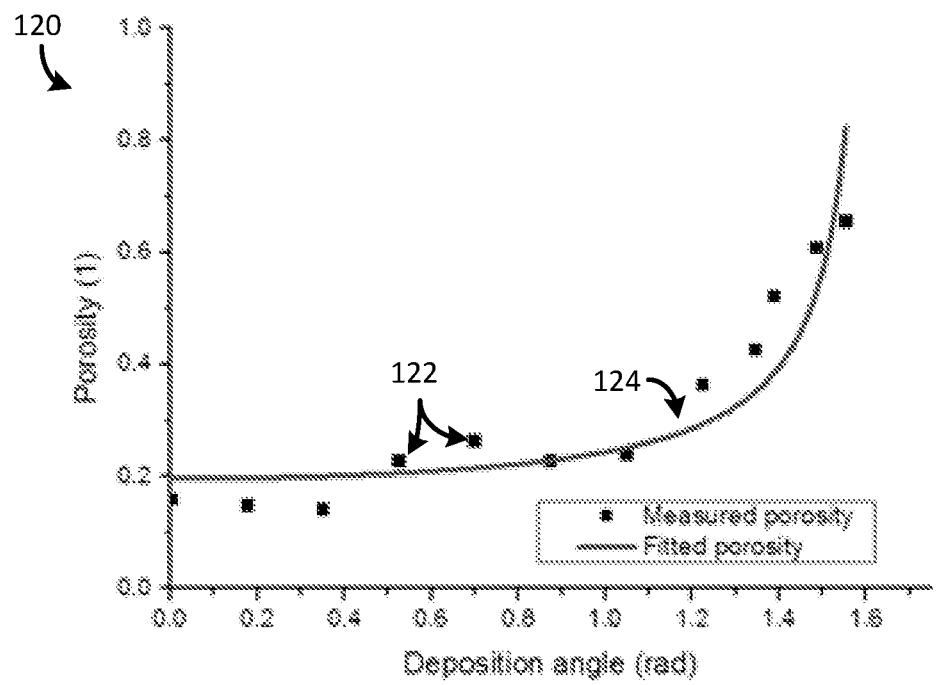
Figure 1.2
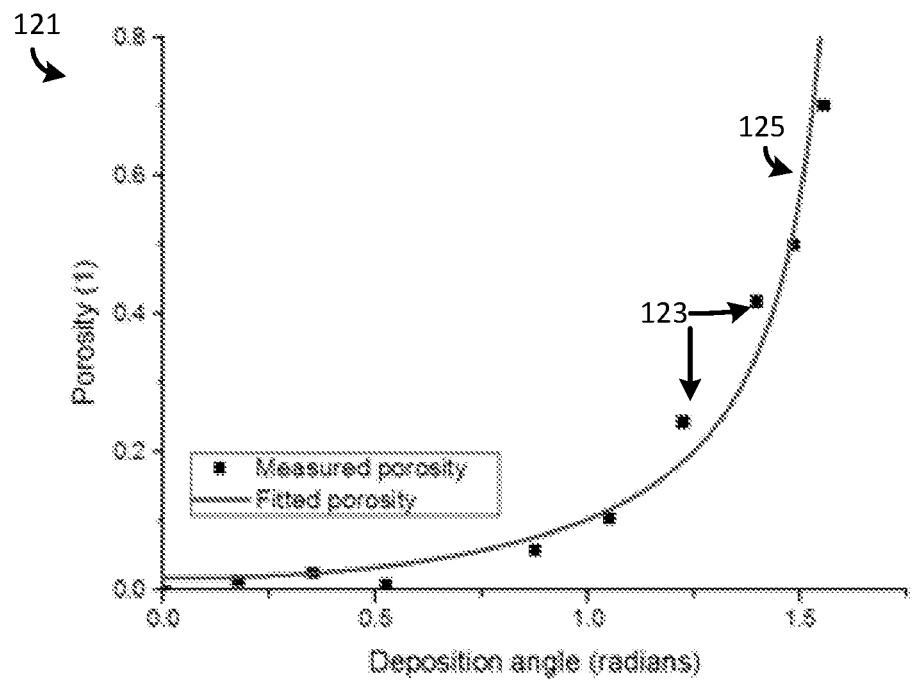
Figure 1.3

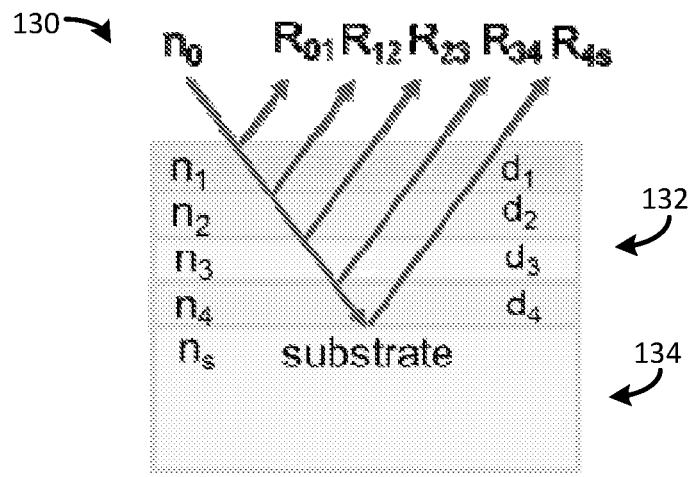
Figure 1.4
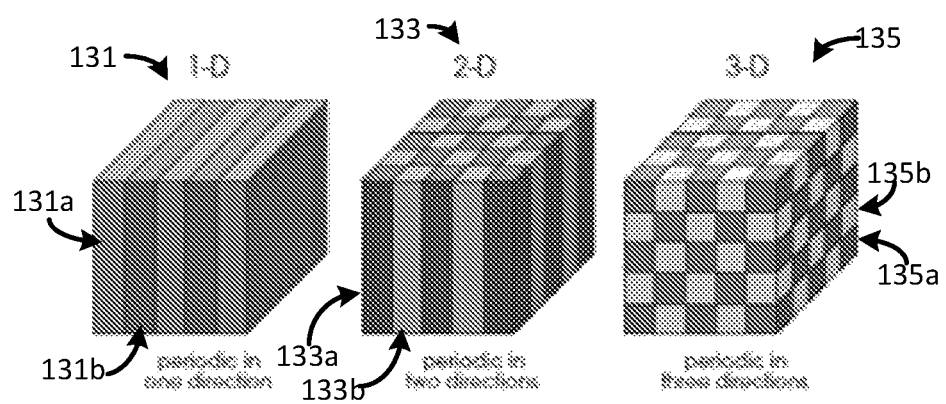
Figure 1.5

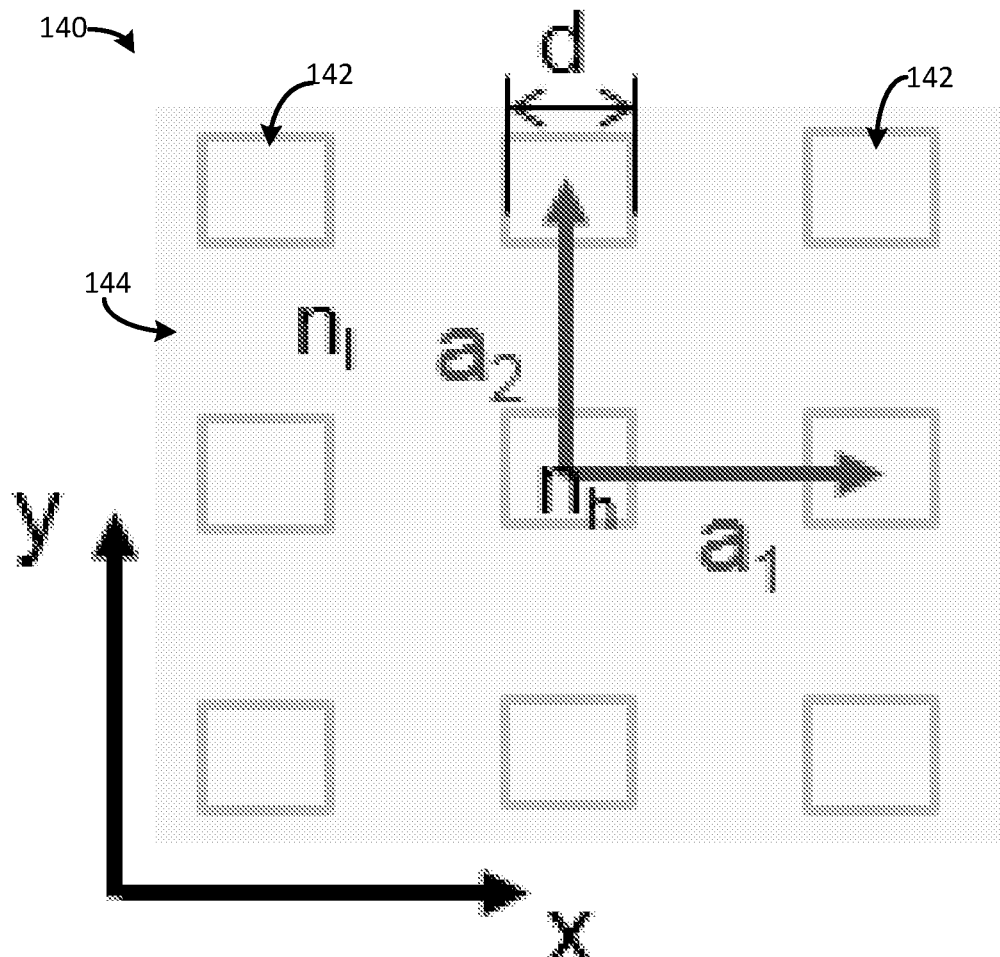
Figure 1.6

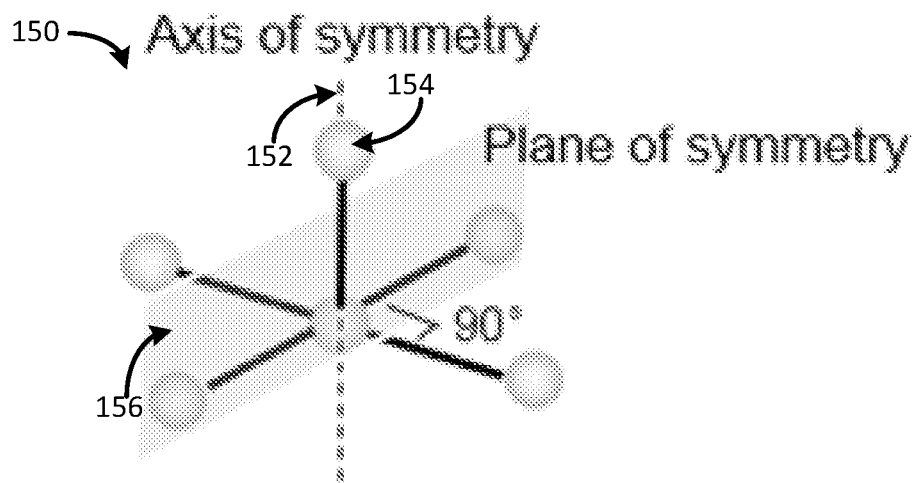
Figure 1.7
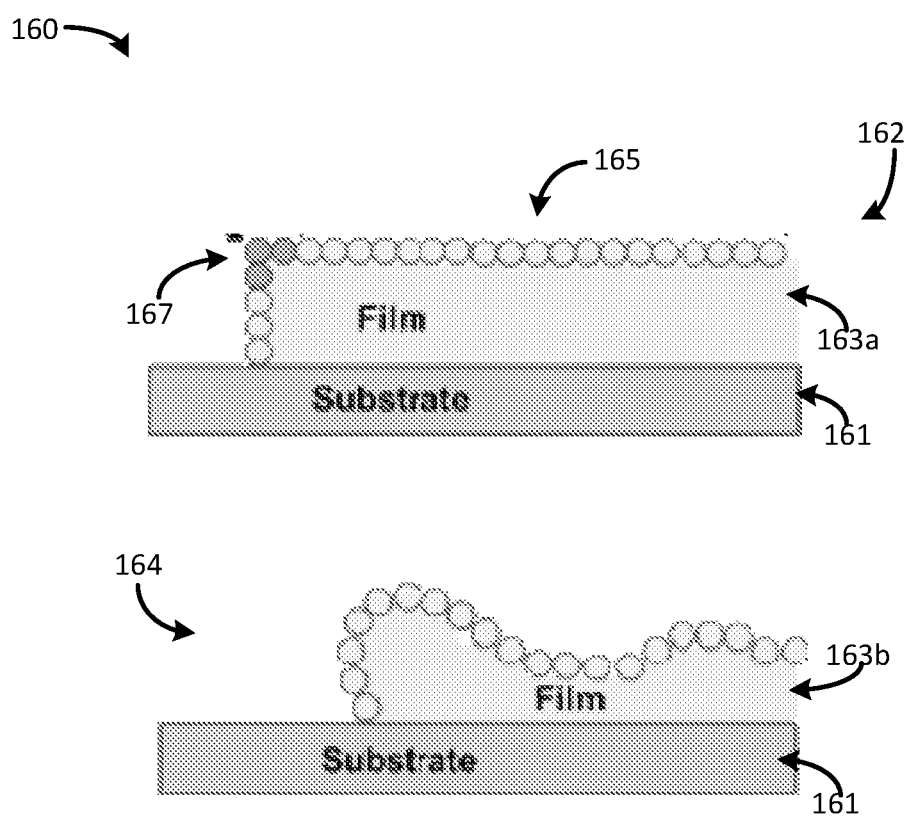
Figure 1.8

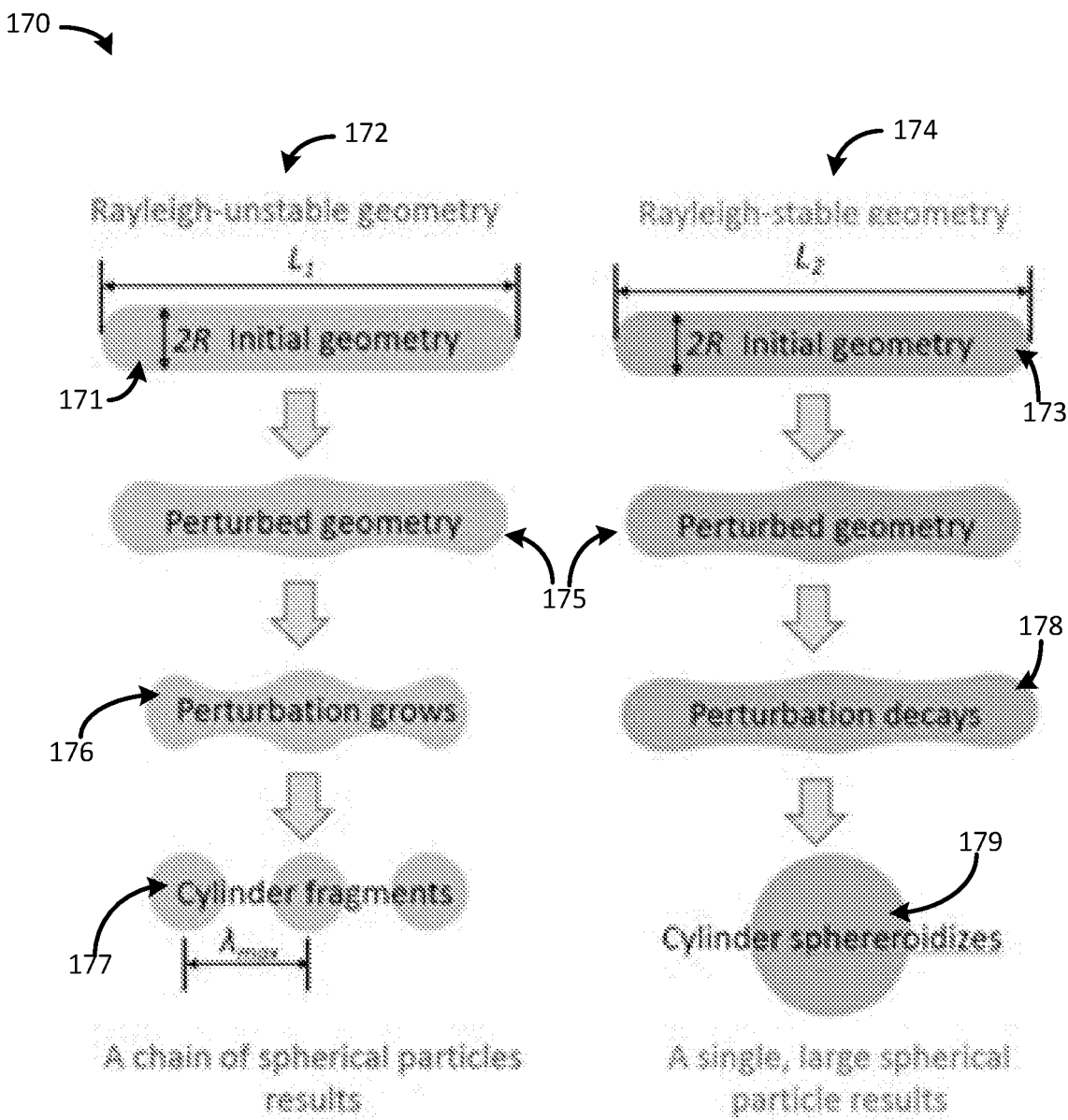
Figure 1.9

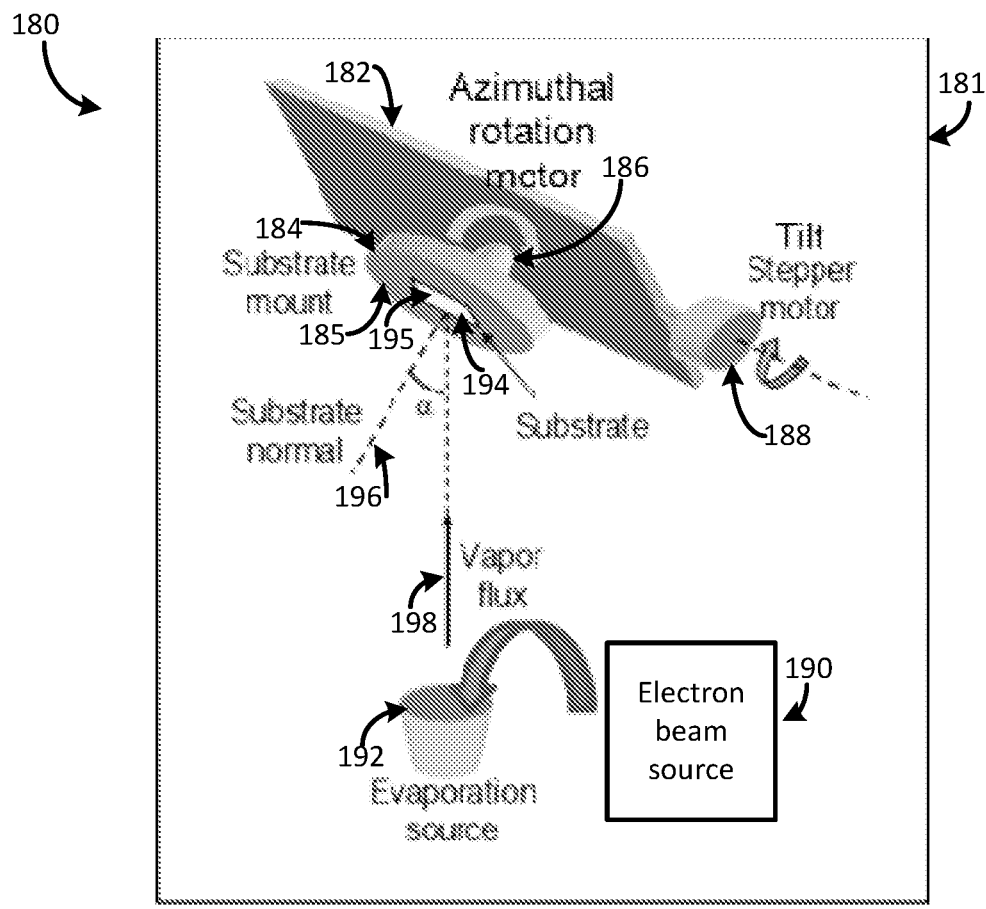
Figure 1.10
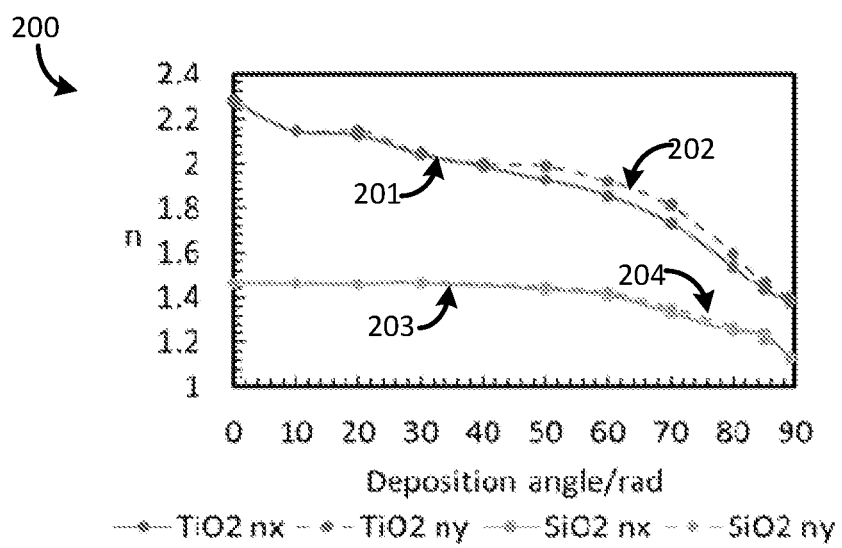
Figure 2.1

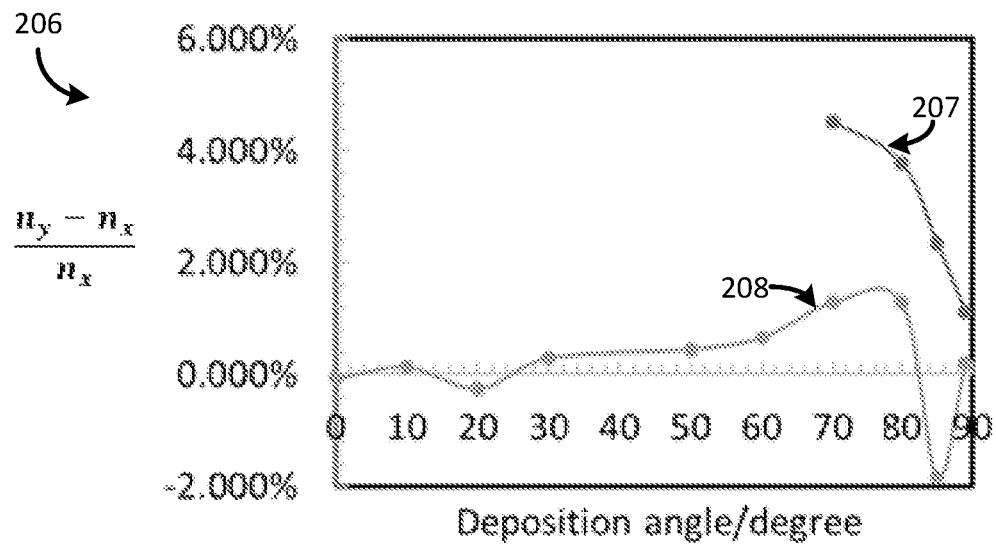
Figure 2.2
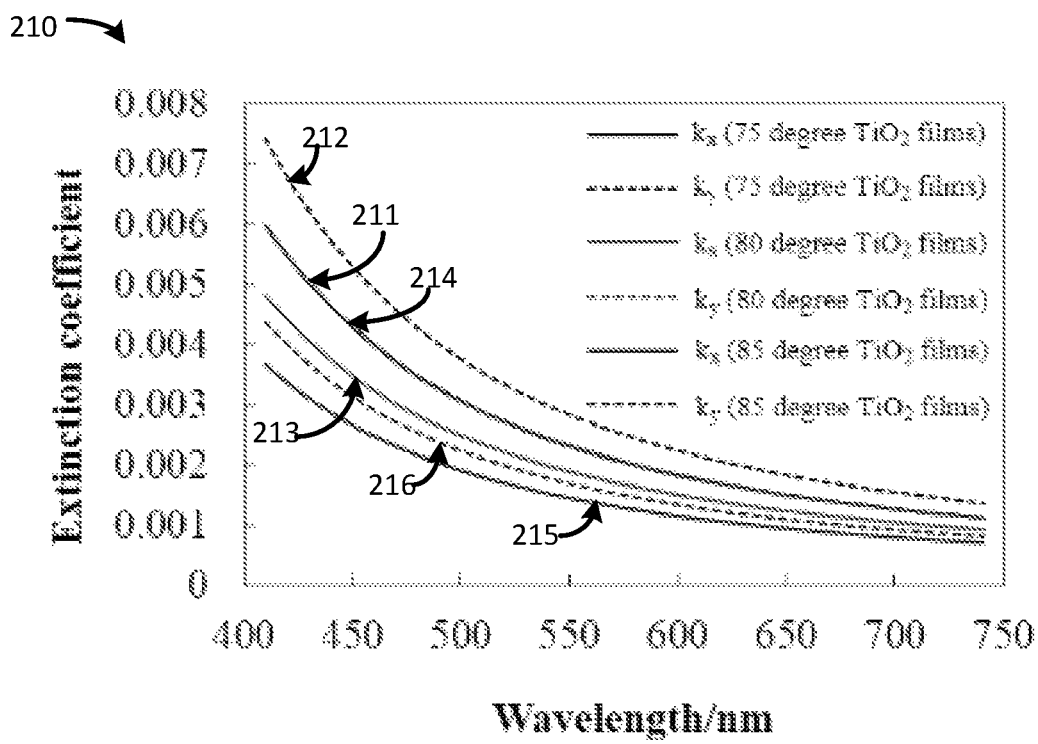
Figure 2.3

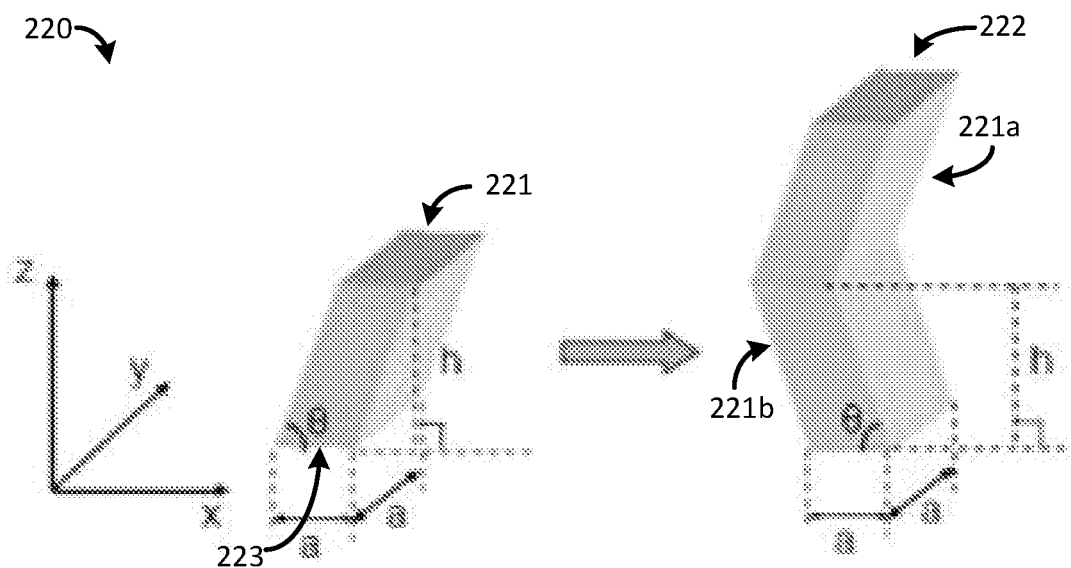
Figure 2.4
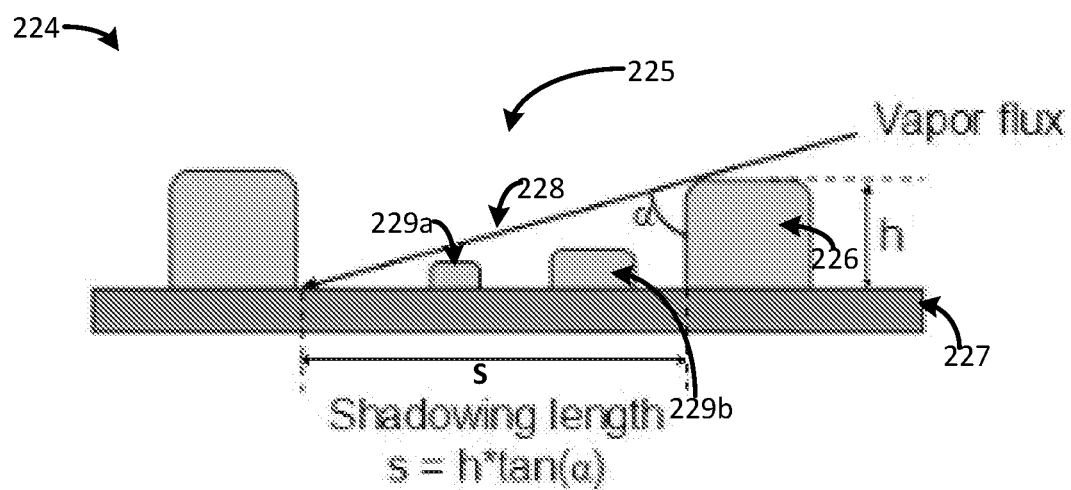
Figure 2.5

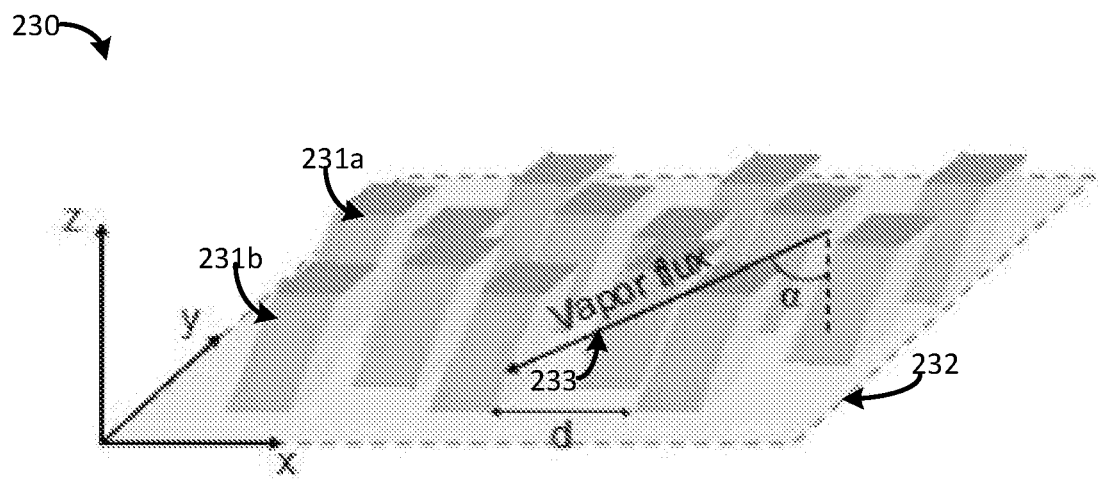
Figure 2.6
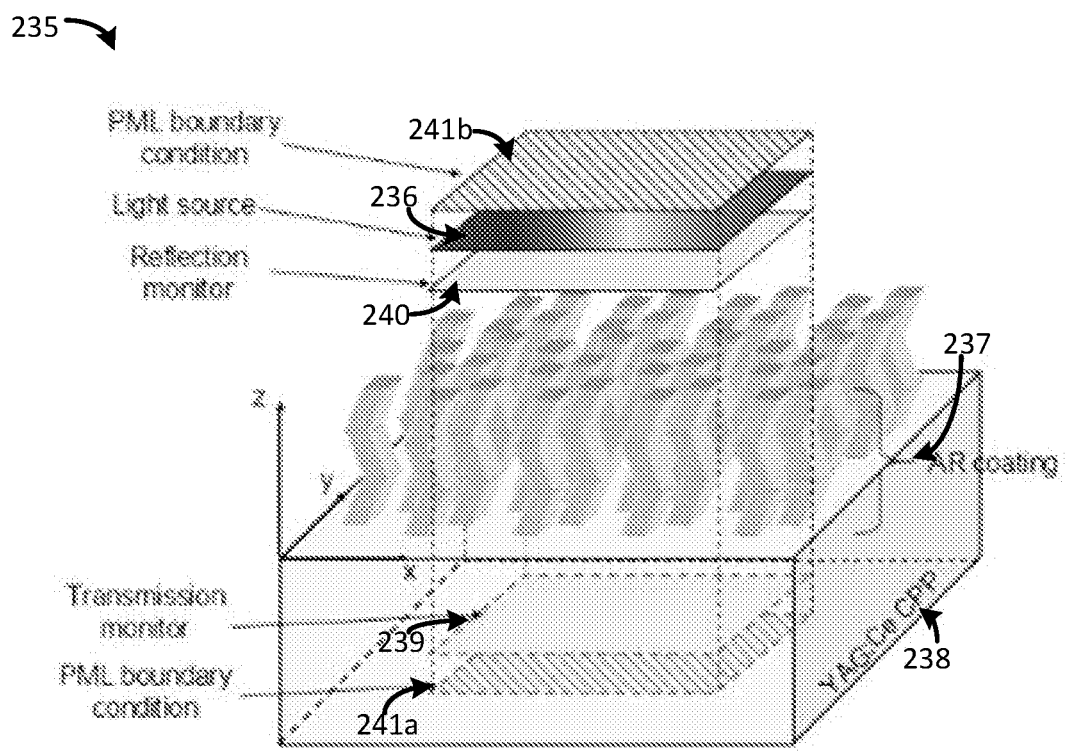
Figure 2.7

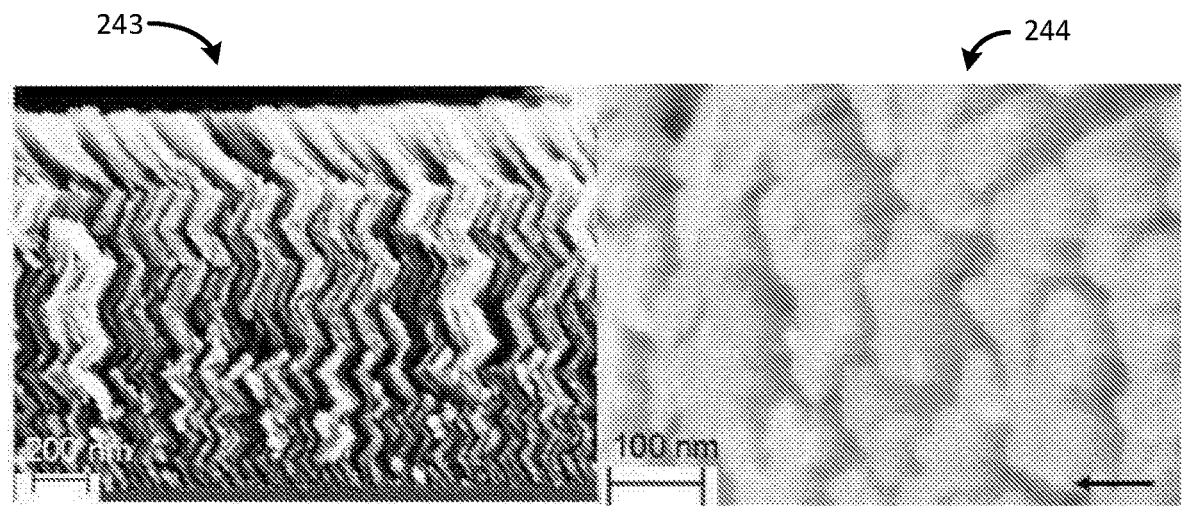
Figure 2.8
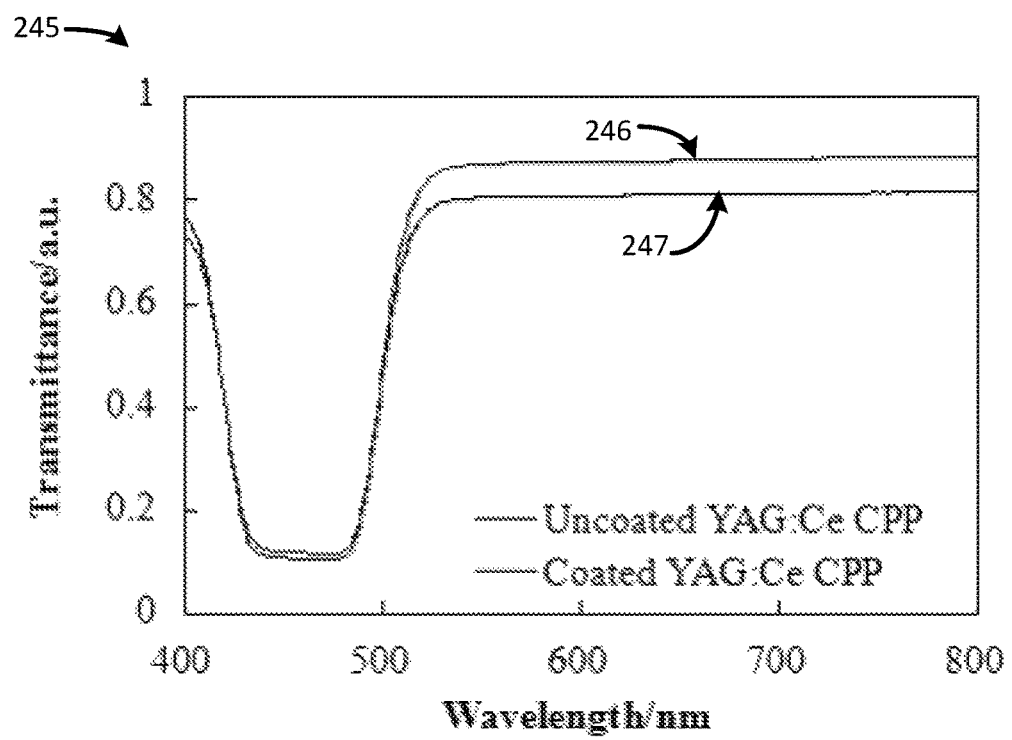
Figure 2.9

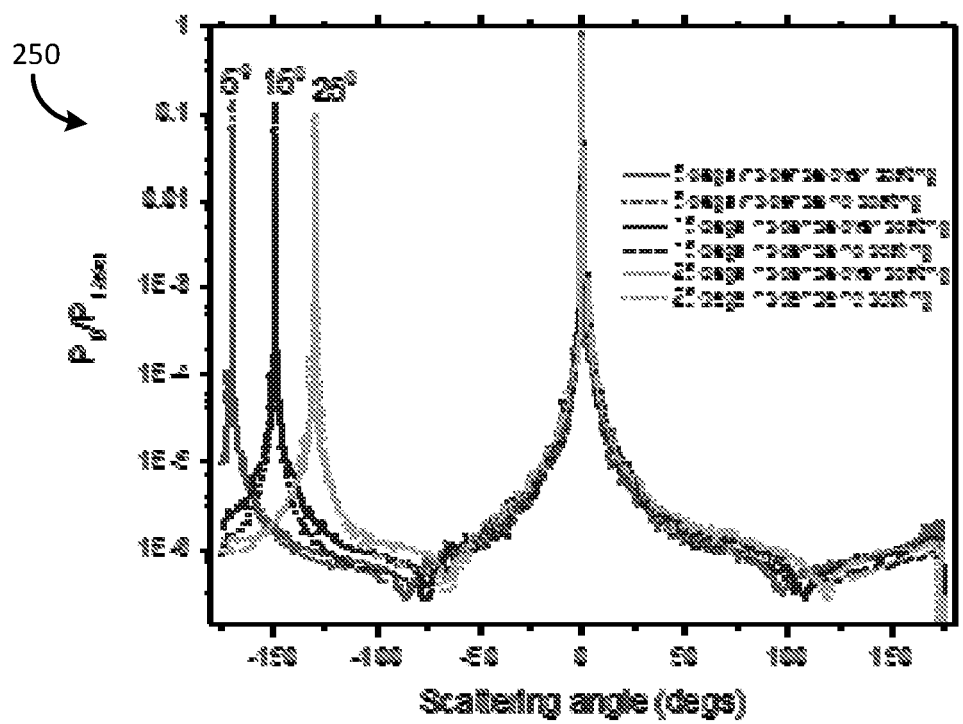
Figure 2.10
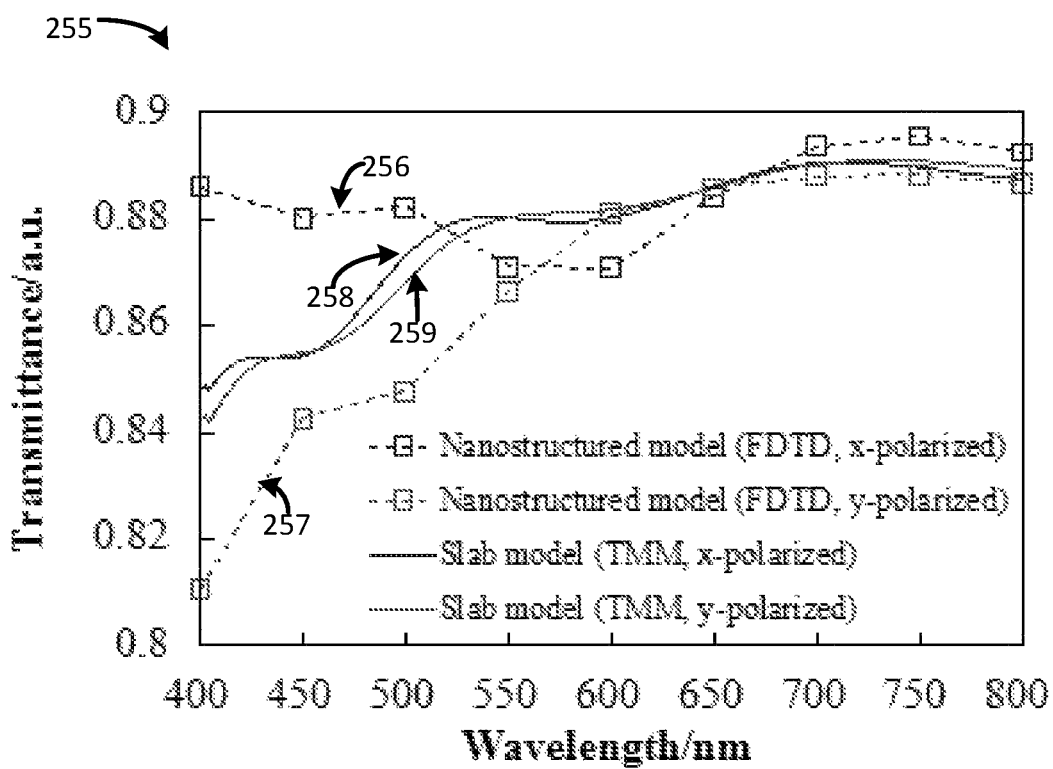
Figure 2.11

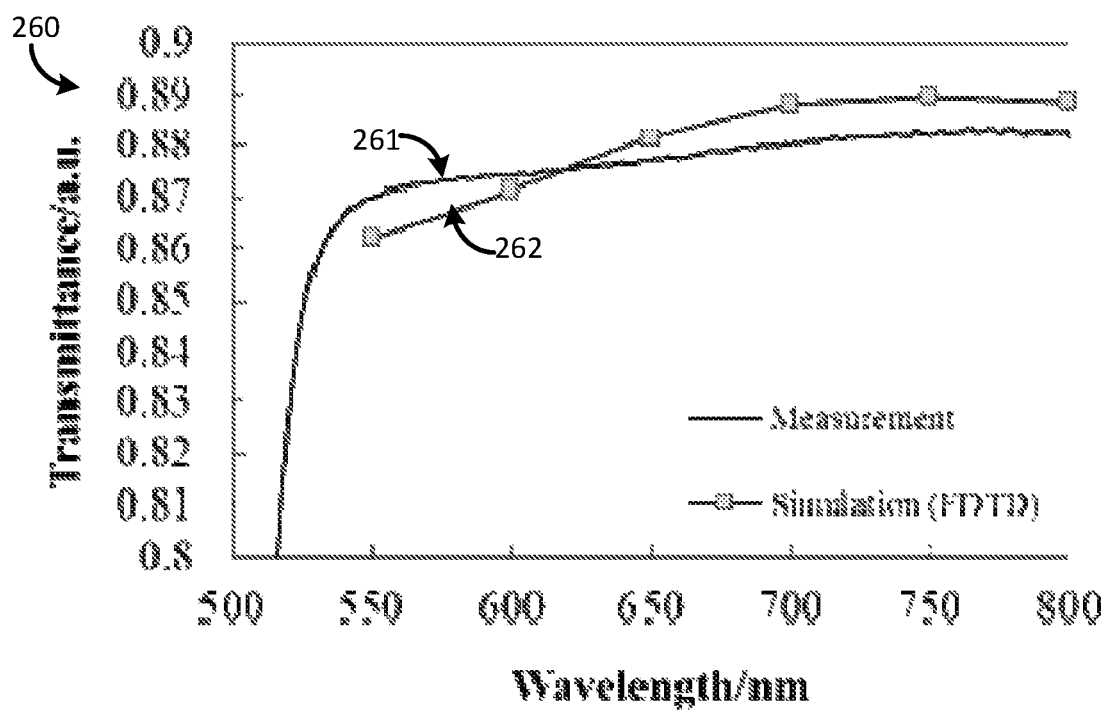
Figure 2.12
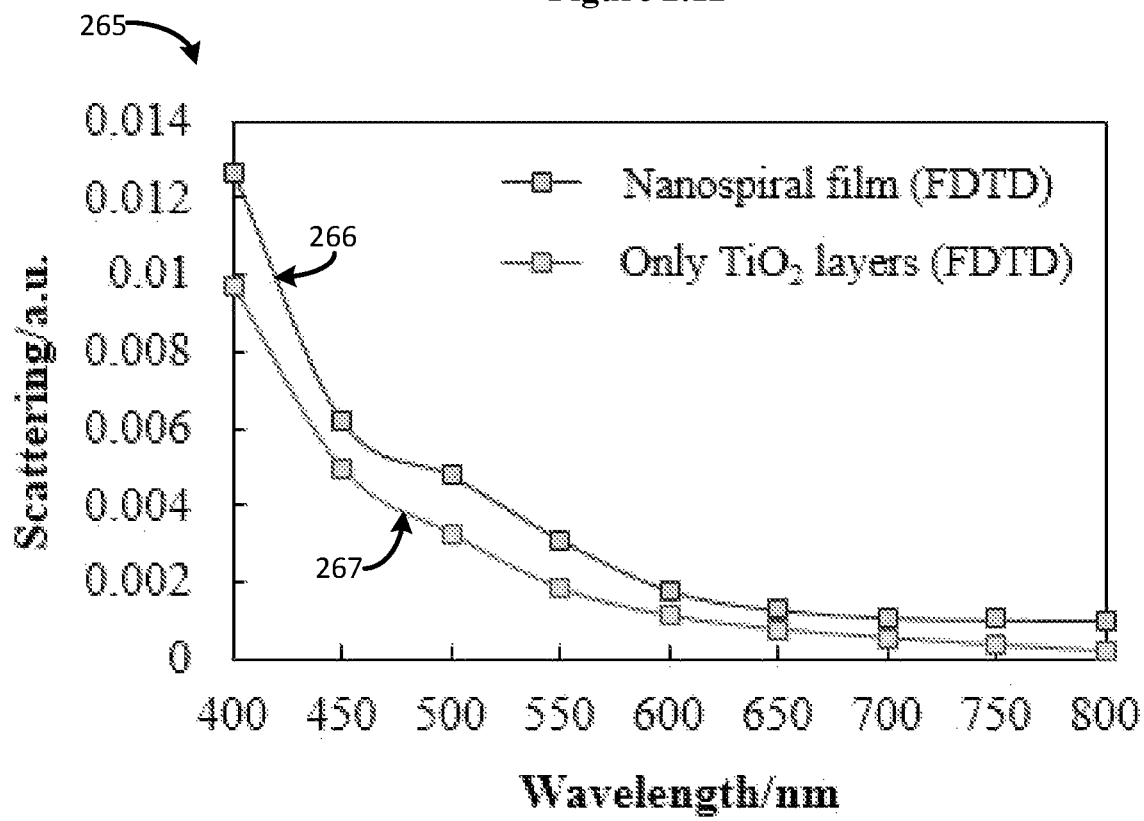
Figure 2.13

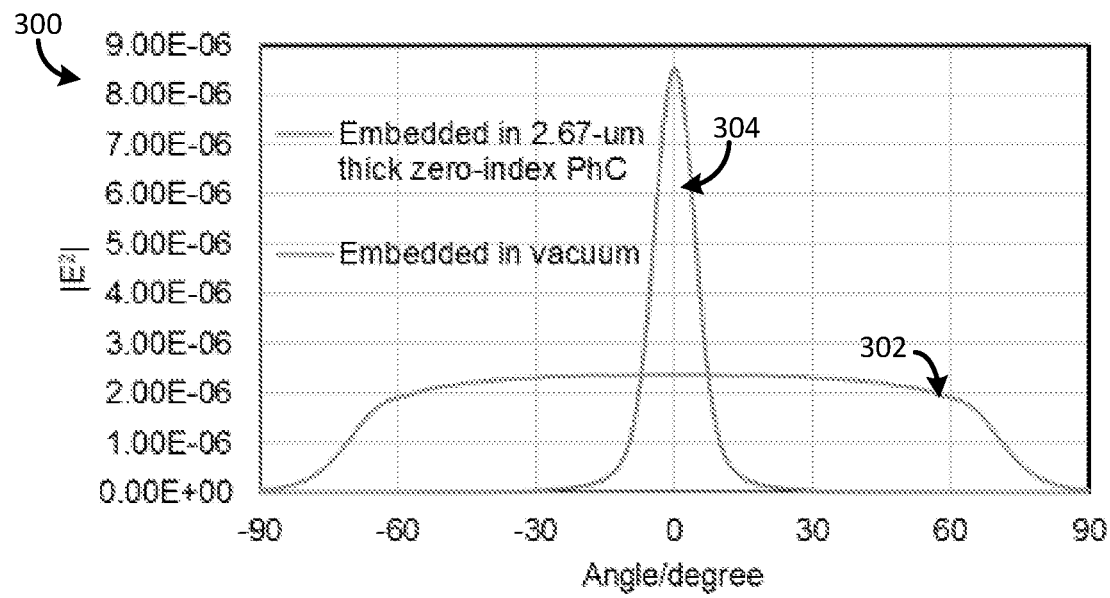
Figure 3.1
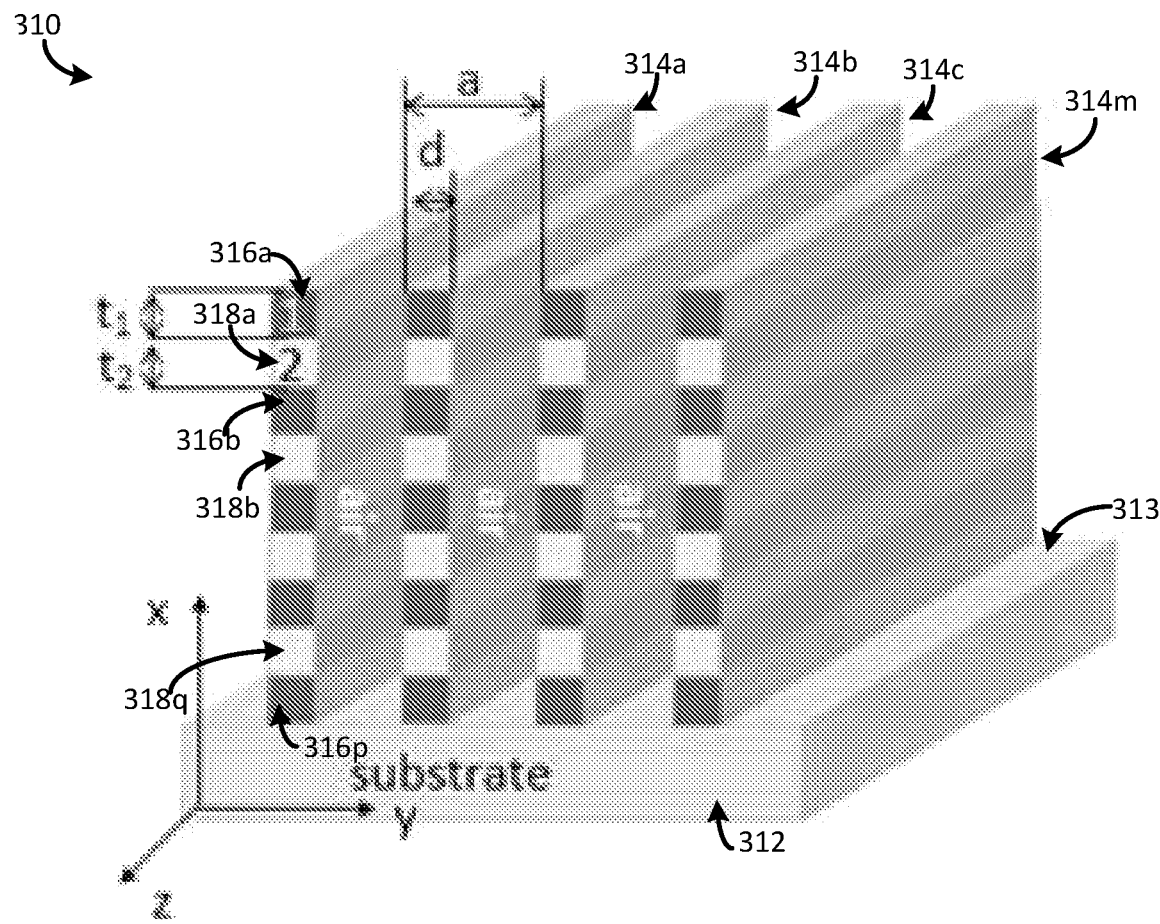
Figure 3.2

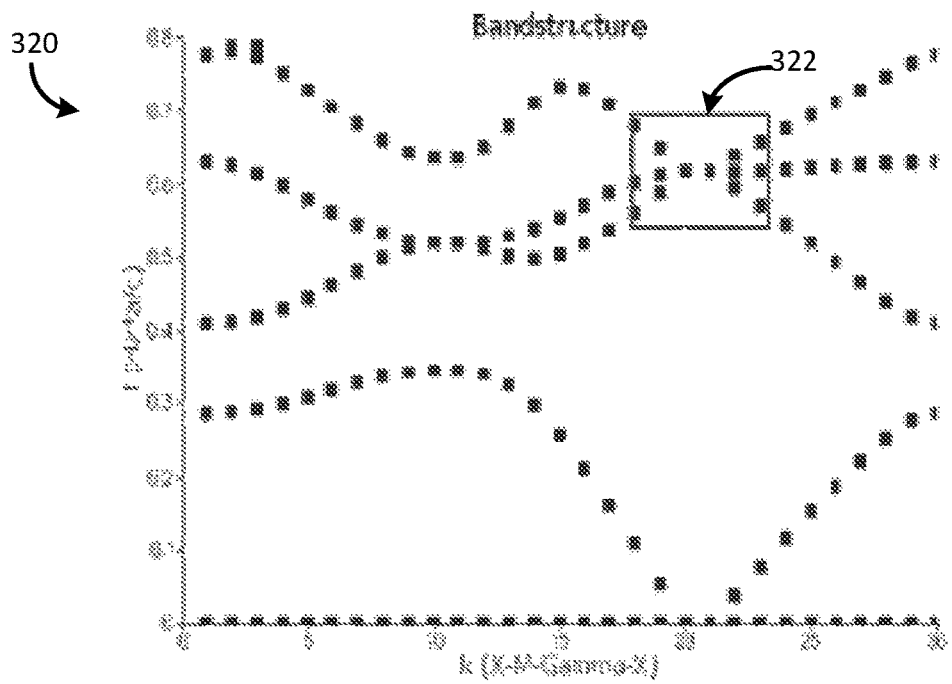
Figure 3.3
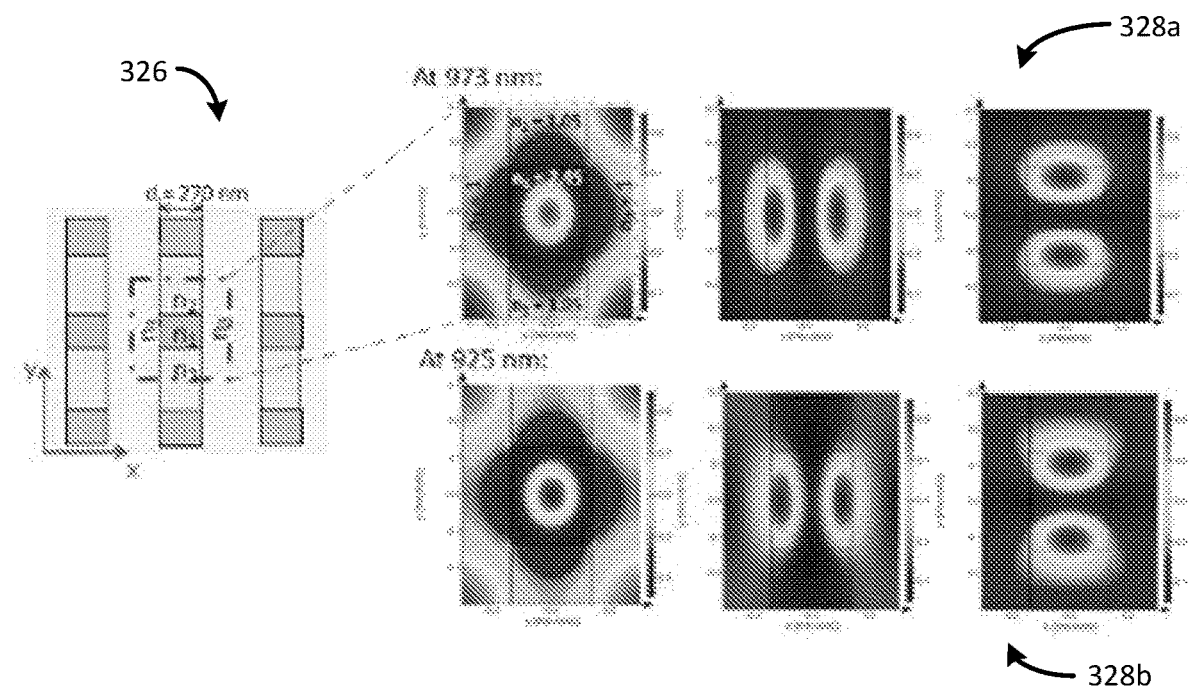
Figure 3.4

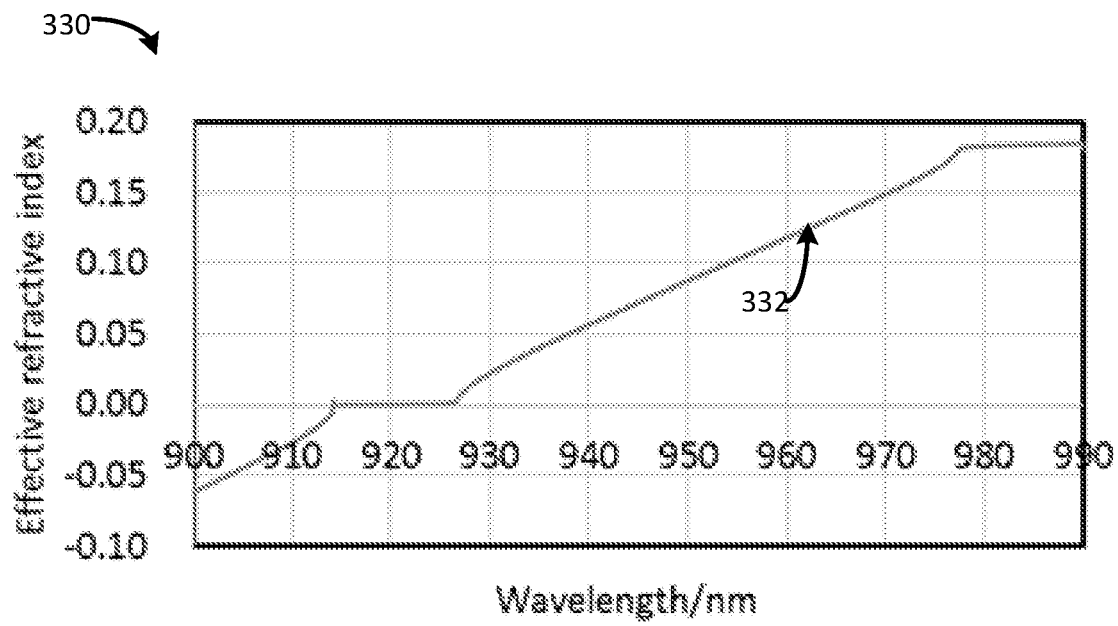
Figure 3.5
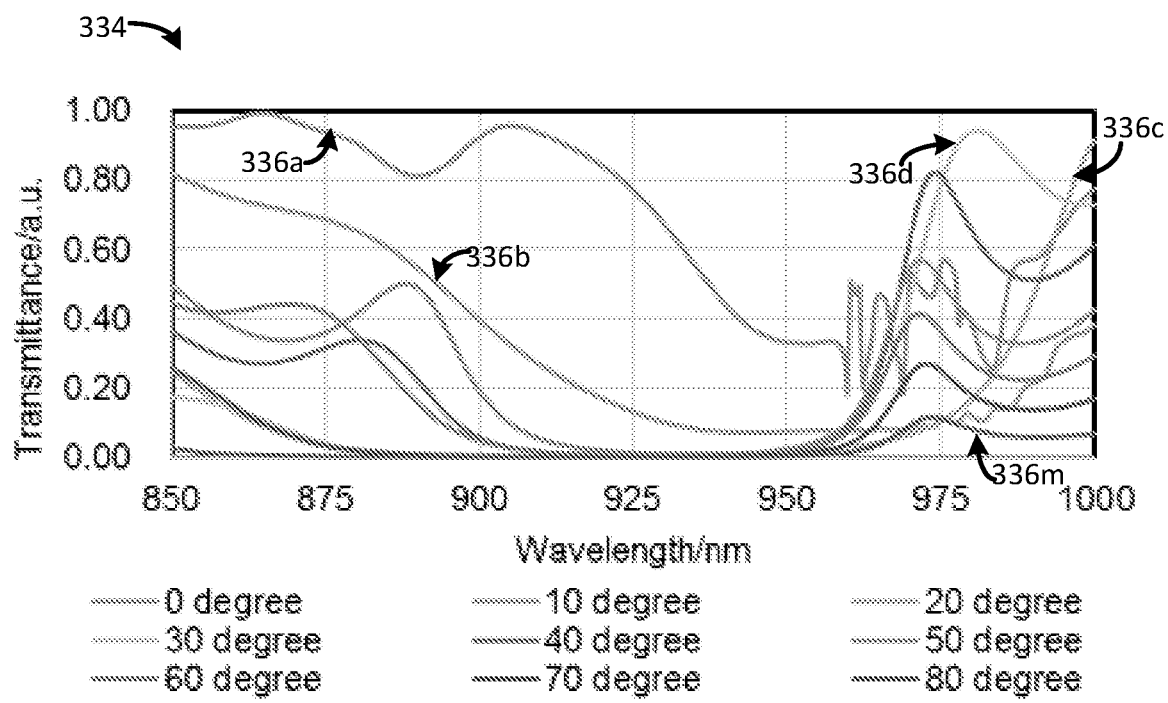
Figure 3.6

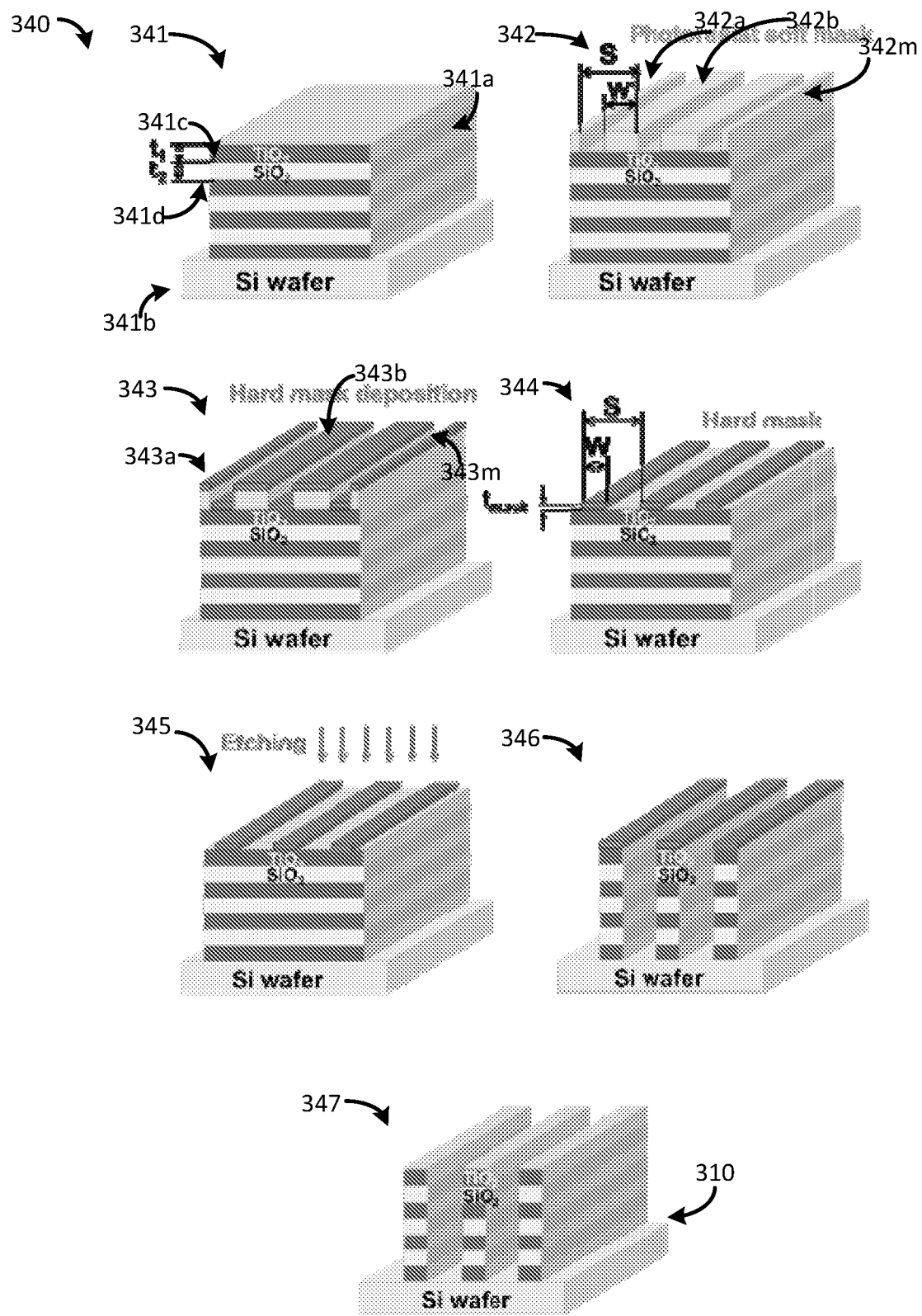
Figure 3.7

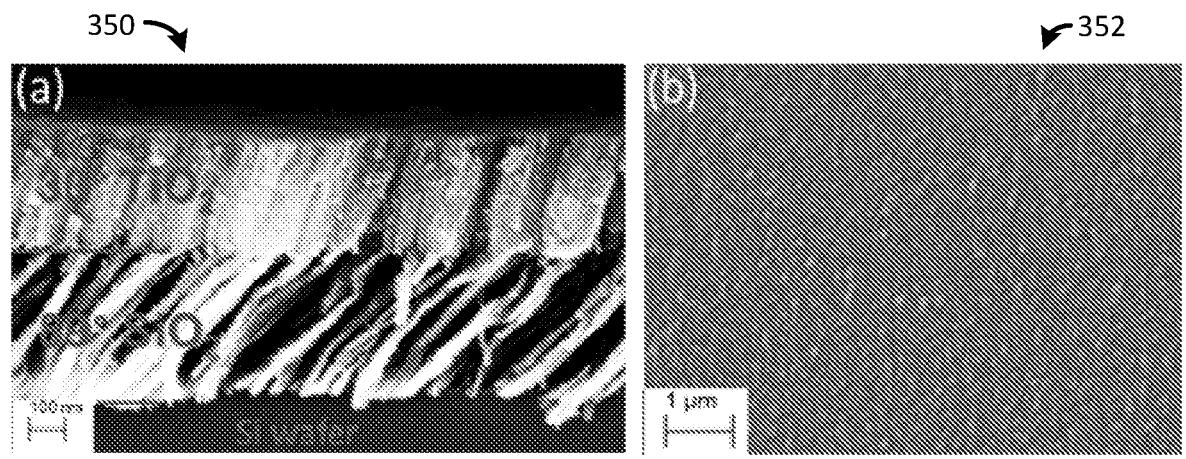
Figure 3.8
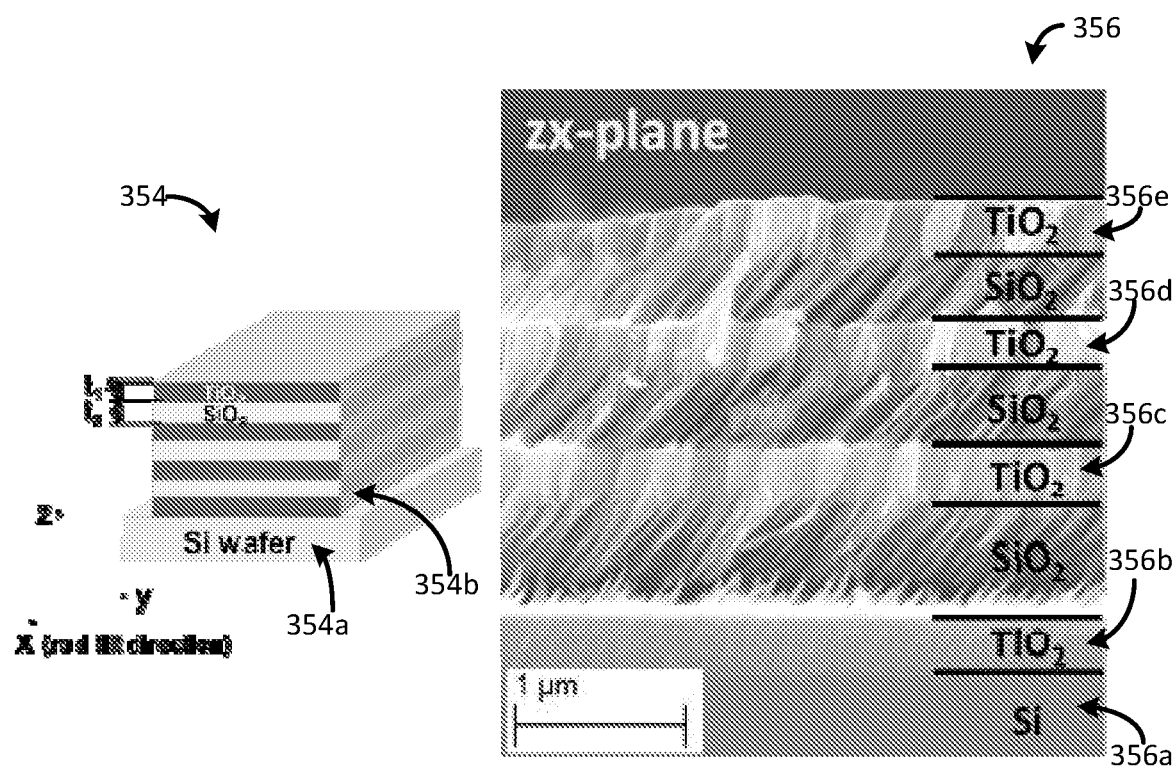
Figure 3.9

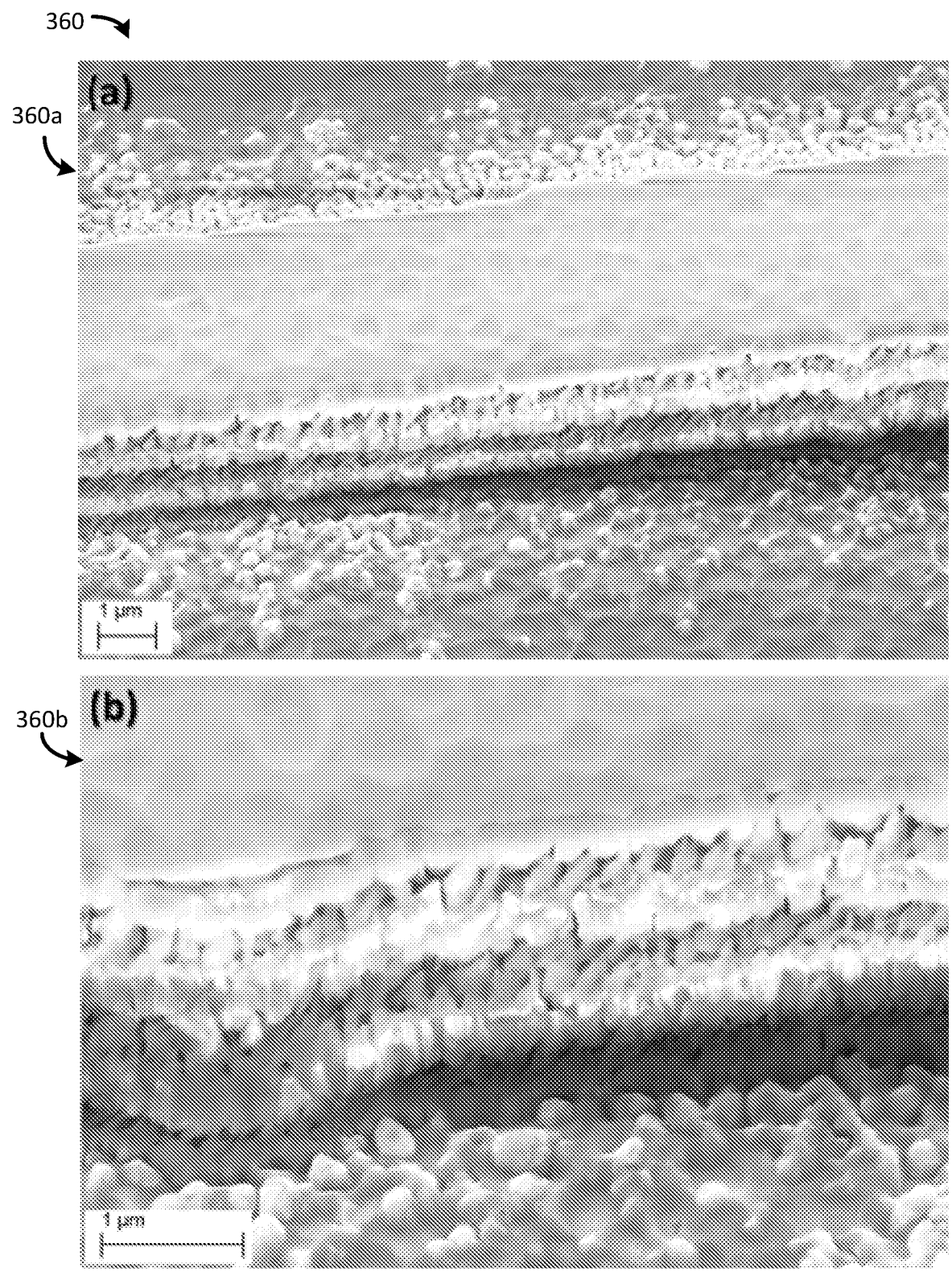
Figure 3.10

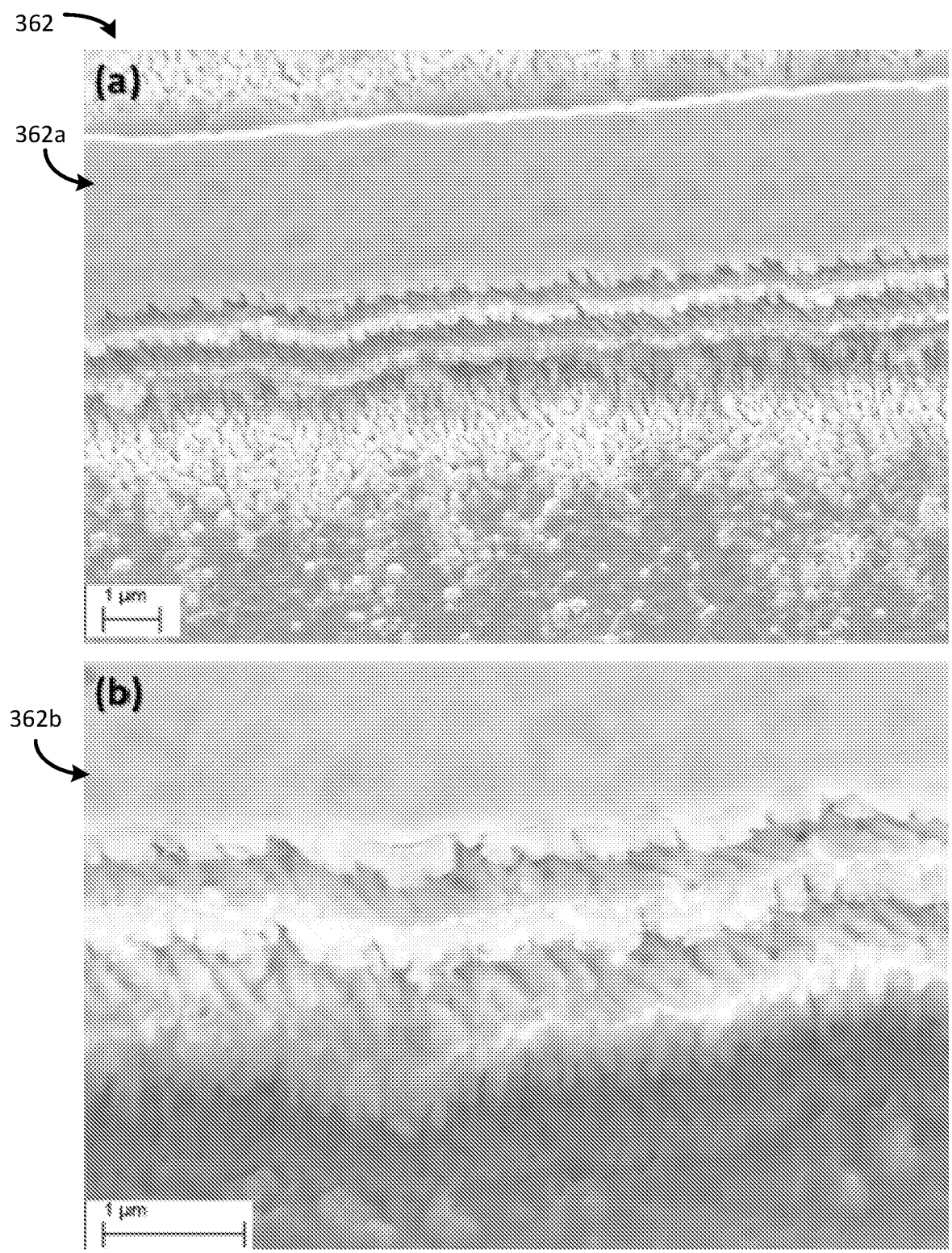
Figure 3.11

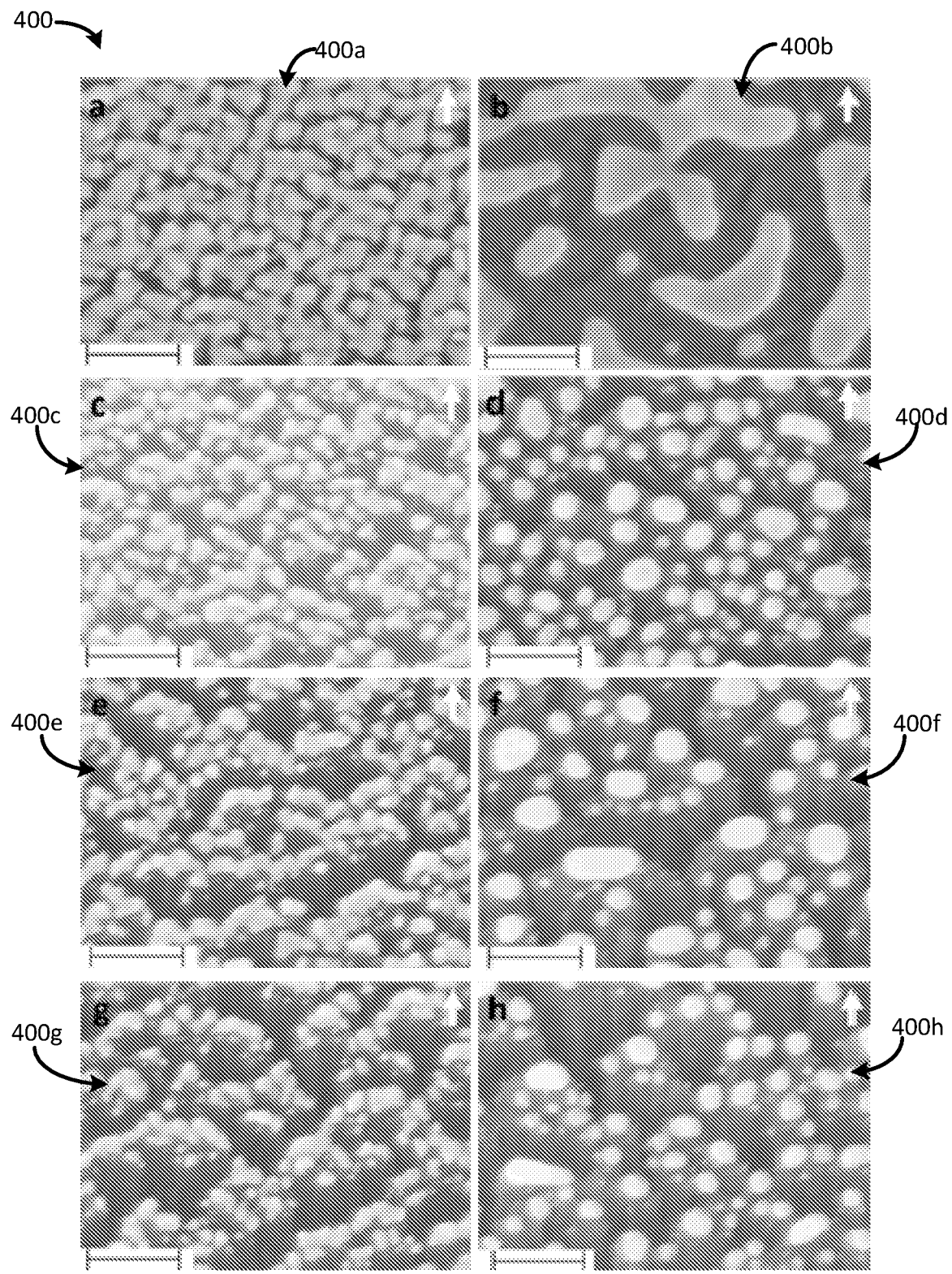
Figure 4.1

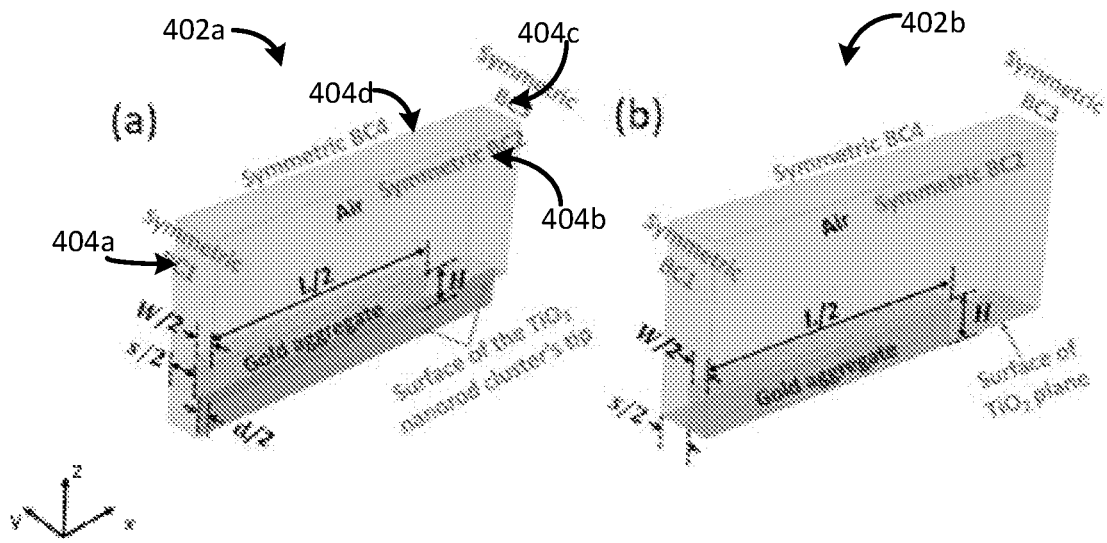
Figure 4.2
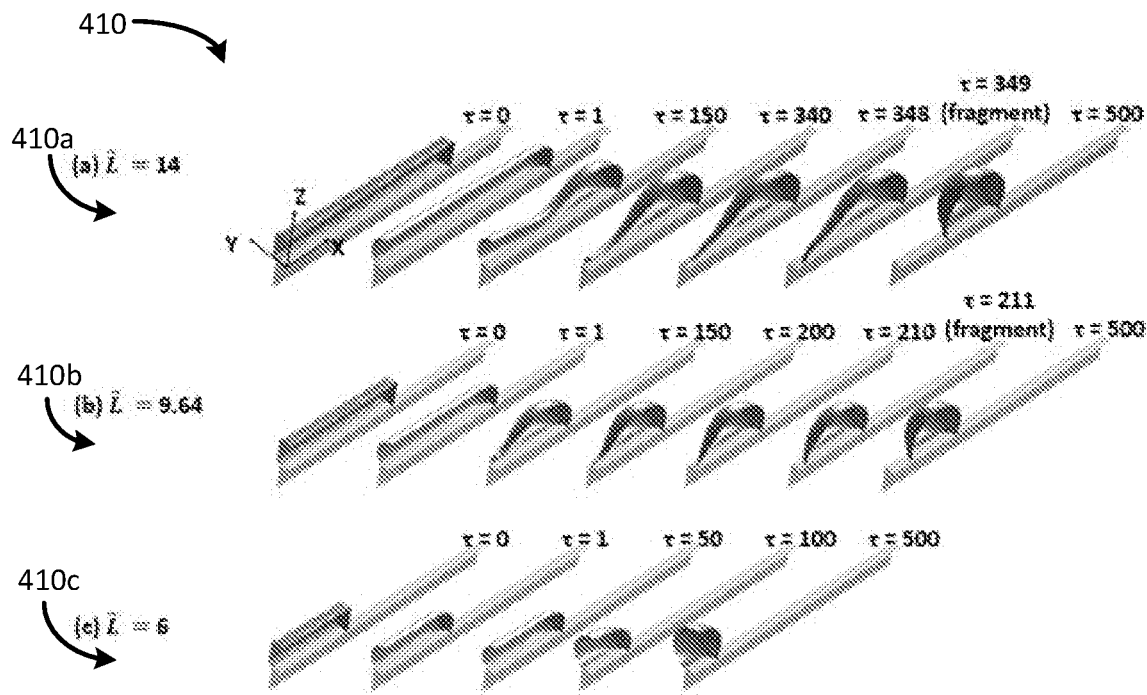
Figure 4.3

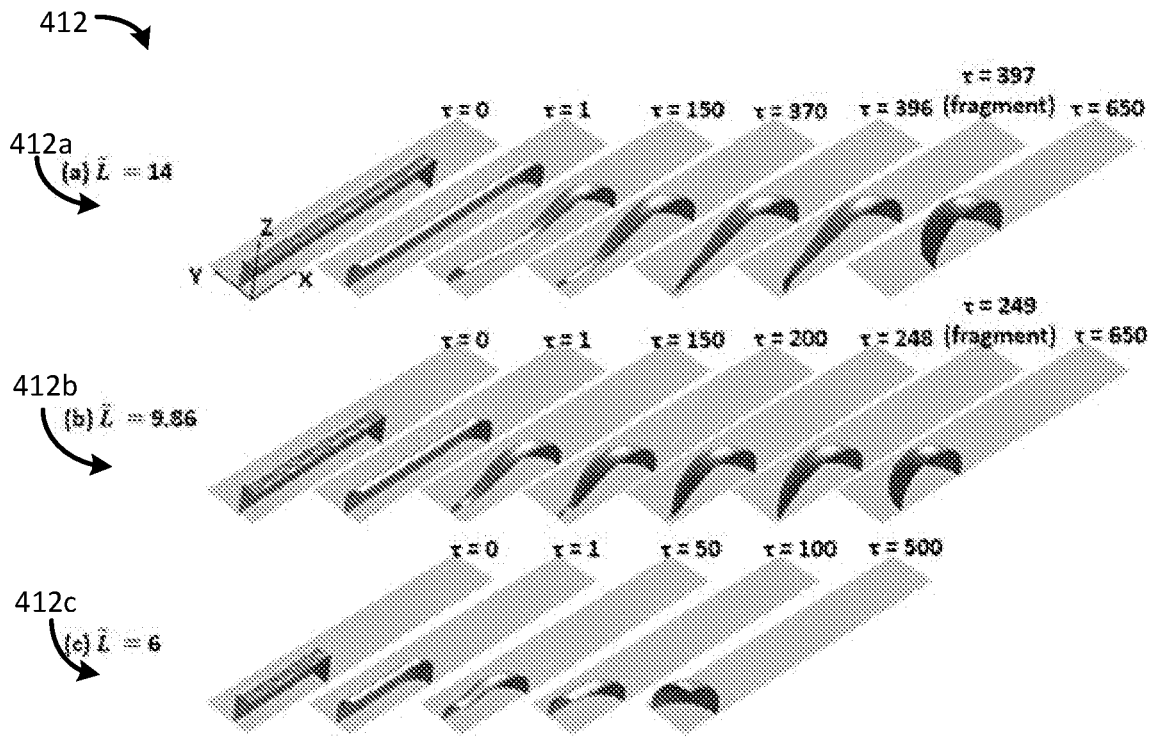
Figure 4.4
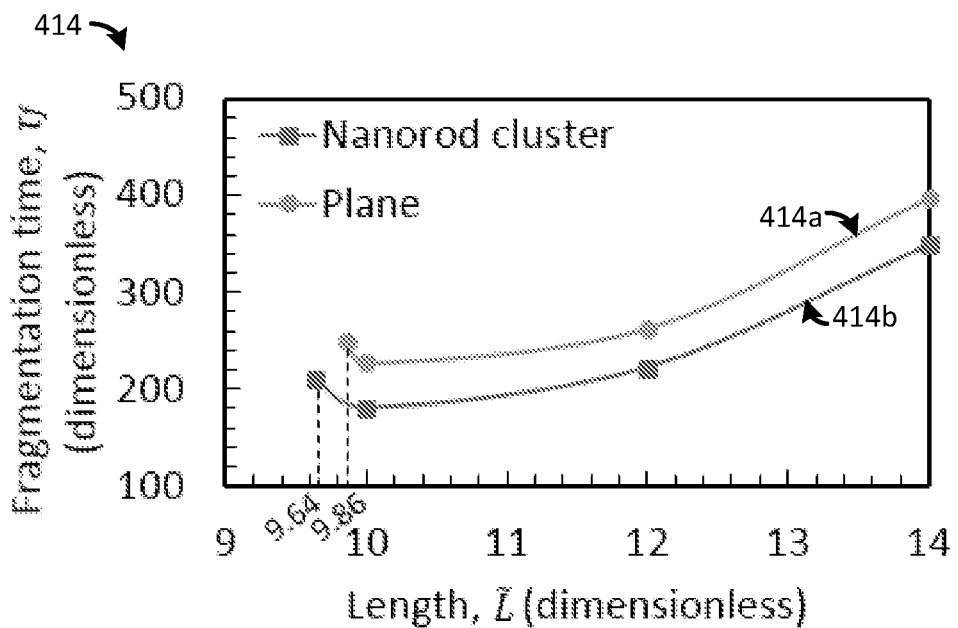
Figure 4.5

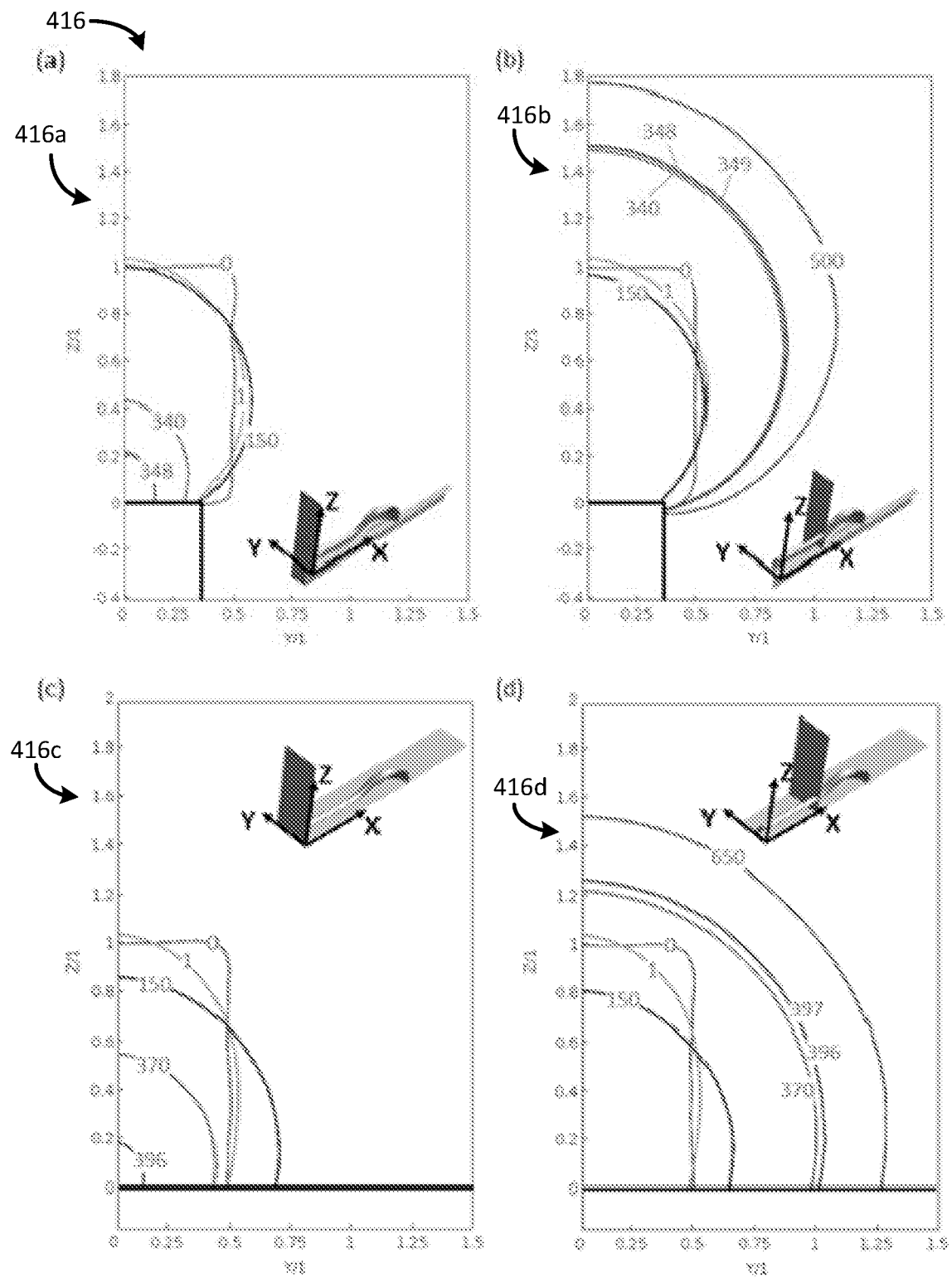
Figure 4.6

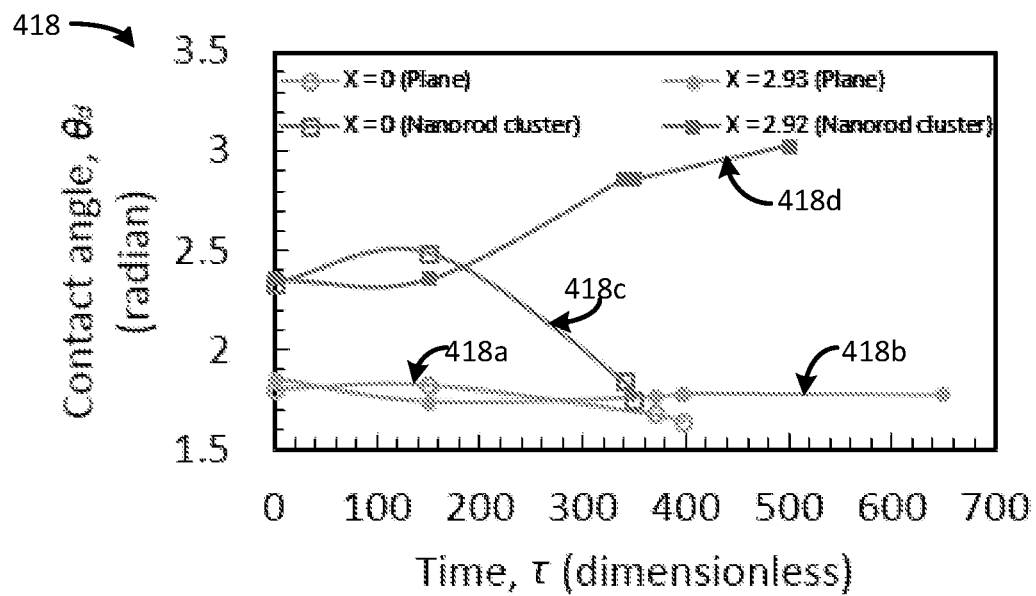
Figure 4.7
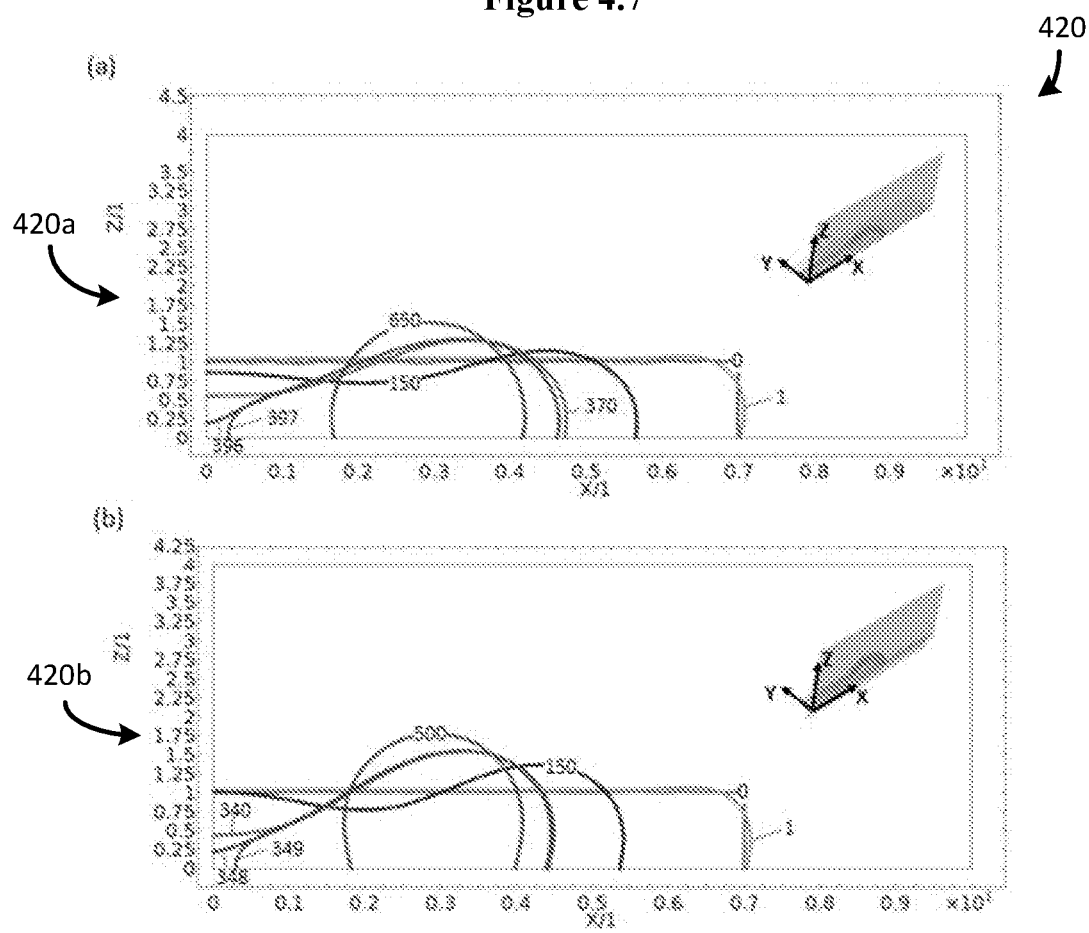
Figure 4.8

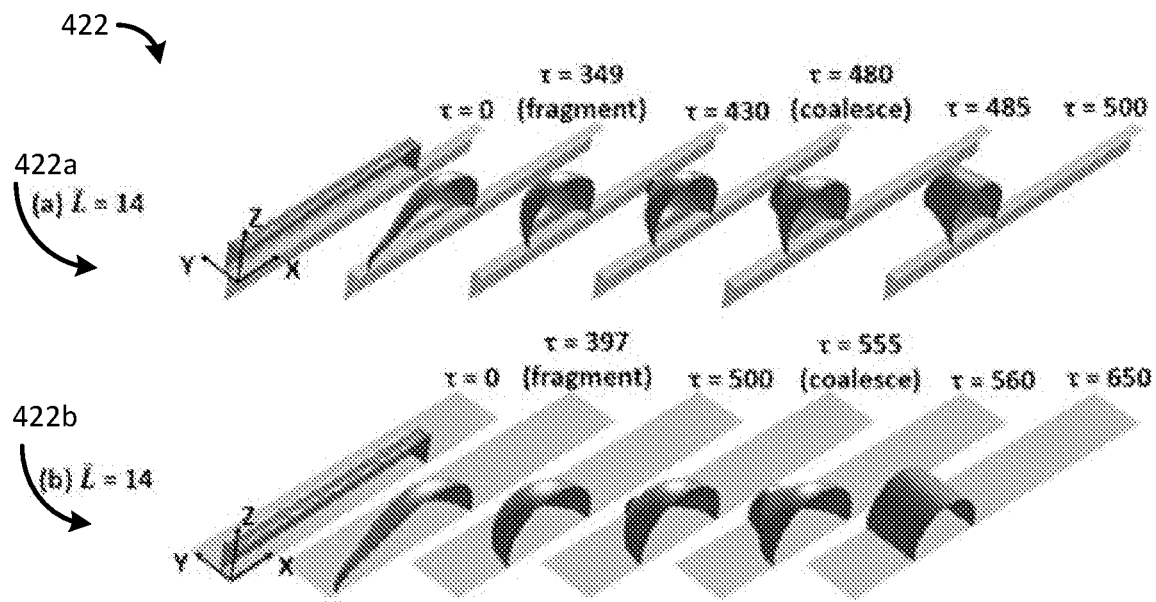
Figure 4.9
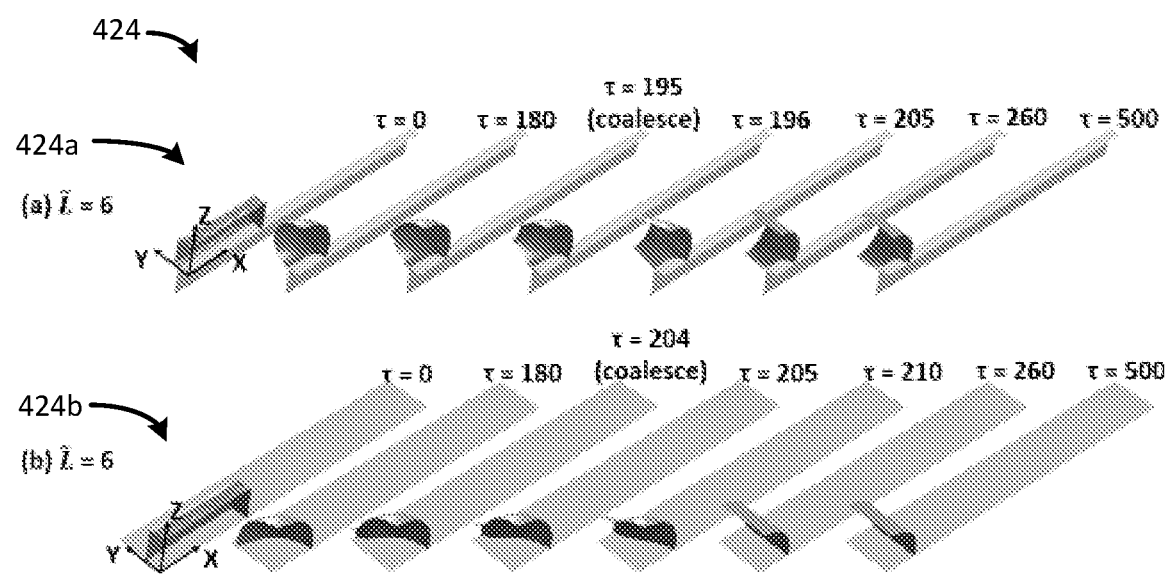
Figure 4.10

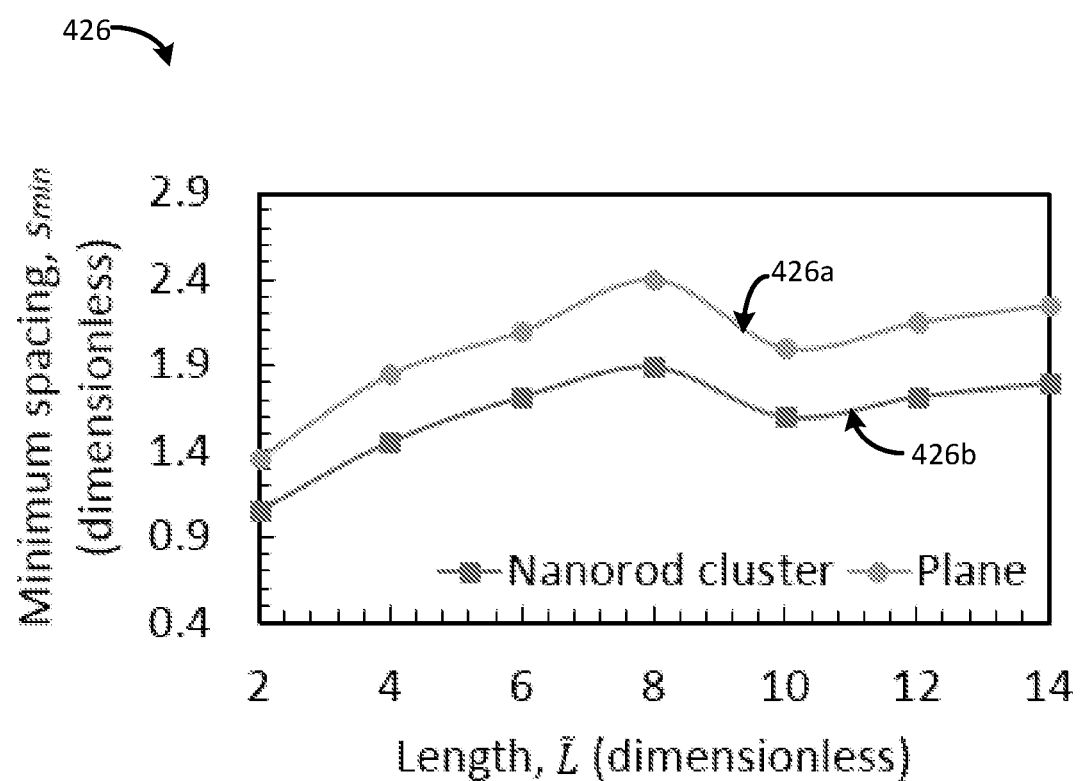
Figure 4.11

ZERO-INDEX PHOTONIC CRYSTALS FOR VISIBLE AND NEAR INFRARED APPLICATIONS

CROSS REFERENCE TO RELATED APPLICATION(S)

This application claims the benefit of U.S. Provisional Application No. 62/713,690, filed Aug. 2, 2018, which is incorporated by reference as if disclosed herein in its entirety.

GOVERNMENT LICENSE RIGHTS

This invention was made with government support under NSF grant number 1127731, awarded by the National Science Foundation. The government has certain rights in the invention.

FIELD

The present disclosure relates to photonic crystals, in particular to, zero-index photonic crystals for visible and near infrared applications.

BACKGROUND

A photonic crystal is a periodic optical nanostructure that can affect the motion of photons similar to the way that ionic lattices can affect electrons in solids. A photonic crystal may be configured to have target refractive index (RI). As is known, the refractive index may be complex with the imaginary part (extinction coefficient) related to loss. In one nonlimiting example, controlling the refractive index may be useful in LED (light emitting diode) applications where enhancing light-extraction efficiency and enabling emission pattern control are of interest. The emission pattern control of phosphors is of interest for LED technologies, because the activators doped in phosphors are dipole-type emitters which emit light isotropically. If there exists an optical structure with an RI equal or close to zero in the real part, light from these activators will be concentrated near-normal according to the Snell's law, thus both the external and internal quantum efficiency will be increased. The real part of RI (n) may be engineered to reach zero by a plurality of approaches. In one nonlimiting example, metallic resonant materials may be configured to realize zero or negative n. The imaginary RI of metals, i.e., the extinction coefficient (k), may be relatively large at optical frequencies and may become even larger as wavelength decreases. Thus, metal-based zero-index structures may be too lossy for applications at visible or near-infrared frequencies.

SUMMARY

In some embodiments, a two dimensional (2D) photonic crystal (PhC) structure includes a substrate and a periodic grating structure formed on the substrate. The periodic grating structure includes a plurality of gratings having a grating period, a. Each pair of adjacent gratings is separated by air. Each grating has a grating width, d, and includes a plurality of alternating layers of a first material and a second material. The first material corresponds to a high index material. The second material corresponds to a low index material. A ratio of a first refractive index of the first material to a second refractive index of the second material is greater than or equal to two. Each first material layer has a first thickness, t1. Each second material layer has a second thickness, t2. The 2D PhC structure has a structure refractive index at or near zero for a range of frequencies.

In some embodiments of the 2D PhC structure, the first material is TiO2 (titanium dioxide) and the second material is SiO2 (silicon dioxide). In some embodiments of the 2D PhC structure, the periodic grating structure is configured to receive TE (transverse electric)-polarized light. In some embodiments of the 2D PhC structure, the plurality of layers are formed using oblique angle deposition.

In some embodiments of the 2D PhC structure, the first material is TiO2 (titanium dioxide), the second material is SiO2 (silicon dioxide), a first deposition angle during formation of the layers of TiO2 is at or near 30° and a second deposition angle during formation of the layers of SiO2 is at or near 89°.

In some embodiments of the 2D PhC structure, the periodic grating structure includes five first material layers and four second material layers.

In some embodiments of the 2D PhC structure, the grating period is 600 nanometers (nm), the grating width is 270 nm, the first material is dense TiO2, the second material is porous SiO2, the first refractive index is 2.45, the second refractive index 1.05, the first thickness is 270 nm and the second thickness is 330 nm.

In some embodiments of the 2D PhC structure, the substrate comprises silicon. In some embodiments of the 2D PhC structure, the range of frequencies corresponds to at least one of visible and/or near-infrared wavelengths. In some embodiments of the 2D PhC structure, the 2D PhC structure is C4v symmetric.

In some embodiments, there is provided a method for forming a two dimensional (2D) photonic crystal (PhC) structure. The method includes depositing, by oblique angle deposition, a plurality of alternating layers of a first material and a second material onto a substrate to form a layered structure. The first material corresponds to a high index material. The second material corresponds to a low index material. A ratio of a first refractive index of the first material to a second refractive index of the second material is greater than or equal to two. Each first material layer has a first thickness, t1. Each second material layer has a second thickness, t2.

The method further includes patterning, by photolithography, a plurality of photoresist strips onto a top layer of the plurality of alternating layers. Each of the plurality of photoresist strips includes a photoresist soft mask. The method further includes depositing, by electron-beam evaporation, a solid material with thickness tmask onto the photoresist strips. The solid material corresponds to a hard etch mask. The method further includes selectively removing, by sonication, the photoresist soft mask, removing anisotropically, by dry etching, a plurality of portions of the layered structure; and stripping the hard etch mask to yield the 2D PhC structure. The 2D PhC structure has a structure refractive index at or near zero for a range of frequencies.

In some embodiments of the method, the first material is TiO2 (titanium dioxide) and the second material is SiO2 (silicon dioxide). In some embodiments of the method, the first material is TiO2 (titanium dioxide), the second material is SiO2 (silicon dioxide), a first deposition angle during deposition of the layers of TiO2 is at or near 30° and a second deposition angle during deposition of the layers of $SiO_2$ is at or near 89°.

In some embodiments of the method, the 2D PhC structure is configured to receive TE (transverse electric)-polarized light. In some embodiments of the method, the range of frequencies corresponds to at least one of visible and/or near-infrared wavelengths. In some embodiments of the method, the 2D PhC structure is C4v symmetric.

In some embodiments of the method, the 2D PhC structure includes a periodic grating structure formed on the substrate. The periodic grating structure includes a plurality of gratings having a grating period, a. Each pair of adjacent gratings is separated by air. Each grating has a grating width, d, and includes a plurality of alternating layers of the first material and the second material.

In some embodiments of the method, the grating period is 600 nanometers (nm), the grating width is 270 nm, the first material is dense TiO2, the second material is porous SiO2, the first refractive index is 2.45, the second refractive index 1.05, the first thickness is 270 nm and the second thickness is 330 nm.

In some embodiments of the method, the dry etching is performed according to a recipe. In some embodiments of the method, the recipe comprises a parameter selected from the group comprising ICP (inductively coupled plasma), RIE (reactive ion etching), pressure, He (helium) cooling, temperature, flow rate of CHF3 (Fluoroform) and flow rate of O2 (Oxygen).

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein:

FIG. 1.1 illustrates a diffusion-limited OAD (oblique angle deposition) and a diffusion-unlimited OAD:

FIG. 1.2 is a plot illustrating measured and fitted OAD film porosity as a function of deposition angle for $TiO_2$ OAD films;

FIG. 1.3 is a plot illustrating measured and fitted OAD film porosity as a function of deposition angle for $SiO_2$ (silicon dioxide) OAD films;

FIG. 1.4 is a sketch illustrating propagation of light with wavelength of λ from an environment with RI of $n_0$ through a 4-layer AR coating coated on a substrate with RI of $n_s$;

FIG. 1.5 illustrates three types of PhCs (photonic crystals);

FIG. 1.6 is a schematic diagram illustrating a top view of a 2D square-lattice PhC that includes a plurality of pillars surrounded by a base material:

FIG. 1.7 illustrates a schematic diagram of a 6-atom $C_{4v}$ molecule;

FIG. 1.8 is a sketch illustrating a solid state dewetting process that may occur via a diffusion of surface atoms:

FIG. 1.9 is a sketch illustrating a morphology evolution of a cylindrical structure during dewetting;

FIG. 1.10 illustrates one example electron beam evaporation system configured to perform oblique angle deposition, as described herein;

FIG. 2.1 is a plot of effective refractive indices, $n_x$ and $n_y$, (at 642 nm) as a function of deposition angle α and material ($TiO_2$ and $SiO_2$) along x-axis and y-axis;

FIG. 2.2 is a plot of normalized birefringence as a function of deposition angle α at 20642 nm:

FIG. 2.3 is a plot of the dispersion relation of extinction coefficients $k_x$ and $k_y$ versus wavelength in nanometers (nm) for $TiO_2$ films deposited at deposition angles from 75° to 85°;

FIG. 2.4 is a sketch illustrating structural models for a single nanorod and a nanospiral;

FIG. 2.5 is a schematic view illustrating a shadowing length, s, of a shadow region:

FIG. 2.6 illustrates an arrangement of nanostructures and a film plane;

FIG. 2.7 illustrates an FDTD (finite difference time domain) simulation setup, consistent with the present disclosure;

FIG. 2.8 illustrates a cross-sectional SEM (scanning electron microscopy) image and a top-down SEM image;

FIG. 2.9 illustrates a specular transmission spectrum of coated and uncoated YAG:Ce CPP;

FIG. 2.10 illustrates the results of BSDF measurement from a 633 nm red laser for incidence angles of 5, 10° and 15°, with and without AR coating;

FIG. 2.11 is a plot illustrating the specular transmission spectra simulated by FDTD and TMM;

FIG. 2.12 is a plot illustrating a comparison between a measured specular transmission spectrum and a simulated specular transmission spectrum, under unpolarized incident light;

FIG. 2.13 is a plot illustrating FDTD-simulated scattering spectra for the entire coating (nanospiral film) and for the $TiO_2$ layers alone;

FIG. 3.1 is a plot illustrating simulated far-field angular distributions of emissions from a dipole embedded in a vacuum and embedded in a 2.67 mm thick zero index PhC;

FIG. 3.2 is illustrates a zero-index PhC, consistent with several embodiments of the present disclosure;

FIG. 3.3 is a plot illustrating an FDTD-simulated TE band structure for the PhC of FIG. 3.2;

FIG. 3.4 illustrates an endview of the PhC of FIG. 3.2 and corresponding FDTD-simulated field patterns of eigenmodes near the triple-band-degeneracy frequency 973 nm;

FIG. 3.5 is a plot illustrating an effective refractive index for the PhC of FIG. 3.2 in the wavelength region of 900-990 nm;

FIG. 3.6 is a plot illustrating an FDTD-simulated angle-dependent transmission spectrum of PhC structure, configured with the structural parameters of Table 3.1:

FIG. 3.7 illustrates a flowchart of a fabrication procedure of a PhC, consistent with several embodiments of the present disclosure;

FIG. 3.8(a) is an SEM image showing a cross-sectional view of 30° $TiO_2$OAD film deposited on 89° $SiO_2$ OAD film;

FIG. 3.8(b) is a top-down SEM image illustrating the absence of cracking:

FIG. 3.9 illustrates one example DBR structure and a cross-sectional SEM image of the obtained DBR-Si;

FIG. 3.10 is a SEM image of an ITO hard mask-patterned DBR-Si after etching for 6800 seconds with Recipe 1;

FIG. 3.11 is a SEM image of an ITO hard mask-patterned DBR-Si after etching for 4000 seconds with Recipe 2;

FIG. 4.1 illustrates top-down SEM views of as-deposited samples and annealed samples;

FIG. 4.2 are sketches illustrating the simulation domain for a system that includes periodic TiO2 nanorod cluster supported gold aggregates and continuous planar TiO2-supported gold aggregates;

FIG. 4.3 illustrates the temporal evolution of the morphology of solid-state, cuboid-shaped gold aggregates when $s > s_{min}$, for a $TiO_2$ nanorod cluster substrate;

FIG. 4.4 illustrates the temporal evolution of the morphology of solid-state, cuboid-shaped gold aggregates when $s > s_{min}$, for a planar $TiO_2$ substrate;

FIG. 4.5 is a plot illustrating fragmentation time $\tau_f$ as a function of the initial length of gold aggregates for planar substrate and for nanorod cluster substrate;

FIG. 4.6 are sketches 416 illustrating temporal migration of the $TiO_2$-gold-air contact line on $TiO_2$ nanorod cluster in the plane of X=0 and X=2.92; and on continuous planar $TiO_2$ in the plane of X=0 and X=2.93;

FIG. 4.7 is a plot of temporal evolution of the contact angle on continuous, planar $TiO_2$ in the plane of X=0 and X=2.93 and on $TiO_2$ nanorod cluster in the plane of X=0 and X=2.92;

FIG. 4.8 are sketches (plots) illustrating temporal migration of $TiO_2$-gold-air contact line on continuous, planar $TiO_2$ and $TiO_2$ nanorod cluster:

FIG. 4.9 are sketches illustrating a sequence of events leading to the coalescence and merging between $TiO_2$ nanorod cluster-supported and continuous, planar $TiO_2$-supported gold aggregates with the initial dimension of $\tilde{H}=1$ and $\tilde{W}=1$ and aggregate length, $\tilde{L}=14$;

FIG. 4.10 are sketches illustrating a sequence of events leading to the coalescence and merging between $TiO_2$ nanorod cluster-supported and continuous, planar $TiO_2$-supported gold aggregates with the initial dimension of $\tilde{H}=1$ and $\tilde{W}=1$ and aggregate length, $\tilde{L}=6$; and FIG. 4.11 is a plot illustrating a minimum spacing to prohibit coalescence, $s_{min}$, as a function of the initial length of NP aggregates for the planar substrate and the nanorod cluster substrate.

DETAILED DESCRIPTION

The interaction between light and matter is not only dependent on the chemical composition of the matter, but also on the size and topology. Nanotechnology supports the development of modern optics by enabling structuring matter at an atomic scale with engineering techniques. Oblique angle deposition (OAD), a fabrication technique used in physical vapor deposition systems, may be utilized for the fabrication of nanostructured thin films. OAD allows the realization of arbitrary film porosity, and thus a continuous spectrum of refractive index. The ability to control refractive index is useful in LED (light emitting diode) applications where enhancing light-extraction efficiency and enabling emission pattern control are of interest. Additionally and/or alternatively, nanocolumnar thin films fabricated by OAD may be utilized in the study of interfacial phenomena. Surface topology of these nanocolumnar thin films affects wetting or dewetting mechanisms of the supported materials. By supporting noble-metal nanoislands onto the nanocolumns, noble-metal nanoparticle arrays may be produced on the nanocolumns by letting the nanocolumn tips mediate the dewetting process.

This disclosure includes five main sections: (1) introduction, (2) fabrication and simulation of nanospiral-structured graded-index anti-reflection coatings for enhanced light extraction of white LEDs, (3) zero-index photonic crystals for visible and near-infrared applications, (4) solid-state dewetting of gold aggregates/islands on $TiO_2$ (titanium dioxide) nanorod structures grown by oblique angle deposition and (5) summary and future work. The first section (Introduction) includes background technical information configured to aid understanding of subsequent sections. The second and third sections disclose using OAD method to fabricate sculptured thin films with engineered refractive indices, and applying the product films to address some challenges in the LED applications. The fourth section discloses how the surface topology of OAD films could possibly mediate solid-state dewetting.

In the second section, a zig-zag nanospiral-structured graded-index anti-reflection coating was fabricated on the top surface of a YAG:Ce (Cerium (Ce) doped Yttrium aluminum garnet (YAG)) ceramic phosphor plate (CPP) in the effort of enhancing its transmission in the normal direction. The anti-reflection coating enhances the normal-direction transmission of YAG:Ce CPP over the visible-light region of the spectrum. At 764 nm, the transmission is enhanced by 7.82%, compared to the potential maximum enhancement of 8.53%. For 633-nm light incident at 5° the reported coating is measured to induce a scattering loss of no greater than 1.27%.

In the third section, a lossless, zero-index photonic crystal structure configured to enable the emission-pattern control near 920 nm is disclosed. The feasibility of fabricating the designed structure with OAD method is described including a description of a prototype.

In the fourth section, fabrication of a composite film made of a stable, gold nanoparticle array with well-controlled separation and size on the top a nanocolumnar $TiO_2$ OAD film is disclosed. The fabrication of the nanoparticle array is based on governing the solid-state dewetting of as-deposited gold aggregates on the $TiO_2$ nanorods with Rayleigh-instability. The topology of $TiO_2$ nanorod tips may induce contact line pinning and increase the contact angle along the vapor flux direction to the supported gold aggregates, and dewetting dynamics will therefore act differently on $TiO_2$ nanorod tips than on a featureless, planar $TiO_2$. Contact line pinning and contact angle increase may inhibit the coalescence between dewetting geometries and facilitate the instability growth on the supported materials, which makes nanocolumnar OAD films as desired templated substrates to govern Rayleigh-instability and produce monodisperse NPs.

1. Introduction

In this section, concepts that support the understanding of the theories, fabrication methods, analysis and results presented in this disclosure are introduced.

1.1 Oblique Angle Deposition

Oblique angle deposition (OAD) is a fabrication technique used in physical vapor depositions (PVD) to engineer thin films that include spatially-distributed nanocolumnar structures. OAD may be conducted in PVD systems (e.g., electron-beam evaporation, thermal evaporation and sputtering) by tilting the substrate to make the incident vapor flux arrive at an oblique angle. The phenomenon enabling OAD, the shadowing effect, is triggered in this way to create voids between initial film nuclei which later grow into separated, nanocolumnar structures. The growth of separated nanocolumns with OAD is conditional, because shadowing effect competes with diffusion of ad-atoms during deposition. The growth of nanocolumnar films may be successful when the deposited atoms have limited mobility. Unlimited surface diffusion of ad-atoms on the substrate may result in a complete loss of surface area as the film attempts to reduce its free energy.

FIG. 1.1 illustrates a diffusion-limited OAD 100 and a diffusion-unlimited OAD 110. Substrates 108 are mounted at a tilted angle α which is defined as the angle between the substrate's normal 109 and the direction of the vapor flux. When diffusion of ad-atoms is limited 100, shadowing effect is most clearly rendered. At an initial film growth stage 102, incoming particles land on the substrate 108 and nucleate to form islands with different heights. As the deposition proceeds 104, taller islands receive more of the particle flux and obstruct the view of lower neighboring areas 106, therefore gradually transforming the islands into columns with little deposition in the space between columns. In comparison, when diffusion of ad-atoms is unlimited 110, ad-atoms are able to migrate 112 over a long distance on the substrate, so they will be quickly captured by existing nuclei 114. The nuclei may then broaden laterally and may eventually merge 116.

Thus, the films obtained from the two processes may be in different morphologies. The diffusion-limited OAD produces porous, columnar films, while diffusion-unlimited OAD produces films comprising oblate aggregates, or sometimes dense films by letting aggregates coalesce.

Thus, nanostructured noble metal films may more challenging to produce than oxides as noble metals generally have high surface diffusivities even at room temperature while oxides have low diffusivities even at elevated temperatures. Multi-layer oxide OAD films have been reported. By employing dynamic control of substrate motion, vertical nanorods, slanted nanorods, zig-zag nanospirals, helical nanospirals and other forms of OAD nanocolumns may be made from oxides and assembled in a bottom-up manner in a single run of OAD.

OAD of noble metals are relatively more challenging and relies on control of the deposition conditions to suppress surface diffusion. To prevent the as-deposited columns from deforming, post-deposition treatments should be applied to suppress dewetting. For these reasons, OAD films with complex structures are generally made by oxides rather than noble metals. Multi-layer stacks of metal and oxide/metal OAD films are relatively less common. For example, due to the high surface diffusion, a noble metal (gold) deposits may tend to form large aggregates on the substrate (silicon wafer) during OAD. The substrate temperature is roughly at room temperature as wafer cooling system maintains the chamber temperature around 18° C.

1.2 Models Describing the Film Porosity of OAD Films

When OAD is used to deposit films under the condition of limited surface diffusion, models derived based on the ballistic shadowing effect may be applied to predict film porosity with deposition material and deposition angle $\alpha$. Since the shadowing effect is increasingly strong with increasing deposition angle, the OAD film porosity increases with increasingly slanted deposition angles. Different mathematical models may quantitatively describe this trend. Tait's model in Eq. (1.1) was derived based on a geometrical model. OAD film density $\rho$ is established as a function of deposition angle $\alpha$, without incorporating any material-dependent or diffusion-dependent fitting parameters. Another model proposed by Poxson is given in Eq. (1.2). It was derived based on ballistic shadowing effect. In Poxson's model, surface diffusion and properties of deposition materials are reflected as fitting parameter c.

$$\rho = \rho_0 \frac{2\cos\alpha}{1+\cos\alpha}, \quad (1.1)$$

$$P = \frac{\alpha\cos\alpha}{c + \alpha\cos\alpha}, \quad (1.2)$$

where $\alpha$=deposition angle, $\rho$=OAD film density, $\rho_0$=density of film deposited at 0° and c=fitting parameter, P=OAD film porosity.

Though Poxson's model has made improvement to Tait's model by taking into account the deposition material properties, both Poxson's and Tait's model assume the film deposited at 0° is dense. However, based on an ellipsometry measurement on $TiO_2$ OAD films deposited at 0°, it was found that $TiO_2$ film deposited at 0° contains 16.05% of porosity. The porous nature of OAD films deposited at 0° is also supported by results from the literature. A model by Riley is configured to account for the porosity inside the 0° OAD film. Riley modified Poxson's model by adding another fitting parameter A to the numerator which gives:

$$P = \frac{A + \alpha\cos\alpha}{c + \alpha\cos\alpha}, \quad (1.3)$$

The parameter A represents the porosity of film deposited at 0° ($\alpha$=0). Eq. (1.3) may be utilized to fit the OAD film porosity as a function of deposition material and deposition angle $\alpha$.

FIG. 1.2 is a plot 120 illustrating measured 122 and fitted 124 OAD film porosity as a function of deposition angle for $TiO_2$ OAD films. FIG. 1.3 is a plot 121 illustrating measured 123 and fitted 125 OAD film porosity as a function of deposition angle for $SiO_2$ (silicon dioxide) OAD films. In one nonlimiting example, fitting data to Eq. 1.3 with least mean-square-error and constraining A≥0 and c≥0 yields A=0.279 and c=16.219 for $SiO_2$ OAD films.

1.3 OAD Film Porosity and Effective Medium Approximation

Porosity and the refractive index of OAD films may be related by an effective medium approximation (EMA), among which Bruggeman EMA is the most popular. OAD films are considered to satisfy the condition of EMA by containing inclusions much smaller than the operational wavelength so that substantial scattering is absent inside the film. Thus, the film may behave effectively as a continuum that possesses an averaged refractive index termed the effective refractive index.

Biaxial Bruggeman EMA is a more general form of isotropic Bruggeman EMA with an account of the directional dependence of effective refractive index in the algorithm. The biaxial anisotropy is addressed in biaxial Bruggeman EMA by including a set of screening factors. The screening factors describe the directional dependent ability of an optical medium to screen the applied field. For mixture medium, it depends on the shape as well as the alignment of the inclusions in the medium. If the inclusions are ellipsoids described by semi-axis l, m and n, screening factor of an individual ellipsoidal particle may be related to its shape through the expression:

$$\kappa_j = \frac{1-D_j}{D_j}, \quad j = l, m, n \quad (1.4)$$

where $D_j$ is the depolarization factor along semi-axis j with $\Sigma D_j=1$. $D_j$ is inversely proportional to $L_j/\Sigma_j$, where $L_j$ is the length of semi-axis j. So, if $L_l > L_m > L_n$, $\kappa$ of the particle is maximum along semi-axis n and minimum along semi-axis l. The particle's directional dependent screening property may enter the medium only if the particles are aligned, so that the relative dimension may not be averaged out. In the case of OAD films where columnar inclusions are elongated ellipsoid-like and are collectively oriented towards the vapor flux direction, it may be deduced that the shape and collimation of inclusions will affect the screening behavior of the entire film. For a porous film with porosity f, biaxial Bruggeman EMA calculates the film's effective refractive index along direction i, $n_{\mathit{eff},i}$, by $$f \frac{n_a^2 - n_{\mathit{eff},i}^2}{n_a^2 + \kappa_i n_{\mathit{eff},i}^2} + (1-f) \frac{n_b^2 - n_{\mathit{eff},i}^2}{n_b^2 + \kappa_i n_{\mathit{eff},i}^2} = 0, \quad i = x, y, z, \tag{1.5}$$

where $n_a$ and $n_b$ are the refractive index of air and base material, respectively; $\kappa_i$ is the screening factor of the film along direction i; and x, y and z are orthogonal coordinate axes along which the electric field vector of the incident light will be aligned. In a special case, where the film is composed by randomly distributed spherical inclusions, $\kappa_i$ will be equal to 2 along three directions, then the biaxial Bruggeman EMA will reduce to isotropic Bruggeman EMA.

1.4 Fresnel Reflection and Graded-Index Anti-Reflection Coatings 1.4.1 Fresnel Reflection and Anti-Reflection Coatings When light is traveling from a first optical medium with a first refractive index (RI) of $n_1$ to a second optical medium with a second RI of $n_2$, reflection will happen at the interface where the RIs mismatch. Such reflection caused by RI mismatch is termed as Fresnel reflection. For light incident on the interface at a normal angle (with respect to the interface), the reflection power R may be determined by the Fresnel equation:

$$R = \left(\frac{n_1 - n_2}{n_1 + n_2}\right)^2. \tag{1.6}$$

It may thus be understood that the reflection power will increase as index mismatch increases.

An anti-reflection (AR) coating is a kind of optical structure which may be introduced to the surface of an optical medium to reduce the surface reflection. AR coatings may be made into different forms. Depending on the number of layers, there may be single-layer or multi-layer AR coatings. Depending on the density of the coating, there may be dense and porous/patterned AR coatings. The AR coatings may be classified into two categories based, at least in part, on their respective working principles. For example, a first subset of AR coatings may be configured to reduce index mismatch at the interface. In another example, a second subset of AR coatings may be configured to bend and trap light by surface patterns on a size scale comparable to the operational wavelength. This disclosure includes the first subset of AR coatings.

FIG. 1.4 is a sketch 130 illustrating propagation of light with wavelength of $\lambda$ from an environment with RI of $n_0$ through a 4-layer AR coating 132 coated on a substrate 134 with RI of $n_s$. A total amplitude reflection coefficient at each interface between adjacent layers i and j, $R_{ij}$, is a vector which is given by:

$$R_{ij} = |R_{ij}| \exp(-2(\delta_i + \delta_j)), \tag{1.7}$$

where $$|R_{ij}| = \left|\frac{n_i - n_j}{n_i + n_j}\right|$$

is the amplitude of $R_{ij}$, $\delta_i = 2\pi n_i \cos \theta_i \, d_i/\lambda$ is the phase thickness of layer i, $\theta_i$ is refraction angle, and $d_i$ is the physical thickness of layer i.

The total amplitude reflection coefficient of the entire assembly is given by:

$$\begin{aligned}R = R_{01} + R_{12} + R_{23} + R_{34} + R_{4s} = \\ |R_{01}| + |R_{12}| \exp(-2\delta_1) + |R_{23}| \exp(-2(\delta_1 + \delta_2)) + \ldots\end{aligned} \tag{1.8}$$

By carefully selecting the thickness and RI of each constituent layer, an efficient multi-layer AR coating may be achieved configured to minimize R over a plurality of wavelengths and incident angles.

1.4.2 Graded-Index Anti-Reflection Coatings

Graded-index anti-reflection coatings are multi-layer AR coatings which work by reducing the index mismatch. They are generally effective in reducing Fresnel reflection over a broad range of wavelengths and incident angles compared to the conventional single-index AR coatings. Graded-index AR coatings generally have an RI profile that varies continuously from the substrate index to the ambient medium index. Graded-index AR coatings are configured to reduce the Fresnel reflection by gradually reducing the index mismatch and inducing destructive and constructive interference in the reflected and transmitted beams, respectively. Usually, the ambient medium is air with a RI close to 1, but no naturally existing solid is available in the region of 1-1.38 ($MgF_2$) to match the air's RI. This gap may restrict the performance of graded-index AR coatings, but recently the barrier has been overcome by nanostructure fabrication technologies. Various fabrication techniques exist that may produce ultra-low index materials with a RI close to 1 (e.g., a sol-gel method, oblique angle deposition method and etching). These ultra-low index materials are generally porous, in which pores are mixed into bulk materials to lower their RIs.

1.5 Photonic Crystals 1.5.1 Photonic Crystals and 2D Photonic Crystals

Photonic crystals (PhCs) are optical structures that are periodically structured to mimic the ionic lattices of solids. PhCs may affect the propagation of photons similar to the effect of ionic lattices on electrons. FIG. 1.5 illustrates three types 131, 133, 135 of PhCs. The types are related to periodicity. A first type of PhC 131 is periodic in one dimension ("1D") having alternating slices of two materials 131a, 131b. A second type of PhC 133 is periodic in two dimensions ("2D") having alternating columns of two materials 133a, 133b. A third type 135 is periodic in three dimensions ("3D") having alternating cubes of two materials 135a, 135b. PhCs are generally designed to form a photonic band gap. As is known, a photonic bandgap corresponds to a wavelength region where the propagation of light is forbidden along certain directions within the PhC.

2D PhCs, e.g., PhC 133, generally contain two base materials, each with a different RI. To achieve the photonic band gap, a rule-of-thumb is that an index contrast between the RIs of the two base materials should be no smaller than 2, i.e., should be greater than or equal to 2. Example topologies of 2D PhCs include, but are not limited to, periodic high-index pillars surrounded by low-index material and low-index pillars "drilled" into high-index materials.

FIG. 1.6 is a schematic diagram illustrating a top view 140 of a 2D square-lattice PhC that includes a plurality of pillars, e.g., pillar 142, surrounded by a base material 144. The 2D square-lattice PhC 140 includes structural parameters $a_1$, $a_2$, $n_h$, $n_l$, and d, where:

i. $a_1$ and $a_2$ are lattice constants along two periodic directions and which represent the spacing between neighboring pillars;

ii. $n_h$ and $n_l$ are the RIs of high-index base material (e.g., pillar 142) and low-index base material (e.g., base material 144), respectively; and iii. d is a length dimension of a pillar. In one nonlimiting example, the length corresponds to side length of a cuboid pillar. In another nonlimiting example, the length corresponds to a diameter of a cylindrical pillar.

1.5.2 $C_{4v}$ Symmetry

FIG. 1.7 illustrates a schematic diagram 150 of a 6-atom $C_{4v}$ molecule. The term $C_{4v}$ is generally used in molecule topology where it is defined to classify molecules with certain topological symmetry. Molecules with $C_{4v}$ symmetry possess (1) a symmetry axis, e.g., axis 152, around which a 90° rotation results in a molecule indistinguishable from the original molecule. Molecules with $C_{4v}$ symmetry further possess (2) a symmetry plane, e.g., plane 156, parallel with the symmetry axis 152. Examples of $C_{4v}$ molecules include $XeF_4$ (xenon tetrafluoride) and $IF_5$ (iodine pentafluoride). Removing a first atom 154 located along the axis of symmetry 152 will yield a 5-atom $C_{4v}$ molecule. Comparing the planar projection of $C_{4v}$ molecules to a "plus sign" might be more intuitive to describe the characteristics of these molecules.

1.5.3 $C_{4v}$-Symmetric 2D PhCs

PhC pillars may be mapped to atoms in the molecules and material between neighboring pillars may be mapped to molecular bonds. $C_{4v}$-symmetric 2D PhCs may then be defined as PhCs whose lattice constants are equal along x- and y-axis ($a_1=a_2$). The cross-section of pillars may be generally square or generally circular in shape. Materials between neighboring pillars may have equal RI along x- and y-axis. As used herein, "generally" when applied to a shape or dimension means that shape or dimension to within a tolerance.

1.6 Solid-State Dewetting and Rayleigh Instability

Total free energy of a system is the sum of its surface free energy and bulk free energy. Surface energy (i.e., interfacial energy) is contributed by surface atoms. Surface atoms experience atomic forces from half space, so they are imbalanced and act as a reservoir of potential energy. Surface energy is proportional to surface area, thus, reducing surface area may reduce system total free energy. An as-deposited structure may become agglomerated over time and may eventually spheroidize. The process of agglomeration and spheroidizing is termed dewetting and it is driven by the minimization of system total free energy. Dewetting may occur whether the film is in a liquid or solid state. It happens spontaneously via surface diffusion and/or bulk diffusion of atoms. At temperatures well below the melting point of the material, solid-state dewetting happens through the diffusion of surface atoms. According to Gibbs-Thomson relation, chemical potential of surface atoms is proportional to the local surface curvature as:

$$\Delta\mu = K\gamma\Omega, \quad (1.7)$$

where $\Delta\mu$=local excess chemical potential, K=local surface curvature, γ=surface energy (assumed isotropic) and Ω=atomic volume. The gradient of chemical potential (i.e., surface local curvature) drives the diffusion of surface atoms, a process that may eventually transform the film into a single sphere.

FIG. 1.8 is a sketch 160 illustrating a solid state dewetting process that may occur via a diffusion of surface atoms. Sketch 160 includes a first sketch 162, corresponding to prior to dewetting, and a second sketch 164 corresponding to post-dewetting. Sketches 162, 164 include a substrate 161 and respective films 163*a*, 163*b*. The first sketch 162 further includes a plurality of surface atoms 165 of a lower local curvature (and relatively lower p) and a plurality of surface atoms 167 of a higher local curvature (and a relatively higher p). The solid state dewetting process may occur via diffusion of surface atoms 165 and 167. Surface diffusion may be initiated by atoms 167 located at a position of higher local curvature (and thus higher chemical potential). As the high-potential atoms 167 diffuse towards low-potential atoms 165, the film deforms 163*b*.

A capillary phenomenon called Rayleigh instability may develop on the surface before a sphere may form. Rayleigh instability arises from infinitesimal perturbations which may exist in a range of sinusoidal eigenmodes. A growing Rayleigh instability has at least one growing eigenmode and one fastest-growing eigenmode, while a decaying Rayleigh instability has no growing eigenmode. If Rayleigh instability grows, perturbation of the fastest-growing eigenmode will amplify and fragment the dewetting film into a chain of spherical particles spaced with its characteristic wavelength before the spheroidization completes. Otherwise, all infinitesimal perturbations decay and the film becomes a single spherical particle.

The growth or decay of the instability depends on the initial geometry of the structure. Selected geometries may support growing instability eigenmodes. For example, for free-standing cylinders, cylinders whose axial length/diameter ratio is greater than 7.2 support growing instability eigenmodes. Suppressing the dewetting and Rayleigh instability is helpful in many situations, but properly manipulating the characteristics of the instability may also turn the unwanted effects into useful fabrication techniques. Specifically, the Rayleigh instability is favorable for the fabrication of ordered NP arrays, because the fragmentation process helps to distribute the total mass equally in space with a characteristic spatial frequency.

FIG. 1.9 is a sketch 170 illustrating a morphology evolution of a cylindrical structure during dewetting. Sketch 170 includes a first sketch 172, corresponding to Rayleigh unstable geometry (i.e., growing Rayleigh instability) and a second sketch 174, corresponding to Rayleigh stable geometry (i.e., decaying Rayleigh instability). The Rayleigh unstable geometry 172 includes a cylindrical structure 171 with width (i.e., diameter) 2R and length, L1, and thus an initial length/radius ratio of L1/R. The Rayleigh stable geometry 174 includes a cylindrical structure 173 with width (i.e., diameter) 2R and length, L2, and thus an initial length/radius ratio of L2/R. Both geometries 172, 174 may be perturbed 175. In the unstable geometry 172, the perturbation grows 176 resulting in a chain 177 of cylinder fragments (i.e., spherical particles) with a maximum separation of λmax, corresponding to a fastest growing wavelength. In the stable geometry 174, the perturbation decays 178 and the cylinder spheroidizes 179 resulting in a single, relatively large spherical particle.

1.7 Setup of Electron-Beam Evaporation System

FIG. 1.10 illustrates one example electron beam evaporation system 180 configured to perform oblique angle deposition, as described herein. In one nonlimiting example, the electron beam evaporation system 180 may correspond to a Temescal electron-beam evaporation system (available from FerroTec® Corporation, Temescal Division, Livermore, Calif., USA). However, this disclosure is not limited in this regard. System 180 includes a platform 182 and a substrate mount 184 coupled to the platform 182 via an azimuthal rotation motor 186. A surface 185 of the substrate mount is generally parallel to a surface of the platform. The azimuthal rotation motor 186 is configured to rotate the substrate mount 184 with respect to the platform 182, while maintaining the generally parallel orientation of the substrate mount 184 and the platform 182. System 180 further includes a tilt stepper motor 188 configured to rotate the platform 182, substrate mount 184 and azimuthal rotation motor 186 assembly to adjust a deposition angle, $\alpha$.

The substrate mount 184 is configured to receive a substrate 194. The substrate 194 may then be mounted on the substrate mount surface 185 with a substrate surface 195 parallel to the substrate mount surface 185. A substrate normal 196 may then be defined as a direction perpendicular to the substrate surface 195.

System 180 includes an electron beam source 190 and an evaporation source 192. The electron beam source 190 is configured to produce an electron beam and to provide the electron beam to the evaporation source 192. The evaporation source 192 is configured to provide a vapor flux 198 to the substrate 194. The vapor flux 198 may be oriented at the deposition angle, $\alpha$, with respect to the normal to the substrate, i.e., with respect to the substrate normal 196.

The system 180 may be configured to operate at an ultra-high vacuum at low to medium $10^{-7}$ Torr. System 180 may include or may be included in a chamber 181. Cooling water pipes may be wired around the chamber's hearth to maintain the chamber temperature approximately at 18° C. Evaporation source 192 is contained in a crucible liner that sits inside a pocket located at the bottom of the chamber 181. Substrates, e.g., substrate 194, are mounted at the top the chamber 181 with their surface 195 facing downwards. A high-energy electron beam ("e-beam") is generated by a filament, i.e., electron beam source 190, located beneath the chamber's bottom. The electron beam is steered by a magnetic field to bombard the evaporation source 192 inside the crucible. The temperature of the evaporation source 192 increases with e-beam power. Once the e-beam power reaches a certain point, the source 192 will start to melt and generate the vapor flux 198 that travels towards the top of the chamber. As the vapor flux 198 reaches the substrate 194, a film is developed on the substrate 194 (i.e., on the substrate surface 195).

To achieve an OAD, the substrate 194 is mounted at an oblique angle with respect to the evaporation source 192. The deposition angle, $\alpha$, may be defined as the angle between the substrate's normal 196 to the substrate surface 195 and the direction of the vapor flux 198. The two in-situ stepper motors 186, 188 are built into the system 180 to dynamically control the substrate mount's horizontal tilt angle $\alpha$ and azimuthal rotation angle during deposition. In one nonlimiting example, the motors 186, 188 may be configured to shut down at a processing temperature greater than 155° C.

2. Fabrication and Simulation of Nanospiral-Structured Graded-Index Anti-Reflection Coatings for Enhanced Light Extraction of White LEDs A graded-index anti-reflection coating comprising six layers of $TiO_2$ and $SiO_2$, zigzag, nanospirals were fabricated on a top surface of a YAG:Ce ceramic phosphor plates by OAD using an e-beam system in an effort to enhance its transmission in the normal direction. The RI dispersion relation of the constituent layers was investigated using ellipsometry so that a transfer matrix method could be used to simulate the system. 3D finite-difference time-domain (FDTD) simulations were carried out to investigate the morphology dependence of the optical properties of the obtained coating. To reduce computation expense and better understand the morphology-property relation, a simulation model was developed in conformance with film growth mechanism and was used for finite-difference time-domain modeling.

2.1 Introduction

In phosphor-converted white LEDs, the YAG:Ce phosphor works as the conversion element using photoluminescence. It provides broadband yellow emission by absorbing part of the blue light incident on the chip and converting it into yellow for transmission. YAG:Ce ceramic phosphor plates (CPPs), as a new type of commercial phosphor, have been gaining interest due to their advantages in high-luminance and high-power applications. With minimized interior index contrast and high thermal conductivity, YAG:Ce CPPs may address some of the problems encountered in conventional powder-based phosphors, including, for example, scattering loss and heat accumulation. New challenges also arise as YAG:Ce CPPs introduce an interface between themselves and the ambient medium. Due to the index mismatch at the YAG:Ce/air interface, part of the emission arriving at the interface may be reflected into the LED package by Fresnel reflection. The reflection loss degrades the extraction efficiency of the LED and hinders the application of YAG:Ce CPPs. Thus, the introduction of optical structures that are capable of eliminating the Fresnel reflection and enhancing the forward transmission of YAG:Ce may be beneficial for the application of YAG:Ce CPPs. A multi-layer graded-index AR coating on the surface of YAG:Ce CPP, consistent with the present disclosure, may be configured to address the problem of Fresnel reflection.

2.1.1 Selection of Fabrication Method, Base Materials, Index Profile and Coating Structure As described herein, e.g., in Section 1.4.2, graded-index anti-reflection coatings may be relatively more effective in reducing Fresnel reflection over a broad range of wavelengths and incident angles compared to the conventional single-index AR coatings. Compared to other fabrication techniques, OAD has the following advantages that make it more attractive for engineering grade-index AR coatings: 1) the porosity of OAD films is tunable by tuning deposition angle, i.e. the RI of the film is tunable by deposition angle; 2) the capability of producing high porosity enables OAD to produce films with RI lower than the natural limit of 1.38; 3) RI of OAD films may be predicted based on deposition angle and material with the models introduced in Section 1.4.2, making it an engineering-friendly method; 4) OAD films are composed of columnar structures that are on the nanometer scale in width, so scattering loss should be low in these films; 5) OAD is relatively simple and low-cost, and allows for large-area fabrication using a wide range of materials. Excellent anti-reflective performance of OAD-grown graded-index AR coatings has been reported. An OAD technique implemented in an electron-beam evaporation system may be used to engineer a multi-layer graded-index AR coating.

$SiO_2$ and $TiO_2$ (at 550 nm, $n_{SiO2} \approx 1.46$, $n_{TiO2} \approx 2.54$ for amorphous phases, respectively) show little absorption and relatively low chromatic dispersion in the visible light region, and are applicable in electron-beam system where the OAD technique is implemented. These properties make them appropriate base materials in the OAD process for engineering optical coatings with an arbitrary refractive index between YAG:Ce and air as long as the processing temperatures stay below 600° C. to avoid a titania phase transition from rutile to anatase.

The anti-reflection performance of the AR coating may be theoretically determined based on the index profile of the coating, which gives the value of the refractive index at a given position. For multi-layer AR coatings, a plurality of algorithms (e.g., linear algorithm, quintic algorithm and Gaussian algorithm) may be capable of effectively reducing the reflection over a broad spectrum. In the present disclosure, a Gaussian index profile was selected as it predicts relatively better anti-reflection performance for light incident at normal direction. The equation of Gaussian index profile is given as $$n = n_{YAG:Ce} + (n_{air} - n_{YAG:Ce}) \exp(-6.25(t-1)^2), \quad (3.1)$$

where $n_{YAG-Ce}$=refractive index of YAG:Ce, $n_{air}$=refractive index of air, n=refractive index at position t of the AR coating and t=normalized thickness.

In order to build a Gaussian index profile, a series of OAD films with RI between YAG:Ce ($n_{YAG:Ce} \approx 1.82$) and air ($n_{air} \approx 1$) may be engineered based on an appropriate choice of base materials and deposition angles.

The AR coating may be structured as zigzag nanospirals by changing the growth direction of slanted nanorods via a dynamic control of the substrate orientation during the deposition. For example, the deposition angle may be altered symmetrically with respect to the substrate normal over a set period of time. Thus, the growing slanted nanorods may change their growth direction periodically and produce a zigzag nanospiral structure. Compared to a single-direction slanted nanorod structure, a zigzag nanospiral structure is relatively more damage-resistant. The zigzag nanospiral structure may then offset an undesired "wedging" effect in film thickness that may be encountered in nanorod-structured OAD films as the direction of the wedges is frequently altered.

2.1.2 Establish the Relation Between Refractive Index of OAD Films and Deposition Angle/Material To construct a Gaussian profile, or any other index profile, with OAD films in a continuous, bottom-up deposition, the preparation work prior to the deposition includes constructing a refractive index database. The refractive index database is configured to provide a relation between the refractive index of OAD films and the deposition angle and material. A constituent OAD layer may be selected during deposition based, at least in part on the relation between the refractive index of OAD films and the deposition angle and material.

This relation may be established by making $TiO_2$ and $SiO_2$ OAD depositions at angles ranging from 0° to 89° to get dummy samples, and measuring the film porosity and effective refractive index with ellipsometer. The deposition condition of these dummy samples were kept as close to that of the YAG:Ce CPP coating as possible.

In the ellipsometry study on constituent OAD films, the films were treated generally as biaxial materials and their porosity and RI dispersion relation were modeled using biaxial Bruggeman EMA introduced in equation (1.5). Here, the base material is $TiO_2$ or $SiO_2$; and the coordinate axes x, y and z were defined in the same way as will be shown in FIG. 2.6 so that the index definition will be consistent with the electric-field vectors of normal-incident light. X-axis is aligned with the direction of the vapor flux, which is also the nanorod tilt direction, and y-axis is perpendicular to x-axis in the film plane and z-axis is normal to the film plane.

FIG. 2.1 is a plot 200 of effective refractive indices, $n_x$ and $n_y$, (at 642 nm) as a function of deposition angle α and material ($TiO_2$ and $SiO_2$) along x-axis and y-axis. In particular, a first curve 201 corresponds to $TiO_2$ $n_x$, a second curve 202 corresponds to $TiO_2$ $n_y$, a third curve 203 corresponds to $SiO_2$ $n_x$ and a fourth curve 204 corresponds to $SiO_2$ $n_y$, $n_z$ is omitted as light incident along normal direction does not experience $n_z$. Over a wavelength range of 410 nm to about 760 nm, $n_x$ and $n_y$ for $TiO_2$ OAD films generally decrease slightly as the wavelength increases and decrease relatively more significantly as the deposition angle increases (e.g., approximately 2.2 to 1.4 for angles 0° to 89° at a wavelength of approximately 550 nm). Over the wavelength range of 410 nm to about 760 nm, $n_x$ and $n_y$ for $SiO_2$ OAD films remain approximately constant and decrease as deposition angle increases (e.g., approximately 1.47 to 1.13 for angles 0° to 89°). Measured film porosity was illustrated in FIG. 1.2 and FIG. 1.3 as a function of deposition angle.

FIG. 2.1 (i.e., plot 200) shows, for both $TiO_2$ and $SiO_2$ OAD films, effective RIs decreasing with increasing deposition angle as film porosity is increasing. FIG. 2.1 (i.e., plot 200) shows both $TiO_2$ and $SiO_2$ OAD films may exhibit biaxial anisotropy, as evidenced by unequal to $n_x$ and $n_y$. The inequality relation between $n_x$ and $n_y$ is directly related to the morphology of the AR coating. Individual slanted nanorods show directional dependent ability of screening the electric field because the dimension of nanorods is directional dependent; and the anisotropy of slanted nanorods components enters the AR coating due to the collective alignment of components.

FIG. 2.2 is a plot 206 of normalized birefringence as a function of deposition angle α at 642 nm for $TiO_2$ OAD films and $SiO_2$ OAD films. To quantify the degree of biaxial anisotropy, the normalized in-plane birefringence for the films may be defined as $$\frac{n_y - n_x}{n_x}.$$

$TiO_2$ OAD films whose effective RI is above $n_{YAG:Ce} \approx 1.82$ are omitted. FIG. 2.2 (i.e., plot 206) includes normalized birefringence for $TiO_2$ OAD films 207 and normalized birefringence for $SiO_2$ OAD films 208. As illustrated by FIG. 2.2 (i.e., plot 206), the birefringence of $TiO_2$ OAD films is stronger than the birefringence of $SiO_2$ OAD films. Higher birefringence of $TiO_2$ OAD films is related to the relatively high dielectric constant of $TiO_2$. Higher dielectric constant indicates a stronger matter-field interaction, so $TiO_2$ OAD films are more sensitive to the polarization state of the applied field. The takeaway message from here is that, for a given refractive index, lower anisotropy could be achieved by using denser OAD films made from low-index materials.

FIG. 2.3 is a plot 210 of the dispersion relation of extinction coefficients $k_x$ and $k_y$ versus wavelength in nanometers (nm) for $TiO_2$ films deposited at deposition angles from 75° to 85°. The extinction coefficients were studied in the ellipsometry measurement, as described herein. $TiO_2$ films deposited from 75° to 85° may be used to build an AR coating with Gaussian index profile on YAG:Ce CPPs. $k_x$ and $k_y$ represent the extinction coefficient experienced by the normal-incident light polarized along x- and y-direction, respectively. As the bandgap of $SiO_2$ is sufficiently far from the visible light region (around 9.3 eV or 133 nm) so as not to cause discernable absorption, $SiO_2$ films were not included in the study.

FIG. 2.3 (i.e., plot 210) includes six curves 211, 212, 213, 214, 215, 216 of extinction coefficients, $k_x$ or $k_y$, versus wavelength for $TiO_2$ films for three deposition angles (75°, 80° and 85°). Curves 211 and 212 correspond to $k_x$ and $k_y$, respectively, at deposition angle 75°. Curves 213 and 214 correspond to $k_x$ and $k_y$, respectively, at deposition angle 80° Curves 215 and 216 correspond to $k_x$ and $k_y$, respectively, at deposition angle 85°.

FIG. 2.3 (i.e., plot 210) illustrates that $TiO_2$ films absorb weakly in the visible light region, and the absorption is stronger at shorter wavelengths. In previous studies, an indirect bandgap of 3.5 eV (354 nm) was determined for $TiO_2$ films deposited under the same condition. As an indirect-bandgap material. $TiO_2$ absorbs photons with energy below the bandgap in a continuous manner until the photons' energy becomes sufficiently low. Therefore, it may be seen in FIG. 2.3 (i.e., plot 210) that absorption remains discernible at shorter visible wavelengths and becomes increasingly negligible at longer wavelengths. Films deposited at higher deposition angles absorb less than films deposited at lower angles due to the presence of less absorbing matter. In summary. AR coatings composed of $TiO_2$ and $SiO_2$ OAD films will exhibit slightly different index profiles under different polarization states of the light as well as slight optical absorption, both of which will be mainly contributed by $TiO_2$ layers.

2.2 Experimental Methods 2.2.1 Deposition Conditions

A YAG:Ce CPP (1 cm×1 cm×260 μm, provided by OSRAM® SYLVANIA, Wilmington, Mass., US) was used as the substrate. An electron-beam evaporation system (Temescal) was used to fabricate the AR coating on the YAG:Ce CPP by OAD. The schematic of the deposition system was shown in FIG. 1.10, as describe herein. A stepper motor was used to dynamically control the substrate mount's horizontal tilt angle during deposition. The motor was designed to shut down at the processing temperature higher than 155° C. 99.9% pure $TiO_2$(CERAC) and 99.999% pure $SiO_2$ (International Advanced Materials) were used as the deposition sources. Prior to deposition, the substrates were sequentially sonicated in baths of acetone, ethanol and deionized water for ten minutes, followed by a deionized water rinse and nitrogen blow-dry. A piece of silicon wafer was used to prepare "witness" samples for scanning electron microscope (SEM) imaging. The substrate was first fixed onto the silicon wafer piece, and then mounted to the system. The system pressure reached $10^{-7}$ Torr before deposition and was kept stable around $2 \times 10^{-5}$ Torr and $10^{-6}$ Torr during the deposition of $TiO_2$ and $SiO_2$, respectively. The chamber temperature was kept approximately at room temperature during deposition by cooling water, and the substrate temperature was not actively monitored. During the deposition, no motor malfunction was observed, so that the substrate temperature was ensured to be far below the titania phase transition temperature. The deposition rate was fixed at 1 Å/sec and 2 Å/sec for the deposition of $TiO_2$ and $SiO_2$, respectively. The deposition rate and deposited thickness were monitored by an in-situ quartz crystal microbalance. The source material, deposition angle and thickness of each layer were controlled according to the recipe listed in Table 2.1

TABLE 2.1

Materials and deposition angles used for engineering the AR coating.

| Constituent layer | Material YAG:Ce | Deposition angle (degree) | Targeted thickness (nm) 2.60E5 |
|---|---|---|---|
| 1 | $TiO_2$ | 75 | 34 |
| 2 | $TiO_2$ | −75 | 34 |
| 3 | $TiO_2$ | 80 | 24 |
| 4 | $TiO_2$ | −80 | 24 |
| 5 | $TiO_2$ | 85 | 44 |
| 6 | $TiO_2$ | −85 | 44 |
| 7 | $SiO_2$ | 70 | 64 |
| 8 | $SiO_2$ | −70 | 64 |
| 9 | $SiO_2$ | 80 | 64 |
| 10 | $SiO_2$ | −80 | 64 |
| 11 | $SiO_2$ | 89 | 128 |
|  | Air |  |  |

2.2.2 Characterization and Optical Measurements

The RI dispersion relations for each constituent layer were established by separately fabricating the individual layers beforehand on silicon substrates under the same deposition conditions. Ellipsometry was employed to measure the RI of each separate layer using a variable-angle spectroscopic ellipsometer (VASE, J.A. Woollam Co, Inc.). The morphology of the obtained AR coating was characterized by field-emission SEM (SUPRA, Carl Zeiss AG) of the "witness" samples after platinum sputtering. The total transmission spectra of both coated and uncoated YAG:Ce CPPs were measured using a Perkin Elmer Lambda 900 spectrometer equipped with a Labsphere PELA-1000 integrating sphere at normal incident angle with an unpolarized source in the wavelength range of 400-800 nm. To determine the scattering loss, bi-directional scattering distribution (BSDF) measurements were performed on the coated and uncoated YAG:Ce CPPs with a customized setup. Horizontally polarized laser at wavelength of 633 nm was incident on the uncoated side of the CPP, and light signal was collected by rotating detector arm about the sample over a range of ±175°. The measurement was repeated by holding the sample at different angles and letting beam incident at 5°, 15°, and 25° off normal.

2.3 Optical Modeling

Graded-index AR coatings may be studied by the transfer matrix method (TMM). Treating multi-layered AR coatings as a multi-layered stack of 1D homogeneous films, TMM provides a start for designing and fitting the index profiles of AR coatings. Geometrical simplifications made by TMM rely on experimental results on real films for RI dispersion relations of all the constituent layers. Neglecting the morphological information (e.g., interior index contrast and interface roughness) also limits TMM to specular transmittance and reflectance calculations. In comparison, the finite-difference time-domain (FDTD) method may directly generate nearly complete results based on the film's morphological information without having to conduct characterization experiments on each constituent layer a priori. In this sense, FDTD may be utilized as a tool for studying the morphology-dependent properties of the AR coating, something which is not possible by TMM.

2.3.1 Finite-Difference Time-Domain Modeling
Structural Model for FDTD Modeling

FIG. 2.4 is a sketch 220 illustrating structural models for a single nanorod 221 and a nanospiral 222. It may be appreciated that the nanospiral 222 may be modeled as a two arm assembly of two nanorods 221a, 221b. A finished AR coating is a two-material nanospiral structure assembled by slanted nanorods, as described herein. The structural model of the AR coating was built by first defining individual nanospiral components. $TiO_2$ and $SiO_2$ nanospirals, e.g., nanospiral 222, were modeled as two-arm assemblies of slanted nanorods, e.g., nanorods 221a, 221b. The nanorods 221, 221a, 221b are represented by parallelepipeds with a generally square undersurface 223. Though the actual nanospirals possess more rounded profiles at their sides and tips, minute features like edges and corners in the modeled structure are too small to interact with the incident light effectively and may cause substantial discrepancy in modeling results.

Several parameters were defined to describe the dimension of nanospiral 222 components: 1) a, a side length of the bottom surface; 2) h, a height of the nanorod, e.g., nanorods 221, 221a, 221b, of each layer; and 3) θ, an oblique angle. The magnitudes of these parameters may be obtained by analyzing a number of SEM images with image processing software (ImageJ) and taking an average over multiple measurements.

An in-plane distribution of nanospirals within each layer may then be defined. In some situations, the actual in-plane distribution data may be restored with image tracing tools so that the modeled structure is most consistent with the actual structure. However, such approach lacks generality and may be too computationally expensive. One example setup may be configured to balance the geometrical consistency with the actual structure and computation expense.

FIG. 2.5 is a schematic view 224 illustrating a shadowing length, s, of a shadow region 225. A taller surface object 226 with a height, h, may cast a shadow in the shadow region 225 on a substrate 227 along a direction 228 of vapor flux. The shadow in the shadow region 225 may then terminate growth of shorter surface objects, e.g., surface objects 229a, 229b, falling in the shadow region 225.

As indicated by the characterization results, the in-plane distribution of nanospirals appears random. However, it has been reported that OAD films are actually quasi-periodic: the distribution of inter-nanostructure spacing converges to a limit once the film thickness reaches a critical value. The nature of the quasi-periodicity may be explained by the development of the "shadowing length", s, during film growth. Shadowing length is referred to as the lateral length of the region 225 shadowed by taller surface objects, e.g., surface object 226, along the direction 228 of the incoming vapor flux. The shadowing length may fluctuate during the initial stage of film growth, and approach a constant as the film growth proceeds, giving the resultant film a uniform inter-nanostructure spacing along the direction 228 of vapor flux. The concept of the shadowing length was validated in models where it was used to predict the film porosity. It was demonstrated that the magnitude of the shadowing length is determined by the deposition angle, α, and material. Along the direction perpendicular to the vapor flux, however, the shadowing length is not applicable, as the shadowing growth is not strong enough to define inter-nanostructure spacing by deposition conditions. Instead, a "bundling" phenomenon was discovered for the arrangement of nanostructures in many studies for various OAD films: nanostructures grow in a connected and misaligned manner, forming a chain-like association.

FIG. 2.6 illustrates an arrangement 230 of nanostructures, e.g., nanostructures 231a, 231b, . . . and a film plane 232. Arrangement 230 corresponds to an in-plane arrangement of nanostructures within each constituent layer. Using rectangular coordinates, an x-axis and y-axis lie in the film plane 232 and the z-axis is normal to the film plane 232. The shadowing length concept may be adapted to define the in-plane arrangement of nanospirals. The vapor flux 233 is incident obliquely in the xz-plane 232, giving rise to shadowing growth in this plane 232. Shadowing growth may dominate the nanostructure growth in this plane 232, while leaving the nanostructure growth subject to bundling association in yz-plane. Following the spatially anisotropic shadowing growth mechanism, it was defined that nanospirals were spaced by an equal distance, d, along the x-axis, corresponding to a well-defined shadowing length. Nanospirals were connected along the y-axis with a random alignment. d was defined a function of deposition angle, α, and material, which may be extracted from the measured film porosity and nanospiral width. In the last step, all the monolayers were stacked along the z-direction to accomplish the structural model for the multi-layered graded-index AR coating. In summary, the geometrical parameters input for building the structural model for the obtained AR coating are listed in Table 2.2.

TABLE 2.2

Geometrical parameters used for building
the structural model for the reported AR coating.

| Layer YAG:Ce | Deposition condition | Nanostructure height h (nm) | Nanostructure width a (nm) | Nanostructure tilt angle θ (degree) | Nanostructure spacing d (nm) |
| --- | --- | --- | --- | --- | --- |
| 1 | 75° $TiO_2$ | 52 | 16.000 | 55 | 13 |
| 2 | −75° $TiO_2$ | 48 | 16.000 | −53 | 13 |
| 3 | 80° $TiO_2$ | 33 | 16.000 | 56 | 18 |
| 4 | −80° $TiO_2$ | 32 | 16.000 | −53 | 18 |
| 5 | 85° $TiO_2$ | 57 | 16.000 | 53 | 25 |
| 6 | −85° $TiO_2$ | 42 | 16.000 | −52 | 25 |
| 7 | 70° $SiO_2$ | 66 | 14.424 | 57 | 5 |
| 8 | −70° $SiO_2$ | 67 | 14.424 | −56 | 5 |

TABLE 2.2-continued

Geometrical parameters used for building
the structural model for the reported AR coating.

| Layer YAG:Ce | Deposition condition | Nanostructure height h (nm) | Nanostructure width a (nm) | Nanostructure tilt angle θ (degree) | Nanostructure spacing d (nm) |
|---|---|---|---|---|---|
| 9 | 80° SiO$_2$ | 59 | 14.424 | 54 | 10 |
| 10 | −80° SiO$_2$ | 62 | 14.424 | −55 | 10 |
| 11 | 89° SiO$_2$ | 129 | 14.424 | 49 | 34 |
| Air | | | | | |

FDTD Simulation Setup

FIG. 2.7 illustrates an FDTD simulation setup 235, consistent with the present disclosure. 3D FDTD modeling was carried out using FDTD simulator (available from Lumerical Solutions, Inc., Vancouver. BC, Canada). A polarized plane-wave source 236 in the wavelength range of 400-800 nm was incident on the coated side 237 of the YAG:Ce CPP 238 at a normal incident angle and propagated towards the −z-direction. Both x-polarized and y-polarized sources were employed in the simulation. Transmission and reflection were monitored by field monitors 239, 240 placed inside the YAG:Ce CPP 238 and above the AR coating 237, respectively. Periodic boundary conditions were imposed along x- and y-directions and perfectly-matched-layer (PML) boundary conditions 241a, 241b were applied along z-direction. By treating YAG:Ce CPP as semi-infinite in the simulation, reflection at its bottom surface is neglected. This may be corrected by subtracting the bottom-surface reflectance from the as-obtained transmittance.

2.3.2 Transfer Matrix Method Modeling

TMM (Transfer Matrix Method) was used to model the specular transmission spectrum of the reported coating. The structural model adopted in TMM modeling is a multi-layered stack of 1D slabs. Each slab represents the homogenized form of a nanostructured layer. The thickness of each constituent slab is the only required geometric parameter, whose value is taken from Table 2.2. RIs and extinction coefficients input for each slab are based on data from ellipsometry measurements. TMM modeling was carried out using Scout (available from WTheiss Hardware and Software, Aachen, Germany).

2.4 Results and Discussion 2.4.1 Morphology of the Zig-Zag Nanospiral-Structured AR Coating FIG. 2.8 illustrates a cross-sectional SEM image 243 and a top-down SEM image 244. SEM images 243, 244 demonstrate that a well-defined two-material nanospiral-structured coating was successfully developed. No delamination was observed between TiO$_2$ and SiO$_2$ layers in the multi-material AR coating. It has been reported that the lateral width of nanostructures composing OAD films will broaden as the film becomes thicker. Column broadening may increase scattering loss and change the areal density of the nanostructures, so it is unwanted for optical applications. However, no obvious column broadening along the growth direction may be observed from the SEM images 243, 244. It is believed that the fine division of layer thickness helped to suppress the broadening effect. The cross-sectional SEM image shows that the nanospirals were grown in a connected manner from the bottom layer to the top layer. Studies have revealed that the surface of OAD films is in a rough morphology. The extruding tips of existing nanospirals might have played the role of seed patterns that limit the growth of upcoming nanospirals on top of them.

FIG. 2.9 illustrates a specular transmission spectrum 245 of coated 246 and uncoated 247 YAG:Ce CPP. The strong absorption of the blue excitation source due to the 4f-5d band transition of Ce$^{3+}$ ions is clearly seen around 460 nm. At longer wavelengths, the bare YAG:Ce is transparent, showing a relatively high transmittance of around 80.5%. Based on the refractive index of undoped YAG, a maximum value of theoretical transmission for YAG in air is predicted to around 82.94%, and therefore an ideal AR coating could enhance the transmission by 8.53% at each interface. Some scattering induced by the interior structure of the YAG:Ce is likely to have contributed to the rest of the 2.44% optical loss. By fabricating nanospiral-structured AR coatings on the top surface of YAG:Ce CPP to reduce the index contrast and induce constructive interference in transmitted beams, the transmission of YAG:Ce CPP is seen to be enhanced over broad visible light spectrum and reaches 88.32% at 764 nm.

FIG. 2.10 illustrates the results of BSDF measurement from a 633 nm red laser for incidence angles of 5°, 10° and 15°, with (solid lines) and without (dotted lines) AR coating. Reflections from frontside and backside of the sample were captured. Results indicate that, by coating the YAG:Ce CPP with the AR coating, as described herein, the specular reflection is greatly reduced compared to YAG:Ce CPP without AR coating. However, measurement of the specular forward transmission is limited by the low resolution of the setup which is only 1°. Therefore the enhancement in the specular transmission is not quite discernable in the graph.

Table 2.3 summarizes the reflection results in FIG. 2.10 and gives the predicted Fresnel reflection value for parallelly-polarized, 633-nm light source incident on uncoated YAG:Ce CPP. Results here indicate that the AR coating may essentially reduce all the theoretical reflection caused by Fresnel reflection, which demonstrates that the anti-reflection properties are of high quality. One may notice that BSDF signal appears deviated from the specular direction a bit. This deviation from the theoretical Fresnel prediction may be related to the fact that scattering of the AR coating and scattering of YAG:Ce CPP were both collected.

TABLE 2.3

Reflection as function of incidence angle of light source.

| Angle of incidence (degree) | Measured reflectivity - no coating | Reflection - coated region | Theoretical one-surface reflectivity |
|---|---|---|---|
| 5 | 0.1532 | 0.07263 | 0.0853 |
| 15 | 0.14013 | 0.0579 | 0.0795 |
| 25 | 0.09873 | 0.0554 | 0.0679 |

2.4.2 Optical Modeling

FIG. 2.11 is a plot 255 illustrating the specular transmission spectra simulated by FDTD and TMM. A first curve 256 corresponds to nanostructured model results for FDTD, x-polarized. A second curve 257 corresponds to nanostructured model results for FDTD, y-polarized. A third curve 258 corresponds to slab model results for TMM, x-polarized. A fourth curve 259 corresponds to slab model results for TMM, y-polarized.

The strong absorption by $Ce^{3+}$ band transition in the wavelength range of 400-550 nm was excluded in the simulations to better render the properties of the AR coating. Transmittance under x-polarized and y-polarized incident light were calculated. Taking the anisotropic index profile as input, TMM shows the AR coating exhibits polarization-dependent anti-reflective performance, which could be mostly attributed to the highly birefringent $TiO_2$ layers as was discussed in the previous section. The deviation between the polarized transmittance is higher at wavelengths shorter than approximately 600 nm due to stronger field-matter interaction, and gradually reduces as the wavelength increases. On the other hand, the results of FDTD modeling show, taking the morphology information of the model as input, that FDTD is also able to capture the polarization-dependent anti-reflective performance. It may be seen that the FDTD-simulated spectra match the TMM-simulated spectra well across the visible light region, except for the part below 550 nm under the x-polarized incident light. The discrepancy below 550 nm is likely to have been caused by the assumptions made in the FDTD model for features along the x-axis, as the effects of assumptions will be amplified when field-matter interaction is relatively strong at shorter wavelengths. Assumptions made in the structural model, including uniform inter-nanostructure spacing along x-axis and uniform nanostructure width as well as alignment of nanostructures along x-axis, could all lead to the modeling discrepancy.

FIG. 2.12 is a plot 260 illustrating a comparison between a measured specular transmission spectrum 261 and a simulated specular transmission spectrum 262, under unpolarized incident light. The polarized specular transmission spectra, simulated by FDTD, are averaged and compared with the measured specular transmission spectrum in the wavelength range of 550-800 nm. Transmittance below 550 nm is omitted due to the strong absorption. It may be seen that the spectrum simulated by FDTD agrees reasonably well with the measured spectrum. The discrepancy between the simulated and measured transmittances may be attributed to the geometrical simplification in the structural model. In the experiment, the assembly of constituent layers was done by a continuous bottom-up approach without any post-process treatment on the surface of the deposited layers. It is expected that the morphology, and thereby the RI of the upcoming layer, will be affected by the layer deposited underneath it to some degree, but the effect due to surface topology, is neglected in the FDTD model as it is difficult to collect this information during the experiment.

FIG. 2.13 is a plot 265 illustrating FDTD-simulated scattering spectra for the entire coating (nanospiral film) 266 and for the $TiO_2$ layers alone 267. To investigate the scattering loss induced by the AR coating itself, the scattering spectrum was simulated using the structural model in FDTD and the results were plotted. To separate the relative contribution by the two different base materials, the scattering spectra of $TiO_2$ layers were separately calculated and plotted for comparison. It is found that the scattering loss induced by the AR coating itself is negligible: scattering loss is less than 0.4% above 550 nm. Low scattering loss will help maintain a good collimation for the incident light propagating inside the AR coating, and thus constructive interference between transmitted beams may be achieved efficiently. The simulated scattering intensity is lower than 1% and it decreases as wavelength increases, indicating a Rayleigh-type scattering. By comparing the scattering intensity induced by the entire coating 266 with the $TiO_2$ layers 267, it was found that the major source of the scattering loss is the $TiO_2$ layers. This may be explained by the fact that high-index $TiO_2$ nanospirals possess a higher dielectric constant to interact with incident electric field effectively, and thus most of the incident light will be scattered by $TiO_2$ layers.

2.5 Conclusion

In this section 2, a zigzag nanospiral-structured graded-index AR coating was fabricated by OAD on the YAG:Ce CPP by e-beam evaporation. The AR coating enhances the normal-direction transmission of YAG:Ce CPP across a broad spectral range, and the maximum improvement reaches 7.82% at 764 nm, which closely approximates the potential maximum predicted by the Fresnel equation of 8.53%. BSDF measurement over multiple angles also confirms the AR coating is close to ideal. A geometrical model was developed for the obtained AR coating, and applied the model in an FDTD simulation to study the morphology dependence of the coating's optical properties including the polarization-dependent anti-reflective performance and scattering loss. The model was developed based on the shadowing growth mechanism. The simulated polarized transmission spectrum demonstrated that the model captures the polarization-dependent anti-reflective performance of the coating, according with the results obtained from ellipsometry. The simulated scattering spectrum also shows the coating induces weak scattering loss, which agrees with the BSDF measurement at 633 nm. $TiO_2$ layers in the coating contribute most to the polarization-dependent optical response and scattering. The low scattering loss renders the reported coating one of high quality. It is believed that the introduction of OAD-grown nanostructured AR coatings may be useful in mitigating reflection losses in devices that rely on YAG:Ce or similar CPPs. Study on the underlying effect of the coating also allows for designing light converters with enhanced extraction in broad spectral and angular propagation ranges.

3. Zero-Index Photonic Crystals for Visible and Near-Infrared Applications

3.1 Motivation

In this section 3, the application of OAD in the fabrication of near-lossless, zero-index photonic crystals (PhCs) is demonstrated. The emission pattern control of phosphors is of interest for LED technologies, because the activators doped in phosphors are dipole-type emitters which emit light isotropically. If there exists an optical structure with an RI at or near zero in the real part, light from these activators will be concentrated near-normal according to the Snell's law, thus both the external and internal quantum efficiency will be increased. As used herein, near of "at or near" means to within a tolerance of.

FIG. 3.1 is a plot 300 illustrating simulated far-field angular distributions of emissions from a dipole embedded in a vacuum 302 and embedded in a 2.67 mm thick zero index PhC 304. FIG. 3.1 (i.e., plot 300) illustrates a comparison between the far-field angular distribution of 920-nm light emitted by a dipole embedded in the vacuum 302 and in a zero-index PhC 304, as will be described in more detail below. The dipole is polarized with its electric field aligned with the PhC's pillar axis, and the PhC exhibits a zero RI exclusively near 920 nm. The spectrum is simulated by FDTD Solutions (Lumerical, Inc.). Emission from the dipole embedded in the vacuum 302 is isotropic, which is shown as a uniform power distribution across far-field detecting angles. In comparison, emission from the dipole embedded in the zero-index PhC 304 is concentrated to a narrow angular spread between −30° and 30°, indicating that the control of emission pattern of spontaneous emitters is achieved. It is contemplated that zero-index PhCs, consistent with the present disclosure, may be applied to other situations where dipole-type spontaneous emitters are involved, including, but not limited to, quantum dots and luminescent materials. Additionally or alternatively, zero-index PhCs may be utilized, for example, for controlling emission pattern of lasers, realization of lossless negative index in the visible and near-infrared frequencies, superlenses, particle cloaking, etc.

3.2 Introduction to Zero-Index Photonic Crystals

The real part of RI (n) may be engineered to reach zero by a plurality of approaches. In one nonlimiting example, metallic resonant materials may be configured to realize zero or negative n. The imaginary RI of metals, i.e., the extinction coefficient (k), may be relatively large at optical frequencies and may become even larger as wavelength decreases. Thus, metal-based zero-index structures may be too lossy for applications at visible or near-infrared frequencies. A zero n may be realized by an all-dielectric 2D PhC structure of $C_{4v}$ symmetry. By properly selecting structural parameters and base materials of an all-dielectric 2D PhC structure of $C_{4v}$ symmetry, a conical (Dirac) dispersion in the photonic band structure of the PhC may be achieved at some frequency $\omega_D$ under TE (transverse electric)-polarized light which induces zero n at $\omega_D$. For TE-polarized light, the electric field of the operational light is configured to be polarizing along the PhC pillar's axis.

An all-dielectric 2D PhC structure of $C_{4v}$ symmetry may be configured to realize a zero n, according to the following three characteristics:
  i. Triple band degeneracy is formed at the Γ point at some frequency $\omega_D$(Dirac-point frequency) in the photonic band structure of the PhC. The photonic band structure may then contain two linear bands forming a conical dispersion analogous to the Dirac cone in the electronic band structure of graphene, and a third flat band crossing the Dirac-like cone.
  ii. The triply degenerate state at the Γ point is derived from monopole and dipole excitations. In other words, the zero n is calculated by effective medium theories (EMTs) as the effective RI of the PhC at $\omega_D$ and EMTs are applicable when monopole and dipole excitations contribute to the eigenmodes at the Γ point. Otherwise, for example, if the eigenmodes near $\omega_D$ contain multipole excitations such as quadrupole excitations, the PhC may not be mapped to an effective medium with zero n even though its photonic band structure may exhibit a triply degenerate state.
  iii. If conditions i and ii are satisfied, EMT-based index-calculating algorithms may then be applied to the PhC to verify the realization of zero effective n near $\omega_D$. In one nonlimiting example, a scattering parameter (S-parameter) technique may be used to retrieve the effective n.

The above three characteristics may be achieved through selection of suitable base materials and adjusting the structural parameters of the PhC. The zero-n frequency, $\omega_D$, may then depend on the parameters selected.

3.3 Designing Zero-Index 2D PhCs for Applications at Visible and Near-Infrared Wavelengths The photonic band structure relies on a relatively high index contrast. RI affects the zero-n frequency $\omega_D$. A challenge in realizing a zero-index PhC for utilization in applications at visible and near-infrared wavelengths (400-1100 nm) primarily lies in the unavailability of transparent/low-absorption materials in nature that maintain both high index contrast and low absorption loss. Simulation studies indicate that an index contrast no smaller than 2 (i.e., index contrast greater than or equal to 2) and a number of repetition of pillars no smaller than 7 (i.e., a number of repetition of pillars greater than or equal to 7) may achieve the zero-index photonic band structure. For example, for a total span of the pillars of 2500 nm, the base materials may possess an absorption coefficient no larger than 0.0001 $nm^{-1}$ (i.e., an absorption coefficient less than or equal to 0.0001 $nm^{-1}$) to ensure that less than 20% of the light propagating within the PhC gets absorbed.

Considering dispersion relations of n and absorption coefficient for some common, naturally-occurring dielectric materials (e.g., Si, diamond, amorphous $TiO_2$, $Al_2O_3$, INGaAs, $SiO_2$, GaN, $Si_3N_4$, PMMA), the spread of n is relatively narrow for these non-/low-absorption naturally-occurring dielectric materials. For example, if a low-n $SiO_2$ (n=1.46 at 700 nm) is selected as the low-index base material, there does not appear to be a low-absorption material available to provide an n higher than 2.92. In the wavelength region of 400-1100 nm, the highest n (~2.45) may be provided by rutile $TiO_2$. Other dielectrics, e.g. silicon, may provide a higher n, but have a relatively high absorption coefficient, i.e., may be relatively lossy.

In an embodiment, air may be utilized as the low-index base material. The index contrast may then be achieved with $TiO_2$. In other words, replacing $TiO_2$ with some other lossy high-index materials may be avoided. Air may be configured to separate the pillars by the designed lattice constant along the lateral direction (x-direction in FIG. 1.6). Air may not be configured to connect the high-index pillars to form the $C_{4v}$-symmetric configuration from the bottom-up (y-direction in FIG. 1.6). As described herein, OAD may produce relatively low-index films whose n is lower than the natural limit of 1.38 if the deposition is made at highly glancing angles. The obtained porous films may provide an air-like n close to 1, as well as a columnar structure which may provide sufficient mechanical strength to connect high-index pillars from bottom-up. In an embodiment, these n≈1 OAD films may be combined with air as the low-index base material in the PhC to connect high-index pillars along two orthogonal directions.

FIG. 3.2 is illustrates a zero-index PhC 310, consistent with several embodiments of the present disclosure. For ease of description, FIG. 3.2 includes x, y and z axes defining an x, y, z coordinate system. The zero-index PhC 310 is configured to realize zero n in visible/near-infrared wavelengths. The zero-index PhC 310 includes a substrate 312 and a plurality of grating units 314a, 314b, 314c, . . . , 314m positioned on a surface 313 of the substrate 312 and separated by air. The surface of the substrate 313 may be generally planar and parallel to an yz plane. Each pair of adjacent grating units, e.g., grating units 314b and 314c, may be spaced by a grating period, a, in the y direction. Each grating unit, e.g. grating unit 314a, has grating width, d, in the y direction. Each grating unit, e.g. grating unit 314a, includes a plurality of alternating layers of layers of a first material 316a, ..., 316p and layers of a second material 318a, ..., 318q, stacked in the x direction. A first layer of the first material 316a has a layer thickness, t1, and a first layer of the second material 318a has a layer thickness, t2, measured in the x direction. In one nonlimiting example, the first material may include a dense $TiO_2$ and the second material may include porous $SiO_2$.

Unlike the generic 2D PhCs where pillars stand vertically on the substrate, the PhC 310 is rotated by 90° and posed on the substrate 312. It may be appreciated that zero-index PhC 310 has a similar form as a 1D grating in configuration, except that each of the grating unit contains several alternating layers rather than a single material along the x-direction. Rotation is due to the fact that zero n is applicable to TE-polarized light. By rotating the PhC by 90° compared to generic 2D PhCs, the transmitted light may be detected from the top of the PhC 310 rather than the edge. The structural parameters of the PhC 310 may be defined according to a grating structure as: a is the grating period along y-axis; $t_1$ and $t_2$ is individual layer thickness of dense $TiO_2$ and porous $SiO_2$ OAD film, respectively; d is the grating width along y-axis.

Structural parameters of the zero-index 2D PhC 310 may be determined by optical modeling with FDTD Solutions (Lumerical, Inc.). Results are listed in Table 3.1.

TABLE 3.1

Structural parameters of the proposed zero-index PhC.

| Structural parameter | Value |
| --- | --- |
| Grating period, a | 600 nm |
| Grating width, d | 270 nm |
| High-index base material (Material 1) | Dense rutile $TiO_2$ |
| Low-index base material (Material 2) | $SiO_2$ OAD film |
| Refractive index of Material 1 | 2.45 |
| Refractive index of Material 2 | 1.05 |
| Individual layer thickness of Material 1, $t_1$ | 270 nm |
| Individual layer thickness of Material 2, $t_2$ | 330 nm |
| Total layer number of Material 1 | 4 |
| Total layer number of Material 2 | 3 |

3.4 Verification of Zero-Index Realization Via Optical Modeling

In this section, optical modeling results of the zero-index PhC 310 configured with parameters listed in Table 3.1, are described. The zero index will be verified using the three characteristics, as described herein in section 3.2. The zero index may be further verified using a total internal reflection (TIR) phenomenon.

3.4.1 Characteristic 1: Triple Band Degeneracy

FIG. 3.3 is a plot 320 illustrating an FDTD-simulated TE band structure for the PhC 310 of FIG. 3.2. FIG. 3.3 (i.e., plot 320) illustrates the calculated photonic band structure of the 2D PhC under TE-polarized light (electric field of the light is polarizing along z-axis in FIG. 1.6). In the plot 320, the x-axis represents the wave vector, $\underline{k}$; and the y-axis represents the normalized wavelength, a/$\lambda$, where a is the lattice constant equal to 600 nm. It may be appreciated that two assumptions were made in the calculation: 1) the PhC is infinite in span along x-, y- and z-axis and 2) the high-index $TiO_2$ pillars are surrounded by a uniform dielectric environment with n=1.05. As the actual PhC is finite along three directions, its photonic band structure may deviate somewhat and the zero-index frequency may shift. The result obtained from the infinite PhC shows a triple band degeneracy 322 is formed at 973 nm. The triple band degeneracy 322 includes two linear bands forming a Dirac-like cone and a third flat band intersecting the cone. In conclusion, the first characteristic is achieved.

3.4.2 Characteristic 2: Triply Degenerate State Derived from Monopole and Dipole Excitations FIG. 3.4 illustrates an endview 326 of PhC 310 of FIG. 3.2 and corresponding FDTD-simulated field patterns of eigenmodes near the triple-band-degeneracy frequency 973 nm. Eigenmode expansion analysis was performed on the finite PhC 310 in the vicinity of degeneracy frequency 973 nm. The endview 326 includes layer refractive indexes $n_i$ and $n_2$, corresponding to dense $TiO_2$ and $SiO_2$ OAD film, respectively, and $n_3$ corresponding to air. The simulated field patterns include a first field pattern 328a, at frequency 973 nm and a second field pattern 328b, at frequency 925 nm. The outlines of the PhC 310 are depicted by black lines in the electric field maps 328a, 328b. It may be appreciated that the field patterns 328a, 328b illustrate characteristic monopole and dipole excitation modes inside the $TiO_2$ pillar at 973 nm and at up to 925 nm. The field patterns 328a, 328b do not appear to exhibit higher-order multipole excitation mode. Thus, the second characteristic is achieved and EMT-based algorithms are applicable to calculate the effective RI of the PhC.

3.4.3 Characteristic 3: Confirm an Effective Index Equal to Zero Near 973 nm Using S-Parameter Technique FIG. 3.5 is a plot 330 illustrating an effective refractive index 332 for the PhC 310 of FIG. 3.2 in the wavelength region of 900-990 nm. The S-parameter technique was used to retrieve effective refractive index 332. Plot 330 illustrates a quasi-linear effective index dispersion relation from 900 nm to −976 nm, except in the vicinity of 920 nm where the effective index becomes constant. It may be appreciated that the actual zero-index frequency blue-shifts from the calculated value of 973 nm to approximately 915-926 nm, which may be desirable. The deviation is expected because the structure used in photonic band structure simulations is infinite in span. Thus, the 2D PhC 310 configured with parameters listed in Table 3.1 has been demonstrated to have realized zero RI near ~915 nm.

3.4.4 Angle-Dependent Transmission Spectrum Simulations

The verification of the realization of zero RI for the PhC, consistent with the present disclosure, may be performed based on the TIR (total internal reflection) phenomenon, since the PhC may be the optically thin medium with respect to the vacuum (n=1) at its zero-index frequency. The TIR approach may be considered relatively more explicit and concise compared to the three characteristic approach, as described herein. An angle-dependent transmission spectrum is simulated for a tightly-focused Gaussian beam traveling from the vacuum to the PhC to verify the realization of zero RI PhC. If the PhC possesses an n<1, then, according to Snell's law, the transmitted power will decrease with increasing incident angle until TIR happens at critical incident angle, $\theta_c$. The smaller the critical angle is, the closer to zero the n will be. The n of the PhC may then be calculated by substituting $\theta_c$ into Snell's law.

FIG. 3.6 is a plot 334 illustrating an FDTD-simulated angle-dependent transmission spectrum of PhC structure 310, configured with the structural parameters of Table 3.1. In the simulation, incident angles from 0° to 80°, in ten degree increments, 336a, 336b, 336c, 336d, ..., 336m and wavelengths from 850 nm to 1000 nm were studied and the waist size of the Gaussian beam is taken as 2.5 μm. It is contemplated that the oscillation of the spectrum around 975 nm at incident angles of 0 (336a), 10° (336b) and 20° (336c) may be due to the simulation divergence at these frequencies, indicating a limitation of the simulation algorithm. The data points were collected by sweeping the frequency, thus, it is believed that the results away from the oscillations are valid. In the wavelength region near 925 nm, the power transmitted from the PhC 310 decreases with increasing incident angle, and the transmitted power becomes zero before the incident angle reaches 20°. It may be assumed that $\theta_c$ is no greater than 20° in this wavelength region. Substituting 20° into Snell's law yields an estimated n of ~0.34. Thus, simulating the angle-dependent transmission spectrum for the zero-index PhC 310 yields results similar to the characteristic approach, as described herein. Thus, a PhC, consistent with the present disclosure, configured with parameters in Table 3.1 may realize zero n at frequencies very close to the visible frequencies.

3.5 Experimental Methods

3.5.1 Overview of Fabrication Procedure

Fabrication of the a PhC, consistent with the present disclosure, e.g., PhC 310 of FIG. 3.2, may be generalized as a two-step process that includes first depositing a multi-layered film and then etching the multi-layered film to structure into the periodic PhC structure.

FIG. 3.7 illustrates a flowchart 340 of a fabrication procedure of a PhC, e.g., PhC 310, consistent with several embodiments of the present disclosure.

Step 341 includes depositing a distributed Bragg reflector (DBR) structure 341a onto a substrate 341b. The DBR structure includes a plurality of alternating layers of high-index $TiO_2$, e.g., $TiO_2$ layer 341c, and low-index $SiO_2$, e.g., $SiO_2$ layer 341d. In one nonlimiting example, the substrate 341b may correspond to a silicon wafer. Thicknesses of the $TiO_2$ and $SiO_2$ layers 341c, 341d are $t_1$ and t2, respectively. For example, the deposition may be performed by electron-beam (e-beam). In another example, the deposition may be performed by sputtering.

Step 342 includes utilizing lithographic methods to pattern the DBR structure with periodic photoresist stripes (strips) 342a, 342b, ..., 342m. Each photoresist stripe. e.g., photoresist stripe 342b, has width W', and the periodic photoresist stripes have periodicity S. It may be appreciated that if the etching depth is large, the selectivity of photoresist over $TiO_2$ and $SiO_2$ may be too low for the photoresist to survive from etchant attack before the etching is complete. Thus, in an embodiment, photoresist strips may be used as a "soft mask" for pattern transfer. A solid material with stronger resistance to plasma and reactive ions may then be used as a "hard" etch mask during dry etching.

Step 343 includes depositing a solid material 343a, 343b, ..., 343m with thickness $t_{mask}$ onto the photoresist strips 342a, 342b, ..., 342m.

Step 344 includes applying a lift-off process to selectively remove the photoresist soft mask so that only hard mask 343a, 343b, ..., 343m with thickness $t_{mask}$, W in width and S in periodicity remains.

Step 345 includes applying dry etching to remove mass anisotropically and structure the DBR into a PhC structure 346.

Step 347 includes stripping hard mask off from the PhC structure yielding the final product 310.

Thus, a PhC, consistent with the present disclosure, e.g., PhC 310 of FIG. 3.2, may be fabricated as a two-step process that includes first depositing a multi-layered film and then etching the multi-layered film to structure into the periodic PhC structure.

It is contemplated that the two-step fabrication process, as described herein, may be implemented to fabricate a 3D PhC structure. In this case, etching may be performed in two directions.

3.5.2 Deposition of $TiO_2/SiO_2$ Distributed Bragg Reflector Structures

Turning now to FIG. 3.7 and Step 341, deposition conditions of constituent $TiO_2$ layers in the DBR 341a were determined based, at least in part, on the elimination of stress-induced cracking in the DBR.

The DBR 341a is configured to include alternating layers of high-index, dense $TiO_2$ (n≈2.45) and low-index, porous $SiO_2$ (n≈1.05). With flexibility of alternating deposition sources and deposition angles, the e-beam evaporation system with stepper motors installed, as described herein, is a suitable system for conducting the deposition of DBR. By mapping the effective RIs of OAD films to deposition conditions, it may first seem reasonable that $SiO_2$ should be deposited at the highest angle 89° and $TiO_2$ should be deposited at the lowest angle 0° to achieve the desired RIs by OAD. However, in preliminary studies where 0° $TiO_2$ OAD film (~270-nm) was deposited on 89° $SiO_2$ OAD film (~330-nm) to make a two-layered DBR structure on silicon substrate, cracking of 0° $TiO_2$ OAD film was immediately observed in the sample just taken out of the chamber with fissures of approximately 100 nm in width. The cracking of 0° $TiO_2$ OAD film is likely to have been caused by the tensile stress developed during deposition. The cracking problem may be solved by changing the shape or orientation of 0° $TiO_2$ columns to circumvent inter-column coalescence while still maintaining the RI of 0° $TiO_2$ OAD film. By checking the dependence of porosity of $TiO_2$ OAD films on the deposition angle, it was found that the porosity of $TiO_2$ OAD films almost remains constant in the region of 0-30°, thus indicating that effective RIs of $TiO_2$ OAD films are approximately constant in this region. The shape and orientation of $TiO_2$ columns change dramatically when the deposition angle changes from 0° to 30°.

FIG. 3.8(a) is an SEM image 350 showing a cross-sectional view of 30° $TiO_2$OAD film deposited on 89° $SiO_2$ OAD film. $TiO_2$ columns become parallel tetrahedron and column broadening is reduced compared to 0° $TiO_2$OAD film deposited on 89° $SiO_2$ OAD film. No cracking was observed for this sample after deposition. FIG. 3.8(b) is a top-down SEM image 352 illustrating the absence of cracking. Thus, changing the deposition angle of $TiO_2$ OAD film from 0° to 30° may eliminate the tensile stress-induced cracking when silicon is used as substrate. Thus, the DBR structure may be assembled by alternating layers of 30° $TiO_2$ OAD films and 89° $SiO_2$ OAD films on silicon substrate by deposition, consistent with the present disclosure.

The deposition of the DBR structure 341a was conducted in e-beam evaporation system (available from Temescal) using an OAD technique, as described herein. 99.9% pure $TiO_2$ (available from CERAC) and 99.999% pure $SiO_2$ (available from International Advanced Materials) were used as deposition sources. Two substrates were prepared and loaded. A first substrate was piece of silicon wafer and a second substrate was a piece of sodalime microscope glass slide (available from VWR International). Substrates were loaded into the chamber adjacent to one another. The obtained samples may be identifies as "DBR-Si" and "DBR-glass", respectively, according to their substrates. The system pressure reached low-$10^{-7}$ Torr before deposition and was kept stable around $2 \times 10^{-5}$ Torr and $1 \times 10^{-4}$ Torr during the deposition of $TiO_2$ and $SiO_2$, respectively. No specific temperature control was applied to the substrates. The deposition rate was controlled constantly at 1.1 Å/sec and 4.5 Å/sec for the deposition of $TiO_2$ and $SiO_2$ respectively. The deposition rate and deposited thickness were monitored by an in-situ quartz crystal microbalance. The source material, deposition angle and thickness of each layer were controlled according to the recipe listed in Table 3.2.

TABLE 3.2

Materials and deposition angles used for engineering the prototype of zero-index PhC.

| Constituent layer | Material Silicon wafer | Deposition angle (degree) | Targeted thickness (nm) |
|---|---|---|---|
| 1 | $TiO_2$ | 30 | 270 |
| 2 | $SiO_2$ | 89 | 330 |
| 3 | $TiO_2$ | 30 | 270 |
| 4 | $SiO_2$ | 89 | 330 |
| 5 | $TiO_2$ | 30 | 270 |
| 6 | $SiO_2$ | 89 | 330 |
| 7 | $TiO_2$ | 30 | 270 |
|   | Air |   |   |

FIG. 3.9 illustrates one example DBR structure 354 and a cross-sectional SEM image 356 of the obtained DBR-Si. The example DBR structure 354 corresponds to DBR structure 341a of FIG. 3.7. Imaging was taken at zx-plane to show the tilted feature of $TiO_2$ and $SiO_2$ nanocolumns. The sample contains four layers of 30° $TiO_2$ OAD films. One of the layers of 30° $TiO_2$ OAD film, e.g., layer 356b corresponding to layer 354b, was in contact with silicon substrate 356a corresponding to silicon substrate 354a. It may be seen that the 30° $TiO_2$ OAD film 356b deposited on silicon wafer 356a has a different morphology than the other three layers, e.g., layers 356c, d, e. In particular, the 30° $TiO_2$ OAD film 356b deposited on silicon wafer shows no discernable columnar features and appears to be dense. This may be explained by the effect of substrate's surface roughness on the deposited film. The surface of 89° $SiO_2$ OAD films may be considered as a discontinuous film composed of hillock-like nanoislands, which are actually the protruding tips of 89° $SiO_2$ nanorods. In contrast, the surface of the silicon wafer is relatively continuous and smooth. When $TiO_2$ ad-atoms arrive at the surface of 89° $SiO_2$ OAD films, those hillock-like nanoislands may serve as nucleation sites where $TiO_2$ ad-atoms nucleate. As a result, $TiO_2$ nucleus may later grow into nanocolumns that are widely separated by the distance between tips of 89° $SiO_2$ nanorods. In the case where $TiO_2$ ad-atoms are nucleating on the silicon wafer, since no forced nucleation site is present, $TiO_2$ ad-atoms are free to diffuse and form nucleus that are relatively close. The columnar feature may be less discemable as $TiO_2$ columns are compactly grown.

Cracking may be present at bottom side of the sample DBR-Si, where it is closer to the evaporation source than the top side. Fissures at the bottom side of the sample DBR-Si are visible, while the top side appears to be clear. No fissure was observed in the sample DBR-glass over the entire surface area. To confirm the absence of cracking, high-magnification optical microscope was used to examine the top-down view of sample DBR-glass and DBR-silicon. No fissure was observed in the sample DBR-glass.

The results suggest that a difference in thermal expansion coefficient between the substrate and the deposited $TiO_2/SiO_2$ may play a role in inducing stress/cracking in the DBR structure. The thermal expansion coefficients of $TiO_2$, $SiO_2$, glass and silicon are $10.1 \times 10^{-6}$ $K^{-1}$, $0.65 \times 10^{-6}$ $K^{-1}$, $8.6 \times 10^{-6}$ $K^{-1}$ and $2.56 \times 10^{-6}$ $K^{-1}$, respectively. The difference in thermal expansion coefficient between $TiO_2$ and glass may be smaller compared to the difference in thermal expansion coefficient between $TiO_2$ and silicon, such that the deformations of $TiO_2$ layers and glass should be much more spontaneous. This indicates that when $TiO_2$ layers and substrates are expanding their volumes by absorbing heat from the evaporation source during deposition, stress generated inside the sample DBR-Si may be larger compared to that generated inside the sample DBR-glass. Once the stress inside the sample DBR-Si reaches a certain magnitude, it may be large enough to induce cracking in the $TiO_2$ layers.

3.5.3 Definition of ITO Hard Mask by Lift-Off Process

Turning now to FIG. 3.7 and Steps 342 through 344, two choices of hard-mask material were studied. A first material included metals (nickel (Ni)) and a second material included dielectrics (Indium Tin Oxide (ITO)). A micro-masking effect, that could reduce the etching rate, was encountered in dry etching when nickel was used as hard mask. The micro-masking effect was not encountered in dry etching when ITO was used as hard mask.

Soft mask made by photoresist may be completely consumed before the etching is complete due to the large total thickness of DBR-Si (>2 μm). Hard mask made by solid materials may replace or combine with soft mask to mitigate this effect. A solid material was used to make a single-layered hard mask based on a lift-off process, where patterns made by photoresist were used for pattern transfer. The PhC 310 structure is configured to have a grating width a of 600 nm and a grating period d of 270 nm (Table 3.1). It may be appreciated that large-scale fabrication of a structure with features on nanometer scale may be challenging to achieve with some experimental setups. In one nonlimiting example, a prototype may be fabricated corresponding to PhC 310, whose grating width and grating period are on micrometer scale. The fabrication recipes may then be optimized, the optimization configured to support fabrication of the PhC 310, on a nanometer scale. Thus, the photomask may be configured to produce photoresist strips 342a, 342b, . . . , 342m with periodicity S of 200 μm and width W' of 5 μm.

Photoresist soft mask was first patterned on the DBR-Si by photolithography (corresponding to step 342) prior to the deposition of hard mask (corresponding to step 343). Photoresist (Shipley 1813) was first spin-coated on the DBR-Si, followed by UV exposure with mask aligner (Karl Suss MJB3) and development. The obtained photoresist strips were 200 μm in periodicity, 5 μm in width and 1.7 μm in thickness.

The hard mask material was then deposited onto the photoresist strips (corresponding to step 343). Ni and ITO were both investigated. ~130-nm Ni was deposited by e-beam evaporation (Temescal) and ~218-nm ITO was deposited by DC sputtering (AJA International). Finally, samples were sonicated in bath of photoresist stripper solution for 10 to 20 seconds to lift off the photoresist.

Commonly, dry etching of $TiO_2$ and $SiO_2$ is done in fluorinated environment. Additives like Ar and $O_2$ may be added into the fluorinated plasma to adjust the etching profile or modify the etching rate. The dry etching of DBR-Si was conducted in an inductively coupled plasma-reactive ion etching (ICP-RIE) system because of its capability of generating high density of radicals and ions to increase the etching rate. The patterned DBR-Si samples were etched in ICP-RIE (Trion) with the recipe listed in Table 3.3. DBR-Si samples patterned with Ni hard mask and ITO hard mask were etched for 2000 seconds and 6800 seconds, respectively. A carrier wafer made from anodized aluminum was used to carry the samples. Anodized aluminum is non-conductive and highly resistant to fluorine-based plasma. Using an anodized aluminum carrier wafer may help to increase the bias and thus the etching anisotropy, and eliminate contaminations due the damage of carrier wafer.

TABLE 3.3

Etching recipes used in ICP-RIE for etching DBR-Si samples patterned with Ni and ITO hard mask.

| Parameter | Value |
| --- | --- |
| ICP (W) | 350 |
| RIE (W) | 55 |
| Pressure (mTorr) | 15 |
| He cooling (Torr) | 5 |
| Temperature (° C.) | 0 |
| Flow rate of $CHF_3$ (sccm) | 100 |
| Flow rate of $O_2$ (sccm) | 10 |

The Ni hard mask was badly damaged after 2000 seconds of etching, and only about 1 μm of $TiO_2/SiO_2$ was etched. Craters that penetrated to the $TiO_2/SiO_2$ surface were evident on the Ni hard mask. Ni particles covered most of the $TiO_2/SiO_2$ surface. This is may be due to the highly-biased Ni being sputtered by plasma during etching, and the sputtered Ni redeposited onto the nearby $TiO_2/SiO_2$ surface. Such phenomenon is called micro-masking effect, where micro-masks refer to the numerous particles generated by sputtering the hard mask. The micro-masking effect is undesirable for the dry etching process, as it reduces the etching rate and the micro-masks cannot be removed easily from the sample. In contrast, for the sample patterned by ITO mask, though ITO appears to be dimpled, no crater was found to have penetrated to the $TiO_2/SiO_2$ surface and no micro-masking effect was observed. The 7th layer of the DBR-Si was exposed and a total thickness of ~2 μm was etched. Results demonstrated that ITO is resistant to the sputtering by fluorine-based plasma in ICP-RIE system, and it effectively eliminates an undesired micro-masking effect. Thus, in the following, ITO was selected to make hard mask on DBR structure.

3.5.4 Dry Etching of $TiO_2/SiO_2$ Distributed Bragg Reflector (DBR) Structures

Turning now to FIG. 3.7 and Step 345, a challenge in realizing the PhC structure by fabrication primarily lies in the generation of structural damage in Step 345. Damage to the proposed structure originates from the adoption of highly-porous 89° $SiO_2$ OAD layers in the structure. The large surface area of 89° $SiO_2$ OAD layers means more areas may be accessible by the reactive plasma etchant. The etchant may cause a series of structural damage to porous materials including pore-wall thinning, pore collapse and undercut sidewall profile. If the plasma damage is not managed, the over-thinned nanorods may collapse and the whole structure may fail.

Dry etching of DBR-Si was conducted in ICP-RIE system using ITO as hard mask. Two etching recipes were studied, identified herein as Recipe 1 and Recipe 2. Table 3.4 lists the parameters for Recipe 1 and Recipe 2. Recipe 1 was the recipe used in testing the hard mask material, as described herein. Recipe 1 may provide a good etching profile without any sidewall damage or nanorod collapse. Recipe 2 is based on Recipe 1. The RIE power is increased from 55 W in Recipe 1 to 75 W in Recipe 2 to increase the bias and ion energy so that a more anisotropic sidewall profile and less nanorod damage may be obtained.

TABLE 3.4

Parameters of Recipe 1 and Recipe 2.

| Parameter | Value | |
| --- | --- | --- |
| | Recipe 1 | Recipe 2 |
| ICP (W) | 350 | 350 |
| RIE (W) | 55 | 75 |
| Pressure (mTorr) | 15 | 15 |
| He cooling (Torr) | 5 | 5 |
| Temperature (° C.) | 0 | 0 |
| Flow rate of $CHF_3$ (sccm) | 100 | 100 |
| Flow rate of $O_2$ (sccm) | 10 | 10 |

FIG. 3.10 is a SEM image 360 of an ITO hard mask-patterned DBR-Si after etching for 6800 seconds with Recipe 1. FIG. 3.10 (i.e., SEM image 360) includes a first image 360*a* and a second image 360*b* at a closer scale than the first image 360*a*. A PhC structure rotated by 90°, i.e., a grating structure with grating width of 5 μm and grating period of 200 μm is obtained. No structure collapse is observed. SEM images 360*a*, 360*b* show that $TiO_2$ layers exhibit a smooth sidewall profile, and the nanorods in $SiO_2$ layers are intact from the etching damage as slanted $SiO_2$ nanorods at the edge may be clearly seen. Though all the 7 constituent layers have been exposed after 6800 seconds of etching, some $TiO_2$ residues may be observed on the silicon surface. It is contemplated that increasing the etching time may help to completely remove the residues, but since no stopping layer was deposited between the DBR structure and the silicon substrate, over-etching may damage the silicon substrate.

FIG. 3.11 is a SEM image 362 of an ITO hard mask-patterned DBR-Si after etching for 4000 seconds with Recipe 2. FIG. 3.11 (i.e., SEM image 362) includes a first image 362*a* and a second image 362*b* at a closer scale than the first image 362*a*. Characteristics of the obtained PhC structure is similar to the ITO hard mask-patterned DBR-Si after etching for 6800 seconds with Recipe 1 illustrated in FIG. 3.10 (i.e., SEM image 360), but the etching rate is improved by 41.18%. Thus, Recipe 2 may be used in the future work to structure the DBR into a PhC configured with the parameters listed in Table 3.1.

3.6 Conclusion

In this section 3, a lossless, zero-index PhC structure for applications near 920 nm has been described. Feasibility of fabricating the designed structure was illustrated as indicated by the prototype, as described herein. A lossless zero-index structure at visible and near-infrared frequencies may contain engineered porous films with an index close to 1 as the low-index base material in the structure. For example, an OAD technique may be configured to engineer such low-index porous film with $SiO_2$. The presence of highly porous SiO$_2$ layers in the structure challenged the fabrication process, as porous SiO$_2$ layers could be easily damaged during dry etching if the etching recipe is not properly adjusted. The challenge was addressed with an ICP-RIE etching recipe optimized for producing smooth sidewall profile and protecting the porous SiO$_2$ layers. The realization of zero-index at 920 nm with the proposed material and fabrication method provides a possibility for developing lossless, zero-index optical structures for visible-light applications.

4. Solid-State Dewetting of Gold Aggregates/Islands on TiO$_2$ Nanorod Structures Grown by Oblique Angle Deposition In this section 4. OAD fabrication of a two-layer film stack including a nanometer-sized array of gold NPs with controlled separation and size atop a slanted TiO$_2$ nanorod film is described. The fabrication was realized by using OAD to grow the TiO$_2$ nanorod substrate and supported gold aggregates as primary structures, followed by rapid thermal annealing (RTA) at high temperatures to accelerate the dewetting and the growth of the Rayleigh instability to fragment the gold aggregates and produce NP arrays. Varying levels of initial spacing between gold aggregates (inter-aggregate spacing) in the OAD were considered by controlling the deposition angle. To illustrate how initial the inter-aggregate spacing decides the dewetting outcome and to reveal the possible connection between the nanorod tip topology and dewetting dynamics, phase-field modeling was used to demonstrate and compare the dynamics of solid-state gold aggregates dewetting on TiO$_2$ nanorod tips versus TiO$_2$ planes.

4.1 Introduction and Motivation

As discussed in Section 1.1, nanostructured noble metal films may be challenging to produce due to the high surface diffusion. Strict control of the deposition conditions may be imposed to suppress surface diffusion, and post-deposition treatments which suppress dewetting and sustain the columnar morphology may also be implemented. For these reasons, few OAD films with sophisticated nanostructures have been produced by noble metals compared to oxides. Reports of multi-layer stacks of metal and oxide/metal OAD films are even more limited.

Thus, there is motivation to drive the growth of stable, noble metal OAD nanostructures, and combine them with dielectrics in multi-layer stacks. Multi-layer stacks may exhibit unique properties compared to individual layers. For example, silver nanoparticle arrays may exhibit relatively stronger absorption when they are deposited in the vicinity of a continuous silver layer and TiO$_2$ OAD films show a higher photocatalytic activity when they are deposited onto WO$_3$. Noble metal nanoparticles (NP) may enhance the local electric field intensity at their resonant frequency and oxide nanocolumnar OAD films are known for their high photocatalytic activity. OAD growth of a stable noble metal NP array with well-controlled separation and size on the oxide nanocolumnar OAD films may produce structures with enhanced photocatalytic activity and enhanced, absorptive and reflective, optical properties.

As shown in Section 1.1, due to the high surface diffusion, the noble metal deposits tend to form large aggregates on the substrate during OAD and those aggregates deform and grow, so it is contemplated that a properly mediated process for the controlled dewetting of the as-deposited aggregates may be employed to produce a thermodynamically stable NP array on the oxide nanocolumns. It is known that Rayleigh instability may fragment the structure into a chain of spherical particles spaced with the characteristic wavelength of the fastest growing perturbation, thus it is contemplated that the dewetting process may be guided by Rayleigh instability. It is known that substrates that support the dewetting materials may strongly affect the dynamics of dewetting. Failing to dominate the dewetting via a Rayleigh instability mechanism may result in relatively large, irregularly-shaped islands instead of periodically distributed spherical NPs. The tips of the oxide nanocolumns may provide a mechanism for controlled dewetting as they are generally of nanometers in width and quasi-periodic in space. Understanding how these characteristics affect dewetting may support the successful fabrication of noble metal NP arrays on OAD nanocolumns.

4.2 Experimental Methods

All films were made in an electron-beam evaporation system (Temescal) using the OAD technique, as described herein. The chamber was cooled by water to maintain a constant temperature. The evaporation sources of TiO$_2$ and gold were located at the bottom of the chamber, about 30 cm below the substrate. All the films were deposited on silicon (100) wafers. When OAD is conducted at large deposition angles (the angle between the substrate normal and the incident vapor flux higher than ~80°), the shadowing effect creates the largest separation between the deposited nanostructures. Films were deposited at 80°, 85°, 87° and 89°. First, the bottom layer consisting of 180-nm thick, slanted TiO$_2$ nanorods was deposited and then the evaporation source was switched to deposit 20-nm thick gold aggregates onto the tips of the TiO$_2$ nanorods. The deposition rate was maintained at ~0.8 nm/s for both the TiO$_2$ and gold depositions. The chamber pressure was in the low $10^{-5}$ Torr range for TiO$_2$ deposition and low $10^{-7}$ Torr range for gold deposition. No special temperature control was applied to the Si wafer. After the deposition, parts of the samples were cut from the wafer and immediately transferred to the rapid thermal annealer (AG Associates, Heatpulse 610) for thermal treatment at 600° C. for 3 minutes under nitrogen. Then, the as-deposited and annealed samples were imaged using a scanning electron microscope (Carl Zeiss, Supra).

4.3 Morphology of the as-Deposited and Annealed Samples

FIG. 4.1 illustrates top-down SEM views 400 of as-deposited 400a, 400c, 400e and 400g, and annealed 400b, 400d, 400f and 400h, samples. The deposition angle for the samples in images 400a and 400b, images 400c and 400d, images 400c and 400f, images 400g and 400h, are 80°, 85°, 87° and 89°, respectively. The arrows denote tilt direction of TiO$_2$ nanorods, i.e., vapor flux direction. All scale bars represent 100 nm.

Gold regions at the top layer, are brighter in color. For the as-deposited samples, spatially-distributed, slanted TiO$_2$ nanorods were formed on the Si wafer, and irregularly-shaped gold aggregates are present on the tips of the nanorods. The slanted TiO$_2$ nanorods ae tilted towards the direction of the incident flux and the flux direction is denoted by the arrows in the figures. The shadowing effect led to structured TiO$_2$ nanorods as expected, but due to the anisotropic behavior of the shadowing effect, the spacing between the TiO$_2$ nanorods is significantly higher along the rod tilt direction than perpendicular to it. For example, as-deposited, TiO$_2$ nanorods may grow in the form of clusters. A plurality of TiO$_2$ nanorods may coalesce perpendicular to the rod tilt direction and form an elongated nanorod chain. This growth phenomenon may be referred to as the bundling effect in studies for OAD growth of different dielectrics and metals. An analysis of nanorod clusters has shown that the average diameter of TiO$_2$ nanorod is about 15 nm, and the nanorod cluster may span hundreds of nanometers in the direction perpendicular to the rod tilt direction. Along the tilt direction of the TiO$_2$ nanorods, the spacing between nanorods, i.e. nanorod clusters, increased as the deposition angle was increased from 80° (image 400*a*) to 89° (image 400*g*) due to the increasingly strong shadowing effect. The shadowing effect was much less effective for gold. For example, in image 400*a*, image 400*c*, image 400*e* and image 400*g*, the gold may exhibit the morphologies associated with diffusion-unlimited OAD. In other words, the gold ad-atoms formed irregularly-shaped aggregates that covered the elongated top-surface of each TiO$_2$ nanorod cluster. By continuing the gold depositions at the same oblique angles, the as-deposited gold aggregates may become separated with spacings nearly equal to those between the TiO$_2$ nanorod clusters underneath.

After the RTA treatment, a morphology change occurs. The elongated gold aggregates in the 85° (image 400*d*), 87° (image 400*f*) and 89° (image 400*h*) samples disappear after the RTA treatment. Instead, chains of separated gold NPs are formed on the top-surface of TiO$_2$ nanorod clusters. These nanoparticles are predominantly spherical with some scattered ellipsoidal nanoparticles. Globally, a quasi-periodic gold NP array is formed in these three samples. In comparison, in the annealed 800 sample (image 400*b*), irregularly-shaped gold islands up to hundreds of nanometers in diameter are formed, spanning numerous TiO$_2$ nanorod clusters. Neither local, nor global formation of a gold NP array was observed in the 80° sample.

4.4 Phase-Field Modeling

The experimental results show that gold nanoparticle formation is related to the initial spacing between large gold aggregates, such that large gaps between aggregates favor the production of gold NP arrays and small gaps seem to have caused the formation of the large gold islands. A characteristic of TiO$_2$ nanorod clusters that may also affect the dewetting process is the extent of their top-surface. To clarify the spacing issue, the phase-field method was used to model and compare the dynamics of solid-state gold aggregates evolving on TiO$_2$ nanorod clusters and on continuous TiO$_2$ planes. Large and small initial gaps were imposed between aggregates. Within the framework of the phase-field model, the dewetting dynamics of gold was studied in terms of the morphological evolution of a mixture of gold and air driven by the minimization of the mixture's total free energy.

4.4.1 Geometrical Model of Gold Aggregates Deposited on TiO$_2$ Substrates

SEM images, like those of FIG. 4.1 show the as-deposited gold aggregates coat the top-surface of TiO$_2$ nanorod clusters. These aggregates appear to meander across the surface but their largest dimension lies along a line perpendicular to the rod tilt direction. In the model, these features were generalized and the TiO$_2$ nanorod clusters were treated as a 1D-periodic structure in their tip region. The geometry includes semi-infinite, tabular TiO$_2$ cuboids periodically separated by air along the rod tilt direction. Exaggerating the dimension of the TiO$_2$ nanorod clusters perpendicular to the tilt direction and neglecting their separation along this direction do not affect the simulation results, as will be shown in Section 4.5.1. The geometrical structure may be simplified. Accordingly, the gold aggregates may be simplified as finite cuboids resting on the top-surface of the TiO$_2$ cuboids. In the control study where continuous, planar TiO$_2$ serves as the supporting substrate, only the supporting substrate was replaced and the configuration of the gold cuboids was kept constant.

FIG. 4.2 are sketches 402*a*, 402*b* illustrating the simulation domain for a system that includes periodic TiO2 nanorod cluster supported gold aggregates 402*a* and continuous planar TiO2-supported gold aggregates 402*b*. Symmetric BCs 404*a*, 404*b*, 404*c*, 404*d* are denoted at boundary planes of application. The simulation object is a gold aggregate supported by TiO$_2$. The x-axis and y-axis define the plane formed by the TiO$_2$ supporting layer. The y-axis represents the tilt direction of the TiO$_2$ nanorods and the direction of periodicity, and x-axis represents the direction along which the TiO$_2$ cuboids are stretching effectively to infinity. The simulation was performed on a unit cell of the periodic structure, which is a quarter segment of a single TiO$_2$-supported gold aggregate. As shown in FIG. 4.2, four boundary planes with symmetric boundary conditions (BCs) imposed, define the simulation domain along x- and y-direction; and along z-direction, the surface of the tip of TiO$_2$ cuboid (or the surface of the TiO$_2$ plane) bounds the domain from the bottom and a hypothetical plane bounds the domain from the top to represent the semi-infinite domain of air above the system.

The width of the TiO$_2$ cuboid along the x-axis was set to be the nanorod diameter, d, which was measured from SEM images. The dimensions of the gold cuboid along the x-, y- and z-axes are described by the aggregate's length L, width W, and height H, where H is the gold film thickness. Though the sharp corners of initial state of the gold is a bit unphysical, it may be shown that within 1 dimensionless time step, the square corners associated with cuboidal gold may transform into rounded cuboids due to the wetting BC imposed at the TiO$_2$ supporting substrates. The separation between the gold cuboids along y-axis is defined by the spacing, s, whose magnitude increases as one changes from the 80° deposited substrate to the 89° substrate. Different shaped gold aggregates were created by varying the length L.

4.4.2 Model Formulation

The phase-field model treats the interface as a "diffuse" entity such that it has a finite thickness and so is more appropriately, an "interfacial region". The order parameter, φ, is defined to distinguish between the air and the gold where φ=1 denotes pure air, φ=−1 denotes pure gold and −1<φ<1 represents the air-gold interface. The motion of the air-gold interface then describes the morphological evolution of the gold aggregates. System components are mixed in the interfacial region and generate free energy. Free energy generated by the mixing between gold and air, gold and TiO$_2$, and air and TiO$_2$ is stored in the interfacial region. The Ginzburg-Landau functional was used to describe the free energy of the mixture per unit volume. F(φ), in this region:

$$F(\varphi) = \frac{\lambda}{\varepsilon^2}\left(f(\varphi) + \frac{1}{2}\varepsilon^2|\nabla_\varphi|^2\right), \quad (4.1)$$

where λ is the mixing energy density (J/m), ε is the capillary width (m) indicative of the interfacial thickness, f(φ) represents the bulk energy of the gold and the air, and the second term in Eq. (4.1) represents the interface energy. A double-well potential form was used for f(φ):

$$f(\varphi) = \frac{1}{4}(\varphi^2 - 1)^2. \tag{4.2}$$

The form of f(φ) indicates that q lies between −1 and 1, the system will tend to separate into regions of pure −1 (gold) and 1(air) about the interfacial region.

The term $\lambda/\varepsilon^2$ has the unit of energy per unit volume and its magnitude indicates the volumetric thermal energy at a certain temperature in the interfacial region. If the thermal energy due to the air molecules is neglected, then $\lambda/\varepsilon^2$ is equal to the molar thermal energy of gold, RT, divided by its molar volume, $V_m$. The mixing energy density, λ, and the capillary width, ε, are also related to the gold surface energy, $\sigma(J/m^2)$, by:

$$\sigma = \frac{2\sqrt{2}}{3} \cdot \frac{\lambda}{\varepsilon}. \tag{4.3}$$

By solving Eqs. (2) and (3), the magnitude of e may be determined to be:

$$\varepsilon = \frac{3}{2\sqrt{2}} \cdot \frac{\sigma V_m}{RT}. \tag{4.4}$$

Taking the first variation of F(φ) with respect to p gives the chemical potential, μ, of the system.

$$\mu(\varphi) = \frac{\delta F(\varphi)}{\delta \varphi} = \frac{\lambda}{\varepsilon^2}\left[(\varphi^2 - 1)\varphi - \varepsilon^2 \nabla^2 \varphi\right]. \tag{4.5}$$

Assuming that the diffusion of t is driven by the gradient of the chemical potential, ∇ μ, the Cahn-Hilliard equation may be arrived at and which describes the minimization of the total free energy of the system:

$$\frac{\partial \varphi}{\partial t} \pm \underline{\nabla} \cdot \left\{ -\frac{\gamma(\varphi)\lambda}{\varepsilon^2} \cdot \underline{\nabla}\left[(\varphi^2 - 1)\varphi - \varepsilon^2 \nabla^2 \varphi\right] \right\} = 0, \tag{4.6}$$

where γ(φ) is the mobility parameter. In the absence of a bulk flow, the flux of φ has no convection contribution. For clarity, the mobility, M(φ), is introduced and defined as $M(\varphi) = \gamma(\varphi) \lambda/\varepsilon^2$ and Eq. (4.6) may be rewritten as $$\frac{\partial \varphi}{\partial t} \pm \underline{\nabla} \cdot \left\{ -M(\varphi) \cdot \underline{\nabla}\left[(\varphi^2 - 1)\varphi - \varepsilon^2 \nabla^2 \varphi\right] \right\} = 0. \tag{4.7}$$

M(φ) has the unit of area per time so it is a diffusion coefficient in nature, and its magnitude will be a measure of the how quickly gold surface atoms may diffuse at a certain temperature, as well as the phase separation velocity in the phase-field modeling point of view. M(φ) may be chosen from various formulations, but an inappropriate choice of M(φ) may change the driving force for the motion of the interface. In this study, the annealing temperature was well below the melting point of gold, so gold aggregates may remain in the solid-state and the morphology evolution and the interface motion may occur via the surface diffusion of gold atoms, with no contribution from the bulk diffusion of gold or air. With these considerations, a biquadratic mobility was chosen to eliminate any contribution from bulk diffusion:

$$M(\varphi) = D_s(\varphi^2 - 1)^2, \tag{4.8}$$

Here $D_s$ is the surface diffusion coefficient of gold at the system temperature. The physical meaning of M(φ) is apparent: M(φ) vanishes in the bulk gold (φ=−1) and in the air (φ=1) and is finite within the interfacial region (−1<φ<1). The magnitude of $D_s$ depends on the material and the temperature, and the magnitude of $D_s$ may be calculated using an Arrhenius representation.

The governing equation was supplemented by two sets of BCs. To ensure that the total mass is conserved in the computational domain and that the contact angle of gold on $TiO_2$ obeys Young's equation, a zero-flux BC and a wetting BC were imposed at all non-symmetric boundary planes:

$$\underline{n} \cdot \underline{\nabla}\mu = 0, \tag{4.9}$$

$$\lambda \underline{n} \cdot \underline{\nabla}\varphi + f_w'(\varphi) = 0, \tag{4.10}$$

Here $\underline{n}$ is the unit normal vector at the boundary planes pointing inwards the computation domain and $f_w(\varphi)$ is the wall energy function. $f_w(\varphi)$ determines the phase equilibrium at the boundary planes and may affect the dynamic evolution of contact lines and may lead to undesired wall-layer formation. Here, a linear-form for $f_w(\varphi)$ was selected since the gold-$TiO_2$ contact angle is very close to π/2 radians.

$$f_w(\varphi) = -\omega\varphi, \tag{4.11}$$

ω is a constant related to the contact angle at the boundary planes defined by Young's equation.

A characteristic length scale for this surface diffusion process was defined using the thickness of the gold film, H. This choice leads to a characteristic diffusion time scale of $H^2/D_s$. With this choice, the following dimensionless variables and operators were defined:

$$\tilde{\underline{r}} = \frac{\underline{r}}{L_c}, \tilde{\underline{\nabla}} = L_c\underline{\nabla}, \tau = \frac{t}{\frac{L_c^2}{D_s}}, \tilde{M}(\varphi) = \frac{M(\varphi)}{D_s},$$

where $\underline{r}$ is the position vector and $L_c$ is the characteristic length scale. The dimensional parameters of the gold aggregate, initial inter-aggregate spacing, and width of $TiO_2$ nanorod clusters were also made dimensionless via:

$$\tilde{H} = \frac{H}{L_c}, \tilde{L} = \frac{L}{L_c}, \tilde{W} = \frac{W}{L_c}, \tilde{d} = \frac{d}{L_c}, \tilde{s} = \frac{s}{L_c}.$$

then becomes:

$$\frac{\partial \tilde{\varphi}(\tilde{\underline{r}}, \tau)}{\partial \tau} + \tilde{\underline{\nabla}} \cdot \left\{ -(1 - \varphi^2)^2 \cdot \tilde{\underline{\nabla}}\left[(\varphi^2 - 1)\varphi - \left(\frac{\varepsilon}{L_c}\right)^2 \tilde{\nabla}^2 \varphi\right] \right\} = 0. \tag{4.12}$$

It is readily seen that in the transformed equation, a dimensionless parameter ε/Lc emerges. This is the Cahn number, $C_n$, and measures the relative magnitude of the interfacial thickness over the characteristic length scale of the system. As the magnitude of ε is known by Eq. (4.4), the variation in the magnitude of $C_n$ may reflect the actual dimension of gold aggregates. Substituting $C_n$ into Eq. (4.12) and dropping all the tildes gives final dimensionless governing equation:

$$\frac{\partial \varphi(\underline{r}, \tau)}{\partial \tau} + \underline{\nabla} \cdot \{-(1-\varphi^2)^2 \cdot \underline{\nabla}[(\varphi^2-1)\varphi - C_n^2 \nabla^2 \varphi]\} = 0. \quad (4.13)$$

4.4.3 Simulation Parameters

Values of the parameters used in the simulation are given in Table 4.1: Phase-field modeling parameters. The simulations were performed using finite element methods with a time-dependent, adaptive mesh refinement applied to closely track and resolve the interface motion and composition. Due to the slower dewetting rate of gold aggregates on continuous, planar $TiO_2$ compared to that on nanorod clusters, the total computation time was set to be 650 and 500 dimensionless steps for the planar $TiO_2$ substrates and nanorod cluster substrates, respectively.

TABLE 4.1

Phase-field modeling parameters

| Parameter | Value |
|---|---|
| Physical parameters and constants | |
| $V_m$, molar volume of gold | $1.000 * 10^{-5}$ m$^3$mol$^{-1}$ |
| R, gas constant | 8.314 JK$^{-1}$ mol$^{-1}$ |
| σ, surface energy of gold | 1.280 Jm$^{-2}$ |
| $D_s$, surface self-diffusion coefficient of gold at 873K | $4.26 * 10^{-16}$ m$^2$s$^{-1}$ |
| θ, gold-$TiO_2$ contact angle | 1.791 rad |
| Experiment parameters and derived values | |
| T, absolute annealing temperature | 873K |
| ε, capillary width | 1.875 nm |
| λ/ε$^2$, volumetric thermal energy | $7.258 * 10^8$ Jm$^{-3}$ |
| $C_n$, Cahn number (ε/H) | 0.094 |
| H, gold aggregate height (gold film thickness) | 20 nm |
| W, gold aggregate width | 20 nm |
| L, gold aggregate length | 40-280 nm |
| d, $TiO_2$ nanorod diameter | 15 nm |

4.5 Modeling Results and Discussion

In this sub-section 4.5, the results of the dewetting simulations are presented. The simulation was started with a large value of the initial inter-aggregate spacing along Y-axis, s, and then gradually reduced s until simulation results indicate aggregate coalescence. There exists a critical value of s above which each gold aggregate will dewet independently to form spaced NPs, and below which the aggregates will coalesce and merge along Y-axis during dewetting. This critical value of s was defined as $s_{min}$, where the subscript indicates a minimum initial spacing is required to prevent the coalescence.

4.5.1 Dewetting Under the Initial Condition of $s > s_{min}$

FIG. 4.3 and FIG. 4.4 illustrate the temporal evolution of the morphology of solid-state, cuboid-shaped gold aggregates when $s > s_{min}$, for a $TiO_2$ nanorod cluster substrate 410 and for planar $TiO_2$ substrate 412, respectively. The temporal evolution of the morphology of solid-state, cuboid-shaped gold aggregates for a $TiO_2$ nanorod cluster-supported gold aggregate 410 have as initial dimensions $\tilde{H}=1$ and $\tilde{W}=1$. FIG. 4.3 includes temporal evolution at lengths $\tilde{L}=14$ 410a, $\tilde{L}=9.64$ 410b and $\tilde{L}=6$ 410c. The tip region of $TiO_2$ nanorod clusters and gold particle surface have been profiled by grey (relatively lighter) and gold (relatively darker) colors, respectively. Mirroring the results about YZ-plane at X=0 and about XZ-plane at Y=0 may provide a full picture of the dewetting scenario. The temporal evolution of the morphology of a gold aggregate supported on continuous planar $TiO_2$ 412 have as initial dimensions $\tilde{H}=1$ and $\tilde{W}=1$.

FIG. 4.4 includes temporal evolution at lengths $\tilde{L}=6$ 412a, $\tilde{L}=9.86$ 412b and $\tilde{L}=14$ 412c. The $TiO_2$ plane and gold NP surface have been profiled by grey (relatively lighter) and gold (relatively darker) colors, respectively. Mirroring the results about YZ-plane at X=0 and about XZ-plane at Y=0 may provide a full picture of the dewetting scenario. Results at representative stages are shown. The profile of the gold particles is generated by a contour surface at φ□=0.

First, by comparing the results in FIG. 4.3 and FIG. 4.4, it can be seen when each gold aggregate undergoes dewetting independently to form isolated NPs, the pathway by which the gold rearranges on the surface and the outcome of that rearrangement shows a dependence on the initial geometry regardless of substrate. There exists a critical value of $\tilde{L}$ such that the gold aggregate will only be fragmented into a chain of spherical NPs by the instability if $\tilde{L}$ is no smaller than this value (temporal morphology evolutions 410a, 410b, 412a and 412b), otherwise the aggregate spheroidizes and a single spherical NP forms at the center of the substrate at X=0 (temporal morphology evolutions 410c and 412c). The magnitude of this critical $\tilde{L}$ value is 9.64 for nanorod cluster substrate and 9.86 for planar substrate.

The source of perturbations or instability, and the initial-length criterion for the onset of fragmentation are both the result of the "end effect" in finite-length structures, which is not encountered in infinite-length structures. For all structures shown in FIG. 4.3 and FIG. 4.4, it may be observed that immediately after the dewetting starts, all the cuboid-shaped gold aggregates imposed with an initial contact angle of π/2 radians begin to evolve towards the equilibrium contact angle θ and become cylinder-shaped at τ=1. Subsequently, as the surface atoms at the ends of the cylindrical gold aggregate are of higher chemical potential compared to those at the center at X=0, the surface atoms may migrate from the ends towards the center, making the gold aggregate bulge at its ends and retract towards X=0. End bulging gives rise to axisymmetric perturbations along X-axis, making the center of the aggregates shorten in radius and form a necking region that connects the bulging ends. The simultaneous length retraction may eliminate the possibility for perturbations of certain wavelengths to exist. For finite-length, cylinder-shaped structures imposed by axisymmetric perturbations, perturbation modes of wavelength no smaller than $2\pi L/k_c$ (L=length scale of the cylinder and $k_c$=cut-off wave number) may grow, so a minimum length equal to this critical value may be sustained along X-axis until the growing perturbation modes amplify enough to reduce the radius of the necking region to zero and fragment the aggregate at X=0. Geometries shorter than the critical L value may initially retract too fast to meet this condition, so the bulging ends rejoin each other eventually and only one single NP forms at X=0 (temporal morphology evolutions 410c and 412c); whereas longer geometries are able to sustain the required length long enough and yield two spherical NPs from the bulging ends (temporal morphology evolutions 410a, 410b, 412a and 412b). The fragmented geometries may be termed as Rayleigh-unstable, and other geometries as Rayleigh-stable.

The simulated dewetting pathways and outcomes in FIG. 4.3 explain the experimental observations in images 400d, 400f and 400h, in which a large value of s was experimentally imposed by conducting the depositions at angles higher than 80°. It was observed in the SEM images that the spaced spherical NPs composing the chains span the top-surface of individual nanorod clusters. Due to the distributed sizes of the as-deposited gold aggregates, these spherical NPs are likely to be produced from the dewetting of as-deposited gold aggregates free from inter-aggregate coalescence, either via the Rayleigh instability-controlled fragmentation process or the spheroidization process, depending on the initial geometry.

Results in FIG. 4.3 and FIG. 4.4 indicate that the topology of the tip of nanorod clusters affects the dewetting dynamics by reducing the critical $\tilde{L}$ value, and beyond that, temporal morphology evolutions 410a, 410b, 412a and 412b also show that the tip accelerates the rate at which the instability grows in Rayleigh-unstable aggregates. When gold aggregates are dewetting on $TiO_2$ nanorod clusters, instability growth that leads to the fragmentation of the gold progresses much more rapidly.

FIG. 4.5 is a plot 414 illustrating fragmentation time $\tau_f$ as a function of the initial length of gold aggregates for planar substrate 414a and for nanorod cluster substrate 414b. The time of fragmentation event, $\tau_f$, may be extracted from all the Rayleigh-unstable gold aggregates. Plot 414 shows for all the Rayleigh-unstable gold aggregates, the dynamics of the instability are accelerated on the $TiO_2$ nanorod cluster substrate, and the acceleration is 12.09%, 15.59% and 20.70% as $\tilde{L}$ varies from 14 to 10.

These results suggest the tip of $TiO_2$ nanorod cluster destabilizes the supported gold aggregate. When a nanorod cluster is used as the substrate, the destabilizing effect exerted by the tip reduces the geometrical threshold for fragmentation onset and accelerates the fragmentation dynamics. To investigate the tip effect in detail, the temporal evolution of the $TiO_2$-gold-air contact line along Y-axis for the Rayleigh-unstable gold aggregate with $\tilde{L}$=14 on different substrates was analyzed and compared.

FIG. 4.6 are sketches 416 illustrating temporal migration of the $TiO_2$-gold-air contact line on $TiO_2$ nanorod cluster in the plane of X=0 416a and X=2.92 416b; and on continuous planar $TiO_2$ in the plane of X=0 416c and X=2.93 416d. The initial aggregate length $\tilde{L}$=14. Contact lines in 416b at $\tau$=348 and 349 (fragment) and in 416d at $\tau$=396 and 397 (fragment) overlap. Contact lines are measured in the planes where the growing perturbation and the resultant spherical NPs are centered. Dynamic contact angles, $\theta_d$, are also measured from FIG. 4.6 and the results are plotted in FIG. 4.7.

FIG. 4.7 is a plot 418 of temporal evolution of the contact angle on continuous, planar $TiO_2$ in the plane of X=0 418a and X=2.93 418b and on $TiO_2$ nanorod cluster in the plane of X=0 418c and X=2.92 418d. Contact angles are plotted from $\tau$=1.

Sketches 416c and 416d depict the temporal migration of contact line on a featureless planar $TiO_2$ substrate. The contact line migrates towards +Y-direction at X=2.93 and −Y-direction at X=0 as dewetting proceeds. Dynamic contact angle $\theta_d$ at X=2.93 and X=0 agrees reasonably well with the equilibrium contact angle $\theta$ over time, except that $\theta_d$ at X=0 drops below $\theta$ near fragmentation time (see FIG. 4.7, plot 418). In contrast, sketches 416a and 416b show a different scenario: when the migrating contact line reach the edge of the cluster tip, it is pinned on the edge, generating a $\theta_d$ larger than $\theta$ (see FIG. 4.7, plot 418). The increased contact angle is due to the topology of the tip region of $TiO_2$ nanorod clusters. For the modeled tip in this work, its extent is finite along Y-axis and the edge angle is $\pi/2$ radians. According to Gibbs criterion, the edge of the top-surface along X-axis may inhibit the spreading of the gold aggregates along Y-axis by contact line pinning. The contact line may remain pinned for all contact angles between $\theta$ and $$\theta + \frac{\pi}{2}.$$

Though the actual nanorod tips are unlikely to be sharp at edges, curved edges obey Gibbs criterion as well. In related studies, the effect of increased contact angles on the Rayleigh instability development was studied for infinite-length, cylindrical liquid. It was demonstrated by linear stability analysis that the growth rate of the instability may be accelerated if the contact angle is increased. For comparison, the temporal evolution of the contact line in the plane of Y=0 is plotted and dynamics in the necking region at X=0 is focused on in FIG. 4.8.

FIG. 4.8 are sketches (plots) 420 illustrating temporal migration of $TiO_2$-gold-air contact line on continuous, planar $TiO_2$ 420a and $TiO_2$ nanorod cluster 420b. The temporal migration plots are shown at the plane of Y=0. The initial aggregate length is equal to 14. By comparing the speed of radial retraction at X=0 in the plane of Y=0 between temporal migration plot 420a and temporal migration plot 420b, the growth rate of the instability at X=0 may be found to be accelerated in temporal migration plot 420b. In summary, the topology of the $TiO_2$ nanorod tips may affect the dewetting dynamics. The topology may increase the contact angle of supported material by contact line pinning, which facilitates the growth of Rayleigh instability.

4.5.2 Dewetting Under the Initial Condition of $s=s_{min}$

FIG. 4.9 are sketches 422 illustrating a sequence of events leading to the coalescence and merging between $TiO_2$ nanorod cluster-supported 422a and continuous, planar $TiO_2$-supported 422b gold aggregates with the initial dimension of $\tilde{H}$=1 and $\tilde{W}$=1 and aggregate length, $\tilde{L}$=14. $s_{min}$ is 0.900 in sketch 422a and 0.125 in sketch 422b. Mirroring results about YZ-plane at X=0 and about XZ-plane at Y=0 are configured to provide a full picture of each dewetting scenario.

FIG. 4.10 are sketches 424 illustrating a sequence of events leading to the coalescence and merging between $TiO_2$ nanorod cluster-supported 424a and continuous, planar $TiO_2$-supported 424b gold aggregates with the initial dimension of $\tilde{H}$=1 and $\tilde{W}$=1 and aggregate length, $\tilde{L}$=6. $s_{min}$ is 0.860 in sketch 442a and 1.050 in sketch 424b. Mirroring results about YZ-plane at X=0 and about XZ-plane at Y=0 are configured to provide a full picture of each dewetting scenario.

When the initial spacing between gold aggregates, s, is reduced to $s_{min}$, the dewetting dynamics change significantly. Coalescence and merging between gold aggregates take place during dewetting and overrides the results from either a growing or decaying Rayleigh instability. This is shown, in FIG. 4.9 (sketch 422) and FIG. 4.10 (sketch 424), by the sequence of events leading to the coalescence and merging between neighboring gold aggregates for different substrates and for both stable and unstable gold aggregates. Two stages may be identified in these coalescing cases: independent dewetting and coalescence/merging. The first stage is depicted in FIG. 4.9 (sketch 422) by the events at τ=0-479 (nanorod cluster substrate) and τ=0-554 (planar substrate), and in FIG. 4.10 (sketch 424) by the events at τ=0-194 (nanorod cluster substrate) and τ=0-203 (planar substrate). In the first stage, each gold aggregate may evolve independently: the gold aggregates may either fragment (FIG. 4.9 (sketch 422)) or rearrange to a spheroid (FIG. 4.10 (sketch 424)) depending on their initial length. At the end of the first stage, the gold aggregates have accomplished initial contact angle equilibrium and intermediate Rayleigh instability development, and are in the process of becoming spheroids as they reach their final equilibrium structures. While the gold particles are evolving towards the final equilibrium structure, they will spread along Y-axis. The first stage of the process ends when spreading particles come into contact with their neighbors along Y-axis The second stage begins with coalescence between neighboring particles, then quickly progresses to merging, and finally to the evolution towards an equilibrium morphology, which is demonstrated to be an infinite cylindrical structure.

By comparing the dewetting pathways and outcomes simulated under $s=s_{min}$ with the experimental observation in FIG. 4.1, 400b, where the smallest initial spacing along the vapor flux direction (Y-axis) was created for gold aggregates by conducting the deposition at 80°, it is contemplated that the coalescence along Y-axis is one of the main mechanisms that results in the formation of the large, irregularly-shaped gold islands after RTA treatment in FIG. 4.1, 400b, in which it is shown that gold islands span hundreds of nanometers and cover numerous $TiO_2$ nanorod clusters. Simulation results in FIG. 4.9 and FIG. 4.10 show in all the coalescing cases, the final, equilibrium structures are infinite, truncated gold cylinders that span the entire top-surface of both substrates. Though the simplifications that were applied for $TiO_2$ nanorod clusters and gold aggregates in model development may have caused some deviation between the actual and the simulated dewetted structures, the simulated structures have captured the major characteristics of the large, irregular-shaped islands in FIG. 4.1, 400b.

Having shown there is a minimum spacing, $s_{min}$, that determines the dewetting pathways and outcomes, it was shown that the connection between $s_{min}$ and the constraining effect exerted by the nanorod's tip. $s_{min}$ was extracted for gold aggregates with different initial lengths and substrate types, and the results plotted in FIG. 4.11. FIG. 4.11 is a plot 426 illustrating a minimum spacing to prohibit coalescence, $s_{min}$, as a function of the initial length of NP aggregates for the planar substrate 426a and the nanorod cluster substrate 426b. First, it may be seen that for both substrates, the dependence of $s_{min}$ on $\tilde{L}$ is similar. Three regions were identified in the plot: $s_{min}$ first increases with increasing $\tilde{L}$ until it reaches a local maximum at $\tilde{L}=8$; $s_{min}$ decreases with increasing $\tilde{L}$ until it reaches a local minimum at $\tilde{L}=10$; $s_{min}$ resumes its positive dependence on $\tilde{L}$. This trend could be explained by using the critical initial length to divide the curve into two regions. When $\tilde{L}$ is smaller than the critical $\tilde{L}$ value, Rayleigh instability decays and a single particle is formed at some point. As larger particles correspond to a larger s to evolve independently, the $s_{min}$ may increase with increasing volume (length). When $\tilde{L}$ reaches the critical $\tilde{L}$ value, fragmentation takes place and divides the total volume into halves, which is characterized by a dip in the plot near the critical $\tilde{L}$ value. As $\tilde{L}$ keeps increasing, $s_{min}$ will again increase with increasing volume (length).

Then, by comparing the magnitude of $s_{min}$ between different substrates, it may be found that given a certain initial length $\tilde{L}$, gold aggregates supported by $TiO_2$ nanorod clusters may require a shorter initial spacing to prevent coalescence than its counterpart supported by planar $TiO_2$. $s_{min}$ is reduced by about 20% for all simulated geometries. The pinning effect discussed in the previous section may be used to explain the reduction in $s_{min}$. Gold particles produced in the first stage are also subject to the constraining effect exerted by the tip of nanorod cluster, so their spreading along Y-axis is inhibited and smaller $s_{min}$ is needed to prevent the coalescence. From the above results, it may be concluded that the pinning effect exerted by the $TiO_2$ nanorod tips prevents the inter-particle coalescence to a certain extent, and is therefore beneficial to the fabrication of ordered NP arrays.

4.6 Conclusion

In summary, in this section 4, the OAD fabrication of a two-layer film stack for potential optical and sensing applications was realized. The film includes nanometer-sized gold NP arrays with controlled separation and size at the top and slanted $TiO_2$ nanorods at the bottom. The fabrication is based on controlled, Rayleigh-instability-induced, solid-state dewetting of as-deposited gold aggregates. It was demonstrated both experimentally and numerically that the initial spacing between as-deposited gold aggregates along the vapor flux direction determines the fabrication outcome, such that NP arrays may be produced if the initial spacing between as-deposited gold aggregates is higher than a critical spacing, otherwise inter-aggregate coalescence and merging set in, producing large, irregularly-shaped gold islands.

The numerical analysis focused on the effect of nanorod tip topology on the dewetting dynamics of supported materials, and the effect was evaluated by comparing the results with the dewetting dynamics on featureless, planar $TiO_2$. It was shown that $TiO_2$ nanorod tips may exert two effects on the supported gold aggregates along the vapor flux direction: contact line pinning and an increase in the contact angle, both of which are beneficial to the fabrication of NP arrays based on controlled, Rayleigh-instability-induced, solid-state dewetting. The former circumvents the undesired coalescence by inhibiting the spreading of the dewetting gold aggregates, which is manifested by a reduction in the critical spacing by about 20% compared to planar $TiO_2$. The latter effect reduces the geometrical threshold for instability onset and accelerates the instability dynamics, though it plays a better role when the inter-aggregate coalescence is not present.

5. Summary and Future Work

Structuring films at nanometer scale with an oblique angle deposition (OAD) technique to produce thin films with engineered properties have been described herein. Three studies were presented herein. In section 2, the OAD technique was used to produce optical films with arbitrary refractive index by controlling the deposition conditions, and assembling single-layer OAD films into a multi-layer stack. The fabrication, characterization and modeling of a zigzag nanospiral-structured, graded-index anti-reflection (AR) coating fabricated by OAD technique were studied. The optical properties of the AR coating may be engineered by sculpting its morphology with OAD. The AR coating enhances the normal-direction transmission of a YAG:Ce ceramic phosphor plate (CPP) over the visible-light region of the spectrum. At 764 nm, the transmission is enhanced by 7.82%, compared to the potential maximum enhancement of 8.53%. For 633-nm light incident at 5°, the reported coating was measured to induce a scattering loss of no greater than 1.27%. A modeling method was considered that uses the morphology information as input to model the optical properties of the nanostructured AR coatings. A finite-difference time-domain (FDTD) method was used to carry out the simulation of the reported coating. The FDTD model was shown to be able to capture the polarization-dependent anti-reflective performance of the coating without using the measured effective refractive indices as opposed to the transfer matrix method (TMM). The transmission spectrum simulated by FDTD is in good agreement with the measured spectrum and the TMM result. The FDTD model is applied to predict scattering loss induced by the coating itself which could not be achieved by TMM.

In section 3, the ultra-low index films fabricated by OAD method was applied in the design of a photonic crystal (PhC) structure to realize lossless zero index at visible and near-infrared wavelengths. A lossless, zero-index PhC structure was designed by optical modeling to realize zero index at 920 nm. Realizing a lossless zero-index structure at visible and near-infrared frequencies relied on using engineered porous films with an index close to 1 as the low-index base material in the structure. Such low-index films were fabricated by OAD at highly slanted angles with $SiO_2$. Structural damage to porous $SiO_2$ layers by dry etching is the major challenge for the fabrication process. The challenge was addressed with an ICP-RIE etching recipe optimized for producing smooth sidewall profile and protecting the porous $SiO_2$ layers. The realization of zero-index at 920 nm with the proposed material and fabrication method provides new possibility for developing lossless, zero-index optical structures for visible-light applications.

In section 4, the surface topology of nanocolumnar OAD films was considered. Nanocolumnar $TiO_2$ films were considered as special substrates with surface topographical features. Whether and how dynamics may be affected if thermally stable nanocolumnar films (e.g. $TiO_2$) were used to support thermally unstable materials (e.g. gold) undergoing wetting or dewetting was analyzed. If any effect exists, it was attempted to find the suitable OAD conditions, particularly deposition angles, to apply such effect to practical uses. The fabrication was done by first applying OAD method in electron-beam evaporation system to fabricate a two-layer primary structure which is gold aggregates atop of $TiO_2$ nanorods; then by applying rapid thermal annealing to accelerate the solid-state dewetting of as-deposited gold and see if arrays of spherical gold nanoparticles with controlled size and spacing could form atop $TiO_2$ substrate as a result of Rayleigh instability development.

Given a 20-nm deposition of gold, the deposition angles were investigated that allow Rayleigh instability to govern the solid-state dewetting of gold. It was found that, among the deposition angles tested, 80°, 85°, 87° and 89°, gold array may form if deposition angle is greater than 80°, otherwise irregularly-shaped large gold islands are resulted.

A phase-field modeling technique was used to study the dynamics of solid-state-dewetting of gold aggregates on $TiO_2$ nanorods versus on planar $TiO_2$. It was found that the initial inter-aggregate spacing decides the dewetting results and there exists a value of the initial inter-aggregate spacing below which the dewetting aggregates coalesce and suppress the Rayleigh instability, and this spacing threshold is increased when $TiO_2$ nanorods are supporting the gold. Detailed analysis of the modeling results reveals $TiO_2$ nanorod tips affect the dewetting by inducing contact line pinning and increasing contact angle along the vapor flux direction. Contact line pinning helps to circumvent the coalescence and increasing contact angle would increase the growth rate of the instability and also reduce the geometrical threshold for instability onset.

Results of section 4 may be extended to a more general class of template-mediated dewetting, where substrates with periodic surface heterogeneities mediate the dewetting by imposing additional periodic constraints or perturbations besides the characteristic wavelength of the instability. Results demonstrated that OAD has potential for fabricating such template substrates, as a variety of structured films with controllable and well-defined column width, periodicity and lattice arrangement have been produced by OAD when combined with pre-deposition seeding.

Turning again to section 3, the structural parameters in Table 3.1 may be adjusted to tune the zero-index band and evaluate the flexibility and robustness of the proposed PhC structure. Preliminary studies have been done and have yielded interesting results. To implement the idea, two PhC structures have been considered by adjusting the structural parameters listed in Table 3.1 and again simulating the angle-dependent transmission spectrum for the adjusted structures to determine whether they may realize zero index in other wavelength regions. Among the structural parameters that were listed in Table 3.1, $t_1$, $t_2$, and d were investigated. The details of adjusted structures are listed in Table 5.1. Structure 1 and Structure 2 show TIR phenomena at certain wavelengths. The results indicate that such zero-index PhC structure based on the proposed fabrication workflow in section 3 is robust to some degree of structural parameter adjustment during fabrication and adjusting the structural parameters may realize zero index at multiple frequency regions. Specifically, the result obtained from Structure 2 shows the zero-index wavelength region further blue-shifts to ~900 nm, thus providing a pathway to take a concept consistent with the present disclosure and fabricate a zero-index PhC in the visible light region.

TABLE 5.1

Structural parameters of the adjusted PhC structures.

| Structural parameter | Value | |
|---|---|---|
| | Structure 1 | Structure 2 |
| Grating period, a | 600 nm | 600 nm |
| Grating width, d | 300 nm | 270 nm |
| Individual layer thickness of Material 1, $t_1$ | 300 nm | 270 nm |
| Individual layer thickness of Material 2, $t_2$ | 300 nm | 270 nm |

Generally, this disclosure includes five main sections: (1) introduction, (2) fabrication and simulation of nanospiral-structured graded-index anti-reflection coatings for enhanced light extraction of white LEDs. (3) zero-index photonic crystals for visible and near-infrared applications, (4) solid-state dewetting of gold aggregates/islands on $TiO_2$ (titanium dioxide) nanorod structures grown by oblique angle deposition and (5) summary and future work. The first section (Introduction) included background technical information configured to aid understanding of subsequent sections. The second and third sections disclosed using OAD method to fabricate sculptured thin films with engineered refractive indices, and applying the product films to address some challenges in the LED applications. The fourth section disclosed how the surface topology of OAD films could possibly mediate solid-state dewetting.

In the second section, a zig-zag nanospiral-structured graded-index anti-reflection coating was fabricated on the top surface of a YAG:Ce (Cerium (Ce) doped Yttrium aluminum garnet (YAG)) ceramic phosphor plate (CPP) in the effort of enhancing its transmission in the normal direction. The anti-reflection coating enhances the normal-direction transmission of YAG:Ce CPP over the visible-light region of the spectrum. At 764 nm, the transmission is enhanced by 7.82%, compared to the potential maximum enhancement of 8.53%. For 633-nm light incident at 5°, the reported coating is measured to induce a scattering loss of no greater than 1.27%.

In the third section, a lossless, zero-index photonic crystal structure configured to enable the emission-pattern control near 920 nm is disclosed. The feasibility of fabricating the designed structure with OAD method is described including a description of a prototype.

In the fourth section, fabrication of a composite film made of a stable, gold nanoparticle array with well-controlled separation and size on the top a nanocolumnar $TiO_2$ OAD film is disclosed. The fabrication of the nanoparticle array is based on governing the solid-state dewetting of as-deposited gold aggregates on the $TiO_2$ nanorods with Rayleigh-instability. The topology of $TiO_2$ nanorod tips may induce contact line pinning and increase the contact angle along the vapor flux direction to the supported gold aggregates, and dewetting dynamics will therefore act differently on $TiO_2$ nanorod tips than on a featureless, planar $TiO_2$. Contact line pinning and contact angle increase may inhibit the coalescence between dewetting geometries and facilitate the instability growth on the supported materials, which makes nanocolumnar OAD films as desired templated substrates to govern Rayleigh-instability and produce monodisperse NPs.

In the fifth section, a summary and future work were discussed.

What is claimed is:

1. A two dimensional (2D) photonic crystal (PhC) structure comprising:
    a substrate; and
    a periodic grating structure formed on the substrate, the periodic grating structure comprising a plurality of gratings having a grating period, a, each pair of adjacent gratings separated by air, each grating having a grating width, d, and comprising a plurality of alternating layers of a first material and a second material, the first material corresponding to a high index material, the second material corresponding to a low index material, a ratio of a first refractive index of the first material to a second refractive index of the second material greater than or equal to two, each first material layer having a first thickness, t1, each second material layer having a second thickness, t2, wherein the 2D PhC structure has a structure refractive index at or near zero for a range of frequencies.

2. The 2D PhC structure of claim 1, wherein the first material is $TiO_2$ (titanium dioxide) and the second material is SiO2 (silicon dioxide).

3. The 2D PhC structure of claim 1, wherein the periodic grating structure is configured to receive TE (transverse electric)-polarized light.

4. The 2D PhC structure of claim 1, wherein the plurality of layers are formed using oblique angle deposition.

5. The 2D PhC structure of claim 4, wherein the first material is $TiO_2$ (titanium dioxide), the second material is $SiO_2$ (silicon dioxide), a first deposition angle during formation of the layers of $TiO_2$ is at or near 30° and a second deposition angle during formation of the layers of $SiO_2$ is at or near 89°.

6. The 2D PhC structure according to claim 1, wherein the periodic grating structure comprises five first material layers and four second material layers.

7. The 2D PhC structure according to claim 1, wherein the grating period is 600 nanometers (nm), the grating width is 270 nm, the first material is dense $TiO_2$, the second material is porous $SiO_2$, the first refractive index is 2.45, the second refractive index 1.05, the first thickness is 270 nm and the second thickness is 330 nm.

8. The 2D PhC structure according to claim 1, wherein the substrate comprises silicon.

9. The 2D PhC structure according to claim 1, wherein the range of frequencies corresponds to at least one of visible and/or near-infrared wavelengths.

10. The 2D PhC structure according to claim 1, wherein the 2D PhC structure is $C_{4v}$ symmetric.

* * * * *